US010254906B2

(12) United States Patent
Gotoh et al.

(10) Patent No.: US 10,254,906 B2
(45) Date of Patent: Apr. 9, 2019

(54) TRANSFER FILM, METHOD FOR MANUFACTURING SAME, METHOD FOR MANUFACTURING LAMINATE, METHOD FOR MANUFACTURING CAPACITANCE-TYPE INPUT DEVICE, AND METHOD FOR MANUFACTURING IMAGE DISPLAY DEVICE

(71) Applicant: FUJIFILM Corporation, Tokyo (JP)

(72) Inventors: Hidenori Gotoh, Fujinomiya (JP); Morimasa Sato, Fujinomiya (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 0 days.

(21) Appl. No.: 15/484,302

(22) Filed: Apr. 11, 2017

(65) Prior Publication Data

US 2017/0220154 A1 Aug. 3, 2017

Related U.S. Application Data

(63) Continuation of application No. PCT/JP2015/079882, filed on Oct. 22, 2015.

(30) Foreign Application Priority Data

Oct. 24, 2014 (JP) ................................ 2014-217274

(51) Int. Cl.

| | |
|---|---|
| ***G06F 3/044*** | (2006.01) |
| ***B41M 5/00*** | (2006.01) |

(Continued)

(52) U.S. Cl.

CPC ........... *G06F 3/044* (2013.01); *B05D 3/0254* (2013.01); *B32B 27/00* (2013.01); *B32B 27/36* (2013.01); *B32B 33/00* (2013.01); *B32B 37/025* (2013.01); *B41M 1/34* (2013.01); *B41M 5/00* (2013.01); *B41M 5/007* (2013.01); *B32B 2307/412* (2013.01); *B32B 2307/538* (2013.01); *B41M 2205/40* (2013.01); *G06F 2203/04103* (2013.01)

(58) Field of Classification Search

CPC .......... B41M 1/34; B41M 5/00; B41M 5/007; B41M 2205/40; B32B 2307/538; G06F 3/044; G06F 2203/04103

USPC ...................................................... 428/32.77

See application file for complete search history.

(56) References Cited

U.S. PATENT DOCUMENTS

| | | | |
|---|---|---|---|
| 2007/0202297 | A1 | 8/2007 | Takada et al. |
| 2011/0230584 | A1 | 9/2011 | Araki et al. |

FOREIGN PATENT DOCUMENTS

| | | | |
|---|---|---|---|
| JP | 10-282655 | A | 10/1998 |
| JP | 3406544 | B2 | 5/2003 |

(Continued)

OTHER PUBLICATIONS

Communication dated Nov. 28, 2017 from the Japanese Patent Office in counterpart application No. 2015-208063.

(Continued)

*Primary Examiner* — Bruce H Hess

(74) *Attorney, Agent, or Firm* — Sughrue Mion, PLLC

(57) ABSTRACT

The transfer film includes a temporary support, a resin layer, and a cover film in this order, in which when the cover film is peeled from the resin layer, a surface of the cover film that contacted the resin layer has surface roughnesses SRz and SRa of equal to or less than 130 nm and equal to or less than 8 nm respectively that are measured based on JIS-B0601-2001.

20 Claims, 11 Drawing Sheets

(51) Int. Cl.

| | |
|---|---|
| ***B41M 1/34*** | (2006.01) |
| ***B32B 27/00*** | (2006.01) |
| ***B32B 27/36*** | (2006.01) |
| ***B32B 33/00*** | (2006.01) |
| ***B05D 3/02*** | (2006.01) |
| ***B32B 37/00*** | (2006.01) |

(56) References Cited

FOREIGN PATENT DOCUMENTS

| | | | |
|---|---|---|---|
| JP | 3522127 | B2 | 4/2004 |
| JP | 2007-210226 | A | 8/2007 |
| JP | 2007-253513 | A | 10/2007 |
| JP | 2010-061425 | A | 3/2010 |
| JP | 2010-086684 | A | 4/2010 |
| JP | 2010-152809 | A | 7/2010 |
| JP | 2010-257492 | A | 11/2010 |
| JP | 5257648 | B2 | 8/2013 |
| JP | 2014-142834 | A | 8/2014 |
| WO | 2006/035684 | A1 | 4/2006 |
| WO | 2010/061744 | A1 | 6/2010 |

OTHER PUBLICATIONS

International Preliminary Report on Patentability and Written Opinion, dated Apr. 25, 2017, in corresponding International Application No. PCT/JP2015/079882, 16 pages in English and Japanese.
Written Opinion of the International Searching Authority of PCT/JP2015/079882 dated Jan. 26, 2016.
International Search Report of PCT/JP2015/079882 dated Jan. 26, 2016.

TRANSFER FILM, METHOD FOR MANUFACTURING SAME, METHOD FOR MANUFACTURING LAMINATE, METHOD FOR MANUFACTURING CAPACITANCE-TYPE INPUT DEVICE, AND METHOD FOR MANUFACTURING IMAGE DISPLAY DEVICE

CROSS-REFERENCE TO RELATED APPLICATIONS

This application is a Continuation of PCT International Application No. PCT/JP2015/79882, filed on Oct. 22, 2015, which claims priority under 35 U.S.C. § 119(a) to Japanese Patent Application No. 2014-217274, filed on Oct. 24, 2014. Each of the above application(s) is hereby expressly incorporated by reference, in its entirety, into the present application.

BACKGROUND OF THE INVENTION

1. Field of the Invention

The present invention relates to a transfer film, a method for manufacturing the same, a method for manufacturing a laminate, a method for manufacturing a capacitance-type input device, and a method for manufacturing an image display device.

2. Description of the Related Art

In recent years, in electronic instruments such as cellular phones, car navigations, personal computers, ticket vending machines, and banking terminals, a tablet-type input device has been disposed on the surface of a liquid crystal device or the like. When an instruction image is displayed on an image display area of the liquid crystal device, a user touches the site displaying the instruction image with a finger, a stylus, or the like with reference to the instruction image, and in this manner, the user can input information corresponding to the instruction image.

Such an input device (touch panel) includes a resistive film type, a capacitance type, and the like. The resistive film-type input device has a double-sheet structure consisting of a film and glass in which a short circuit is caused by pressing down the film. Therefore, the input device has defects such as a narrow range of operation temperature and vulnerability to temporal change.

In contrast, the capacitance-type input device has an advantage in that it can be prepared simply by forming a light-transmitting conductive film on a single sheet of substrate. Such a capacitance-type input device includes, for example, a type of input device which has electrode patterns extending in directions crossing each other, and detects an input position by detecting the change in capacitance between the electrodes when a finger or the like contacts the device (for examples, see JP2010-86684A, JP2010-152809A, and JP2010-257492A).

At the time of using the aforementioned capacitance-type input device, for example, when a light source is projected on the device, a transparent electrode pattern becomes noticeable in a position slightly distant from the vicinity of the position where regular reflection occurs, and this leads to a problem of visibility such as unattractiveness. In contrast, in JP2010-86684A, an indium tin oxide (ITO) pattern is formed on a substrate, and only on the upper side of the ITO pattern, a layer formed of a dielectric material with a low refractive index such as $SiO_2$ and a layer formed of a dielectric material with a high refractive index such as $Nb_2O_5$ are alternately laminated. JP2010-86684A describes that, by the effect of optical interference resulting from the respective layers, the transparent electrode pattern becomes a stealth pattern, and the tone thereof becomes neutral.

In JP2010-152809A, before an ITO pattern is formed on a substrate, only on the lower side of the ITO pattern, a low-refractive index layer such as $SiO_2$ and a high-refractive index layer such as $Nb_2O_5$ are laminated, and then the ITO pattern is formed. JP2010-152809A describes that, in this way, it is possible to prevent the emergence of the shape of a transparent electrode pattern.

In JP2010-257492A, before an ITO pattern is formed on a substrate, only on the lower side of the ITO pattern, a low-refractive index layer such as $SiO_2$ and a high-refractive index layer such as $Nb_2O_5$ are laminated, and then the ITO pattern is formed. JP2010-257492A describes that, in this way, it is possible to prevent a transparent electrode pattern or a crossing portion of the patterns from becoming noticeable.

Various methods are known as methods for forming a transparent film such as a transparent insulating layer or a transparent protective film described in the aforementioned documents. Currently, as the smart phones or tablet Personal Computers (PCs) including a capacitance-type touch panel on a liquid crystal display or an organic Electro-Luminescence (EL) display, those using reinforced glass, which is represented by Gorilla Glass from Corning Inc., for a front panel (a surface that directly contacts a finger) are being developed and presented. Furthermore, the smart phones or tablet PCs, in which an opening portion for installing a pressure-sensitive switch (a pressing-type mechanical mechanism that does not sense a change in capacitance) is formed in a portion of the front panel, are on the market. The reinforced glass has high strength, but it is not easy to process the glass. Therefore, generally, in order to form the opening portion, the opening portion is formed before a reinforcing treatment, and then the reinforcing treatment is performed.

As a method for forming a transparent insulating layer or a transparent protective film, WO2010/061744A and JP2010-061425A describe only a method for performing coating in a case of using an organic material.

JP5257648B describes that, from the viewpoint of surface roughness, for optical nanoimprinting, a photosensitive element is effective which is used for the transfer of fine irregularities having a surface roughness of 0.01 to 2 μm and is constituted with a support film (A), a photosensitive resin composition layer (B) having a thickness of equal to or less than 20 μm, and a protective film (C), in which Ra of a surface of the protective film (C) that contacts the photosensitive resin composition layer is 0.05 to 0.5 μm.

JP3522127B describes that, from the viewpoint of the intermixing of air bubbles (lamination bubbles) at the time of lamination, an arithmetical mean roughness (Ra) of a surface of a protective film that contacts a photosensitive composition layer is preferably equal to or greater than 0.5 μm.

JP3406544B describes that, in order to prevent air voids resulting from fish eyes, a photosensitive element is effective in which a protective film of a surface contacting a photosensitive resin composition layer has a surface roughness Ra of equal to or less than 0.15 μm and Rmax of equal to or less than 1.5 μm, a surface which does not contact the photosensitive resin composition layer has Ra of 0.1 to 0.8 μm and Rmax of 1 to 5 μm, and the number of fish eyes having a diameter of equal to or greater than 80 μm that are included in the protective film is equal to or less than $5/m^2$.

SUMMARY OF THE INVENTION

As described above, in a case where an attempt is made to form a transparent insulating layer or a transparent protective film by the coating method described in WO2010/061744A or JP2010-061425A by using the materials described in JP2010-257492A or WO2010/061744A on the substrate with an opening portion that has undergone a reinforcing treatment, a resist component leaks or sticks out of the opening portion. Consequently, a step of removing the sticking portion is necessary, and this leads to a problem of great reduction in production efficiency.

Furthermore, in JP5257648B, JP3522127B, and JP3406544B, it is difficult to inhibit the intermixing of air bubbles (lamination bubbles) at the time of lamination.

As described above, there is no disclosure regarding a method for solving and improving the problem in that the transparent electrode pattern becomes visible by using a transfer material. More specifically, there is no disclosure regarding a transfer material or a manufacturing method using the transfer material, which is for collectively forming a pattern of a refractive index adjusting layer or an overcoat layer for improving the visibility of an ITO pattern on a transparent electrode pattern without a defect such as the intermixing of air bubbles (lamination bubbles) at the time of lamination.

Regarding the above problem, the inventors of the present invention investigated the layer constitution described in JP2010-86684A, JP2010-152809A, and JP2010-257492A or the photosensitive transfer sheet described in JP5257648B, JP3522127B, and JP3406544B that has a first photosensitive layer and a second photosensitive layer on a support. As a result, the inventors found that the transparent electrode pattern becomes visible, and the problem in that the transparent electrode pattern becomes visible still remains unsolvable.

In a generally used capacitance-type input device, a frame portion is provided around an image display area. Accordingly, in a case where a refractive index adjusting layer is formed using a transfer film, there is a need to solve a problem in that the transparent electrode pattern becomes visible by laminating the refractive index adjusting layer on the image display area, and to easily form a desired pattern shape such that the refractive index adjusting layer is not laminated on the frame portion. As a method for forming a desired pattern, a method is considered in which the shape of the transfer film is cut according to the shape of the frame portion of the capacitance-type input device (die cutting method or half cutting method). However, from the viewpoint of further improving productivity, it is desirable to transfer the refractive index adjusting layer onto the transparent electrode pattern from the transfer film and then to form a laminate having excellent patterning properties that can be developed in a desired pattern by photolithography.

In addition, from the viewpoint of productivity, continuous high-speed lamination was performed by a roll-to-roll method effective in a film sensor method. As a result, within the range of surface roughness described in JP3522127B and JP3406544B, the intermixing of air bubbles (lamination bubbles) at the time of lamination still occurred. Furthermore, due to the lamination bubbles, the results of a moist heat test deteriorated.

An object of the present invention is to provide a transfer film which inhibits the intermixing of air bubbles at the time of lamination during transfer and makes it possible to form a laminate being able to sufficiently withstand a moist heat test. Another object of the present invention is to provide a method for manufacturing the transfer film, a method for manufacturing a laminate by using the transfer film, a method for manufacturing a capacitance-type input device, and a method for manufacturing an image display device.

The inventors of the present invention obtained knowledge that, in a transfer film constituted with a temporary support, a resin layer, and a cover film that are laminated in this order, by controlling a surface roughness of the surface contacting the resin layer within a specific range at the time of peeling the cover film, it is possible to transfer the resin layer from the transfer film without lamination bubbling and to form a laminate which can sufficiently withstand a moist heat test.

The aforementioned objects of the present invention were achieved by means described in the following <1>, <9>, or <10>. Preferred embodiments are also described below in <2> to <8> and <11> to <13>.

<1> A transfer film comprising a temporary support, a resin layer, and a cover film that are laminated in this order, in which when the cover film is peeled from the resin layer, a surface of the cover film that contacted the resin layer has surface roughnesses SRz and SRa of equal to or less than 130 nm and equal to or less than 8 nm respectively that are measured based on JIS-B0601-2001.

<2> The transfer film according to <1>, in which the resin layer is a transparent resin layer, and the resin layer has a transmittance of equal to or greater than 80% at a wavelength of 400 to 780 nm.

<3> The transfer film according to <2>, in which the transparent resin layer consists of a first transparent resin layer and a second transparent resin layer, and a surface that the cover film contacts is the second transparent resin layer.

<4> The transfer film according to any one of <1> to <3>, in which a material of the cover film is polyester.

<5> The transfer film according to any one of <1> to <4>, in which the cover film has a thickness of 10 to 50 μm.

<6> The transfer film according to any one of <1> to <5>, in which the resin layer contains at least a binder.

<7> The transfer film according to any one of <1> to <6>, in which the resin layer has a dry film thickness of 1 to 15 μm.

<8> The transfer film according to any one of <1> to <7>, in which the resin layer contains particles having a refractive index of equal to or higher than 1.55.

<9> A method for manufacturing a transfer film, comprising laminating a resin layer on a temporary support and laminating a cover film on the resin layer in this order, in which when the cover film is peeled from the resin layer, a surface of the cover film that contacted the resin layer has surface roughnesses SRz and SRa of equal to or less than 130 nm and equal to or less than 8 nm respectively that are measured based on JIS-B0601-2001.

<10> A method for manufacturing a transfer film, comprising laminating a first transparent resin layer on a temporary support, laminating a second transparent resin layer on the first transparent resin layer, and laminating a cover film on the second transparent resin layer in this order, in which when the cover film is peeled from a transparent resin layer having the first transparent resin layer and the second transparent resin layer, a surface of the cover film that contacted the transparent resin layer has surface roughnesses SRz and SRa of equal to or less than 130 nm and equal to or less than 8 nm respectively that are measured based on JIS-B0601-2001.

<11> A method for manufacturing a laminate, comprising laminating the resin layer of the transfer film according to any one of <1> to <8> on a transparent electrode pattern positioned on a base material.

<12> A method for manufacturing a capacitance-type input device, comprising laminating the resin layer of the transfer film according to any one of <1> to <8> on a transparent electrode pattern.

<13> A method for manufacturing an image display device, comprising laminating the resin layer of the transfer film according to any one of <1> to <8> on a transparent electrode pattern.

According to the present invention, it is possible to provide a transfer film which inhibits the intermixing of air bubbles at the time of lamination during transfer and makes it possible to form a laminate being able to sufficiently withstand a moist heat test. Furthermore, according to the present invention, it is possible to provide a method for manufacturing the transfer film, a method for manufacturing a laminate by using the transfer film, a method for manufacturing a capacitance-type input device, and a method for manufacturing an image display device.

BRIEF DESCRIPTION OF THE DRAWINGS

FIG. 15 is a schematic view showing an example of a state where the transfer film of the present invention having the first and second transparent resin layers is laminated on the transparent electrode pattern of the capacitance-type input device by using a laminator but is not yet cured by exposure or the like.

DESCRIPTION OF THE PREFERRED EMBODIMENTS

Figure 1:
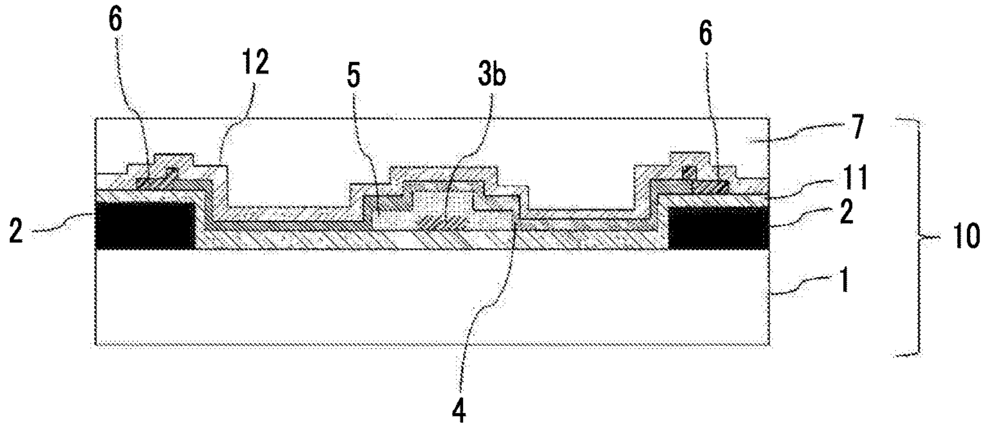
FIG. 1 is a schematic cross-sectional view showing an example of a constitution of a capacitance-type input device of the present invention.

Hereinafter, a transfer film and a method for manufacturing the same, a laminate and a method for manufacturing the same, a capacitance-type input device, and an image display device of the present invention will be described. In the following section, the constituents will be described based on the representative embodiments or specific examples of the present invention in some cases, but the present invention is not limited to the embodiments or specific examples.

In the present specification, a range of numerical values represented using "to" means a range including the numerical values listed before and after "to" as a lower limit and an upper limit.

In the present specification, in a case where there is no description regarding whether a group (atomic group) is substituted or unsubstituted, the group includes both of a group (atomic group) not having a substituent and a group (atomic group) having a substituent. For example, an "alkyl group" includes not only an alkyl group which does not have a substituent (unsubstituted alkyl group) but also an alkyl group which has a substituent (substituted alkyl group).

In the present specification, in some cases, some chemical structural formulae are described as simplified structural formulae in which a hydrogen atom is not shown.

In the present specification, "(meth)acrylate" represents acrylate and methacrylate, "(meth)acryl" represents acryl and methacryl, and "(meth)acryloyl" represents acryloyl and methacryloyl.

In the present invention, "% by mass" has the same definition as "% by weight", and "part by mass" has the same definition as "part by weight".

The "lamination bubbles" means the intermixing of air bubbles that occur at the time of removing a cover film from a transfer film and laminating a resin layer on a target sub stance.

In the present invention, a combination of preferred aspects is more preferable.

In the present invention, the weight-average molecular weight and the number-average molecular weight in a polymer component are a weight-average molecular weight expressed in terms of polystyrene measured by gel permeation chromatography (GPC) by using tetrahydrofuran (THF) as a solvent.

1. Transfer Film and Method for Manufacturing Same

The transfer film of the present invention is constituted with a temporary support, a resin layer, and a cover film in this order, in which when the cover film is peeled from the resin layer, a surface of the cover film that contacted the resin layer has surface roughnesses SRz and SRa of equal to or less than 130 nm and equal to or less than 8 nm respectively that are measured based on JIS-B0601-2001.

In a case where the aforementioned constitution is adopted, the intermixing of air bubbles (lamination bubbles)

at the time of lamination is inhibited, and hence a laminate which remains unproblematic even after a moist heat test can be formed.

The transfer film is preferably a transfer film in which the resin layer is a transparent resin layer having a transmittance of equal to or higher than 80% at a wavelength of 400 to 780 nm, more preferably a transfer film in which the transparent resin layer is a transparent resin layer having a first transparent resin layer and a second transparent resin layer, and even more preferably a transfer film in which the transparent resin layer consists of a first transparent resin layer and a second transparent resin layer, and a surface that contacts the cover film is the second transparent resin layer.

In a case where the aforementioned constitution is adopted, the occurrence of lamination bubbles is inhibited, and no problem occurs even after a moist heat test. Furthermore, by reducing a difference in a refractive index between a transparent electrode pattern (preferably ITO) and the second transparent resin layer (refractive index adjusting layer) and reducing a difference in a refractive index between the refractive index adjusting layer (second transparent resin layer) and the first transparent resin layer, the reflection of light is suppressed, and hence the transparent electrode pattern is not easily seen. Therefore, the visibility of the transparent electrode pattern can be further improved.

It is preferable that any one of the first transparent resin layer and the second transparent resin layer (refractive index adjusting layer) is a water-soluble layer, and the other is a non-water-soluble layer. In a case where this constitution is adopted, even if the second transparent resin layer (refractive index adjusting layer) is laminated after the lamination of the first transparent resin layer without curing the first transparent resin layer, the resin layers are excellently fractionated, and the visibility of the transparent electrode pattern can be improved by the aforementioned mechanism. In addition, after the second transparent resin layer (refractive index adjusting layer) and the first transparent resin layer are transferred onto the transparent electrode pattern from the transfer film, a desired pattern can be developed by photolithography. In a case where the first and second transparent resin layers are poorly fractionated, the refractive index adjusting effect resulting from the aforementioned mechanism easily becomes insufficient, and the improvement of the visibility of the transparent electrode pattern easily becomes insufficient.

It is preferable that the layers are excellently fractionated in the transfer film of the present invention. Furthermore, it is preferable that cracking is excellently prevented (cracking does not easily occur) in the transfer film of the present invention. In addition, it is preferable that winding wrinkles are excellently prevented (winding wrinkles do not easily occur) in the laminate of the present invention.

Hereinafter, preferred aspects of the transfer film of the present invention will be described. In the following section, a case where the resin layer is a transparent resin layer will be mainly described, but the present invention is not limited thereto. The resin layer is not particularly limited, and may be a colorant-containing photocurable resin layer used as a mask layer or a conductive photocurable resin layer for forming a conductive element.

The transfer film of the present invention is suitably used for a transparent insulating layer or a transparent protective layer of a capacitance-type input device. More specifically, the transfer film of the present invention can be preferably used as a transfer film for forming a laminated pattern of a refractive index adjusting layer and an overcoat layer (transparent protective layer) on a transparent electrode pattern by a photolithography method.

(Cover Film)

<Surface Roughnesses (SRz and SRa) of Cover Film after Being Peeled from Resin Layer>

As described above, in the transfer film of the present invention, when the cover film is peeled from the resin layer, a surface of the cover film that contacted the resin layer has surface roughnesses SRz (SRzJIS) and SRa of equal to or less than 130 nm and equal to or less than 8 nm respectively that are measured based on JIS-B0601-2001.

In a case where SRz and SRa are within the above range, high-speed lamination can be performed, the occurrence of lamination bubbles or wrinkles is inhibited in the portion of a heating roller, and hence an excellent pattern having a small defect is obtained.

SRz and SRa are preferably equal to or less than 110 nm and equal to or less than 8 nm respectively, and more preferably equal to or less than 80 nm and equal to or less than 8 nm respectively.

The lower limit of SRz is not particularly limited. Depending on the transport conditions, from the viewpoint of scratch resistance, the lower limit is preferably equal to or greater than 2 nm and more preferably equal to or greater than 3 nm.

The lower limit of SRa is not particularly limited. Depending on the transport conditions, from the viewpoint of scratch resistance, the lower limit is preferably equal to or greater than 0.5 nm and more preferably equal to or greater than 1.0 nm.

When the surface roughnesses (SRz and SRa) are within the preferred range, high-speed lamination can be performed, the occurrence of lamination bubbles and wrinkles is inhibited in the portion of a heating roller, and hence an excellent pattern having a small defect is obtained.

While Rz and Ra are measured on a single straight line, SRz and SRa are obtained by making an array of straight lines and measuring surface roughnesses of a surface thereof. For determining SRa, a roughness profile is folded along a central line, an area obtained from the roughness profile and the central line is divided by a length L. SRa is represented by the obtained value in the unit of micrometer (μm).

In contrast, for determining SRz, in portions remaining after excluding only a standard length from an unfiltered profile, a difference between an average of altitudes of the highest peak to the fifth highest peak and an average of altitudes of the deepest valley to the fifth deepest valley is calculated. SRz is represented by the obtained value in the unit of micrometer (μm). Although the measurement result is represented in μm in JIS, in a region having a small surface roughness, nm is also generally used in many cases. In the present invention, nm is used.

For measuring the surface roughnesses (SRzJIS and SRa), a contact stylus-type surface profilometer can be used.

In order to make SRz and SRa of the surface of the cover film that contacted the resin layer to fall into the above range at the time of peeling the cover film from the resin layer and preferably from the transparent resin layer, the surface roughness SRz, measured based on JIS-B0601-2001, of the surface of the cover film that contacted the resin layer is preferably equal to or less than 125 nm, more preferably equal to or less than 105 nm, and even more preferably equal to or less than 75 nm, although SRz also depends on the characteristics of the resin layer. Furthermore, SRa is preferably equal to or less than 8 nm, more preferably equal to or less than 7.5 nm, and even more preferably equal to or less than 7 nm.

The lower limit of SRz of the surface of the cover film that contacts the resin layer is not particularly limited, but is preferably equal to or greater than 1 nm, more preferably equal to or greater than 1.5 nm, and even more preferably equal to or greater than 2 nm.

The lower limit of SRa of the surface of the cover film that contacts the resin layer is not particularly limited, but is preferably equal to or greater than 0.5 nm, more preferably equal to or greater than 0.7 nm, and even more preferably equal to or greater than 1 nm.

<Other Characteristics of Cover Film>

In order to prevent the SRz and SRa from changing by the influence of the resin layer, the cover film used in the transfer film of the present invention preferably has an appropriate hardness.

Specifically, the hardness of the cover film is preferably B to 9H and more preferably H to 9H in terms of pencil hardness.

The pencil hardness can be measured by the method described in JIS K5600-5-4. Furthermore, in order to prevent the SRz and SRa from changing over time, the cover film used in the transfer film of the present invention preferably has high dimensional stability.

Specifically, the dimensional stability of the cover film can be measured by calculating what percentage of the length of the cover film changes after the cover film is thermally treated for 30 minutes at 100° C.

<Method for Peeling Cover Film>

Figure 17:
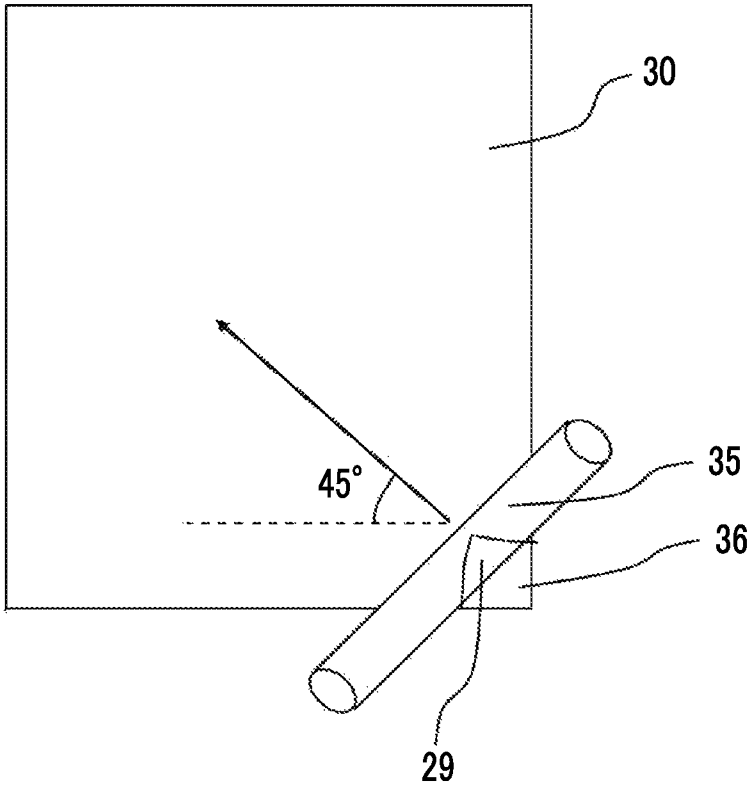
FIG. 17 is a schematic view showing an example of a method for peeling a cover film from a transfer material by using a paper tube.

In the transfer film of the present invention, as a method for peeling the cover film whose surface roughness is measured as described above, a method is preferable in which the cover film is peeled at a steady curvature and a steady rate such that a portion of the resin layer is not missed. FIG. 17 shows an example of peeling the cover film of the present invention.

Specifically, for example, a portion of the transfer film in the form of a roll is drawn out and cut in the form of a sheet, and the end portion thereof is cut in a straight line. Then, on a flat glass plate, a transfer film 30 is placed such that the cover film side faces up. The cover film at the corner of the sheet is slightly peeled, the corner of the transfer material from which the cover film has been peeled is fixed to the glass plate by using a tape, and the corner of the cover film is fixed to a paper tube 35 having a diameter of 3 cm by using a tape. While being wound around the paper tube 35, the cover film is peeled at an angle of 45° with respect to the sheet at a rate of 1 cm/sec. By peeling the cover film at a steady curvature and a steady rate, it is possible to peel the cover film without making the resin layer missed.

<Cover Film>

As the cover film, it is preferable to use a flexible material that is not markedly deformed, shrunken, or stretched under a pressurized condition or under a pressurized and heated condition. The thickness of the cover film is preferably within a range of 10 to 50 μm. In view of ease of handleability, versatility, and the like, the thickness is preferably with in a range of 11 to 45 μm, and more preferably within a range of 12 to 40 μm.

The cover film may be transparent and may contain silicon made into a dye, alumina sol, a chromium salt, a zirconium salt, and the like. As such a cover film, for example, it is possible to appropriately use the cover films described in paragraphs 0083 to 0087 and 0093 of JP2006-259138A. Specific examples thereof include a polyolefin film such as a polyethylene film or a polypropylene film, a polyester film such as a polyethylene terephthalate film, a triacetate cellulose film, a polystyrene film, a polycarbonate film, and the like. Among these, a polyester film is preferable, a polyethylene terephthalate film is more preferable, and a biaxially-stretched polyethylene terephthalate film is even more preferable.

(Temporary Support)

The transfer film of the present invention has a temporary support.

The temporary support is a support peeled after the resin layer included in the transfer film is transferred.

As the temporary support, it is preferable to use a flexible material which is not markedly deformed, shrunken, or stretched under a pressurized condition or under a pressurized and heated condition. Examples of the temporary support include a polyester film such as a polyethylene terephthalate film, a triacetate cellulose film, a polystyrene film, a polycarbonate film, and the like. Among these, a polyester film is preferable, a polyethylene terephthalate film is more preferable, and a biaxially-stretched polyethylene terephthalate film is even more preferable.

The thickness of the temporary support is not particularly limited, and is preferably within a range of 5 to 200 μm. From the viewpoint of ease of handleability, versatility, and the like, the thickness is more preferably within a range of 10 to 50 μm.

The temporary support may be transparent and may contain silicon oxide, alumina sol, a chromium salt, a zirconium salt, and the like.

Furthermore, conductivity may be imparted to the temporary support by the method described in JP2005-221726A, and the like.

(Resin Layer)

The transfer film of the present invention is a transfer film constituted with a temporary support, a resin layer, and a cover film in this order, and the resin layer is preferably a transparent resin layer. It is preferable that the transparent resin layer is a laminated layer functionally divided into a first transparent resin layer and a second transparent resin layer. It is more preferable that the transparent resin layer has the second transparent resin layer adjacent to and disposed on the first transparent resin layer, the refractive index of the second transparent resin layer is higher than the refractive index of the first transparent resin layer, and the refractive index of the second transparent resin layer is equal to or higher than 1.60.

It is preferable that a surface that the cover film contacts is the second transparent resin layer.

The resin layer may be thermosetting, photocurable, or thermosetting and photocurable. Particularly, from the viewpoint of being able to impart reliability to the film by performing thermal curing after transfer, the resin layer is preferably at least a thermosetting resin layer. From the viewpoint of making it easy to form a film by performing photocuring after transfer and from the viewpoint of being able to impart reliability to the film by performing thermal curing after forming the film, the resin layer is more preferably a thermosetting and photocurable resin layer.

In the present specification, for the convenience of description, in a case where the resin layer of the transfer film of the present invention is transferred and photocured, and then the resin layer loses photocuring properties, the resulting resin layer is still referred to as a resin layer regardless of whether or not the layer has thermosetting properties. Moreover, there is a case in which the resin layer is photocured and then thermally cured, and even in this case, the resulting layer is still referred to as a resin layer regardless of whether or not the layer has photocuring properties. Likewise, in a case where the resin layer of the transfer film of the present invention is transferred onto a transparent electrode pattern, and these layers lose thermosetting properties after being subjected to thermal curing, each of these layer is still referred to as a resin layer regardless of whether or not they have photocuring properties.

In the present invention, the resin layer is preferably a transparent resin layer.

In the present invention, a “transparent resin layer” refers to a laminate having a transmittance of equal to or higher than 80% in a case where the laminate is formed by transferring the resin layer to a base material having a transmittance of equal to or higher than 90%. As the transmittance described above, it is possible to use an arithmetic mean of transmittance measured at a pitch of 1 nm within a wavelength range of 400 to 780 nm.

In a case where the transmittance is measured at a pitch of 1 nm, the minimum transmittance measured at 400 to 450 nm is referred to as a “transmittance within a range of 400 to 450 nm”, and the minimum transmittance measured at 450 to 780 nm is referred to as a “transmittance within a range of 450 to 780 nm”. It is preferable that both of the transmittance within a range of 400 to 450 nm and the transmittance within a range of 450 to 780 nm are equal to or higher than 80%. It is more preferable that the transmittance within a range of 400 to 450 nm is equal to or higher than 90%, and the transmittance within a range of 450 to 780 nm is equal to or higher than 95%. It is even more preferable that the transmittance within a range of 400 to 450 nm is equal to or higher than 95%, and the transmittance within a range of 450 to 780 nm is equal to or higher than 97%.

In a case where the transparent resin layer of the transfer film has photocuring properties and/or thermosetting properties, the aforementioned transmittance of light should be retained such that the transparent resin layer maintain the same transparency even after curing. In a case of photocuring, as described above, the transparent resin layer is transferred such that the glass substrate and the transparent resin layer contact each other, flood exposure is performed, and the temporary support is peeled. Then, development and rinsing are performed, surplus water is removed using an air knife, and drying is performed. The transmittance of the obtained glass substrate with the transparent resin layer is measured using a spectrophotometer in the same manner as described. After the removal of water by using an air knife and drying, post-exposure may be performed. In a case of the thermosetting and photocurable resin layer, baking is performed finally, and the transmittance thereof is measured in the same manner as described above.

In a case of thermal curing, the transparent resin layer is transferred such that the glass substrate and the transparent resin layer contact each other, the temporary support is peeled, and baking is performed. The transmittance of the obtained glass substrate with the transparent resin layer is measured using a spectrophotometer in the same manner as described above. It is preferable that both of the transparency of the transparent resin layer having not yet been cured and the transparency of the cured transparent resin layer are high. Furthermore, it is preferable that both of the transmittance of the transparent resin layer having not yet been cured and the transmittance of the cured transparent resin layer are high.

The transfer film of the present invention may be a negative material or a positive material.

In a case where the transfer film of the present invention is a negative material, the resin layer and the transparent resin layer preferably contain metal oxide particles, a binder resin (preferably an alkali-soluble resin), a polymerizable compound, a polymerization initiator, or a polymerization initiating system. Furthermore, additives and the like can be used, but the present invention is not limited thereto.

It is preferable that, in the transfer film of the present invention, the first transparent resin layer and the second transparent resin layer each independently contain a binder, a polymerizable compound, and a photopolymerization initiator.

The method for controlling the refractive index of the transparent resin layer is not particularly limited. It is possible to singly use a transparent resin film having a desired refractive index, to use a transparent resin film to which particles such as metal particles or metal oxide particles are added, or to use a complex of a metal salt and a polymer.

<Particles>

For the purpose of regulating the refractive index or light transmitting properties, the resin layer, preferably the transparent resin layer, preferably contains particles, and more preferably contains metal oxide particles. In a case where the transparent resin layer has the first transparent resin layer and the second transparent resin layer, particularly, the second transparent resin layer preferably contains particles and more preferably contains metal oxide particles. The metal oxide particles have high transparency and high light transmitting properties. Therefore, the metal oxide particles make it possible to obtain a transfer film having a high refractive index and excellent transparency.

It is preferable that the refractive index of the metal oxide particles is higher than the refractive index of a composition consisting of materials of the transparent resin layer excluding the particles.

Specifically, in the transfer film of the present invention, the transparent resin layer (in a case where the transparent resin layer has the first transparent resin layer and the second transparent resin layer, the second transparent resin layer) more preferably contains particles having a refractive index of equal to or higher than 1.50, even more preferably contains particles having a refractive index of equal to or higher than 1.55, particularly preferably contains particles having a refractive index of equal to or higher than 1.70, and most preferably contains particles having a refractive index of equal to or higher than 1.90, with respect to light having a wavelength of 400 to 750 nm.

Having a refractive index of equal to or greater than 1.50 with respect to light having a wavelength of 400 to 750 nm means that the average refractive index with respect to the light having a wavelength within the above range is equal to or higher than 1.50. The refractive index does not need to be equal to or higher than 1.50 with respect to all of the light having the wavelength within the above range. Furthermore, the average refractive index is a value obtained by dividing the sum of measured refractive indices with respect to each light having a wavelength within the above range by the number of measurement spots.

The metal of the metal oxide particles also includes semimetals such as B, Si, Ge, As, Sb, and Te.

As the metal oxide particles that transmit light and has a high refractive index, oxide particles containing an atom of Be, Mg, Ca, Sr, Ba, Sc, Y, La, Ce, Gd, Tb, Dy, Yb, Lu, Ti, Zr, Hf, Nb, Mo, W, Zn, B, Al, Si, Ge, Sn, Pb, Sb, Bi, Te, or the like are preferable, titanium oxide particles, titanium composite oxide particles, zinc oxide particles, zirconium oxide particles, niobium oxide particles, indium/tin oxide particles, or antimony/tin oxide particles are more preferable, and zirconium oxide particles or niobium oxide particles are particularly preferable. In order to impart dispersion stability to these metal oxide particles, the surfaces of the particles may be treated with an organic material.

From the viewpoint of the transparency of the transparent resin layer, the average primary particle size of the metal oxide particles is preferably 1 to 200 nm, and more preferably 3 to 80 nm. The average primary particle size of the particles refers to the arithmetic mean of particle sizes of 200 random particles measured using an electron microscope. In a case where the particle shape is not spherical, the largest outside diameter of the outside diameters of the particles is taken as a particle size.

One kind of the metal oxide particles may be used singly, or two or more kinds thereof may be used in combination.

The content of the metal oxide particles in the transparent resin layer may be appropriately determined in consideration of the refractive index, light transmitting properties, and the like required for an optical member obtained from the transparent resin layer. The content is, with respect to the total solid content of the transparent resin layer, preferably 5% to 80% by mass, more preferably 10% to 75% by mass from the viewpoint of improving substrate adhesiveness of the laminate of the present invention, and even more preferably 10 to 73% by mass. In a case where transparent resin layer has the first transparent resin layer and the second transparent resin layer, the content of the metal oxide is preferably within the above range with respect to the first transparent resin layer and the second transparent resin layer.

In the transfer film of the present invention, the transparent resin layer (in a case where the transparent resin layer has the first transparent resin layer and the second transparent resin layer, the first and second transparent resin layers) preferably contains at least one kind of particles among zirconium oxide particles, niobium oxide particles, and titanium oxide particles from the viewpoint of controlling the refractive index within the above range, and more preferably contains at least one kind of particles between zirconium oxide particles and niobium oxide particles.

<Solvent>

In a case where the resin layer is a non-water-soluble layer, an organic solvent can be generally used. It is preferable that, in the transfer film of the present invention, the non-water-soluble layer is formed by coating by using a coating solution containing an organic solvent. Examples of the organic solvent for dissolving a non-water-soluble binder include methyl ethyl ketone, propylene glycol monomethyl ether, propylene glycol monomethyl ether acetate, cyclohexanone, methyl isobutyl ketone, ethyl lactate, methyl lactate, caprolactam, and the like.

In a case where the resin layer is a water-soluble layer, the solvent is preferably water or a mixed solvent of a lower alcohol having 1 to 3 carbon atoms and water. In the transfer film of the present invention, the water-soluble layer is preferably formed by coating by using a mixed solvent of a lower alcohol having 1 to 3 carbon atoms and water, and more preferably formed by coating by using a coating solution containing water or a mixed solvent in which a content rate of water/alcohol having 1 to 3 carbon atoms is 35/65 to 100/0 in terms of a mass ratio. The content rate of water/alcohol having 1 to 3 carbon atoms is, in terms of a mass ratio, preferably within a range of 38/62 to 98/2, more preferably 39/61 to 97/3 from the viewpoint of improving the coloring of the laminate of the present invention, particularly preferably 40/60 to 95/5 from the viewpoint of improving the substrate adhesiveness of the laminate of the present invention, and most preferably 40/60 to 85/15.

Water, a mixed solvent of water and methanol, and a mixed solvent of water and ethanol are preferable. From the viewpoint of drying and coating properties, a mixed solvent of water and methanol is particularly preferable.

In the present invention, in a case where the resin layer is the transparent resin layer, and the transparent resin layer has the first transparent resin layer and the second transparent resin layer, the first transparent resin layer is preferably a non-water-soluble layer, and the second transparent resin layer is preferably a water-soluble layer.

Particularly, in a case where a mixed solvent of water and methanol is used at the time of forming the second transparent resin layer, a mass ratio (ratio represented by % by mass) of water/methanol is preferably 35/65 to 100/0, more preferably within a range of 38/62 to 98/2, even more preferably 40/60 to 97/3, particularly preferably 40/60 to 95/5, and most preferably 40/60 to 85/15. It is preferable that, in the content rate of water/alcohol having 1 to 3 carbon atoms, the content of methanol is smaller in the range of 40/60 in terms of mass ratio, because then the dissolution of the first transparent resin layer and white turbidity are inhibited.

In a case where the content rate is controlled within the above range, the second transparent resin layer can be formed by coating and rapidly dried without being mixed with the first transparent resin layer.

<Binder>

For the transfer film of the present invention, a known binder used in a resin layer can be used.

The binder which is used in the resin layer and preferably in the transparent resin layer and dissolves in water or a in mixed solvent of a lower alcohol having 1 to 3 carbon atoms and water is not particularly limited as long as the binder does not depart from the gist of the present invention, and can be appropriately selected from known ones.

Examples of the binder include a polyvinyl ether/maleic anhydride polymer, a water-soluble salt of carboxyalkyl cellulose, water-soluble cellulose ethers, a water-soluble salt of carboxyalkyl starch, polyvinyl alcohol, a polyvinyl alcohol derivative such as water-soluble polyvinyl butyral or water-soluble polyvinyl acetal, polyvinyl pyrrolidone, various polyacrylamides, various water-soluble polyamides, a neutralized substance of a carboxyl group-containing polymer such as a water-soluble salt of polyacrylic acid, a neutralized substance of a sulfonic acid group-containing polymer, gelatin, an ethylene oxide polymer, a water-soluble salt of the group consisting of various starch and analogues thereof, a styrene/maleic acid copolymer, a maleate resin, a phosphoric acid polymer, and the like described in JP1971-2121A (JP-S46-2121A) or JP1981-40824B (JP-S56-40824B).

Among these polymers, as the binder contained in the water-soluble layer, polyvinyl pyrrolidone, various polyacrylamides, various water-soluble polyamides, a water-soluble salt of polyacrylic acid, a neutralized substance of a carboxyl group-containing polymer, a neutralized substance of a sulfonic acid group-containing polymer, gelatin, and an ethylene oxide polymer are preferable, polyvinyl pyrrolidone, various polyacrylamides, various water-soluble polyamides, and a compound obtained by neutralizing a carboxyl group-containing polymer such as a water-soluble salt of polyacrylic acid by using ammonium are more preferable.

The resin (referred to as a binder or a polymer as well) which is used in the resin layer and preferably in the transparent resin layer and dissolves in an organic solvent is not particularly limited as long as the resin does not depart from the gist of the present invention, and can be appropriately selected from known ones. The resin is preferably an alkali-soluble resin. As the alkali-soluble resin, it is possible to use the polymers described in paragraph 0025 of JP2011-95716A and paragraphs 0033 to 0052 of JP2010-237589A.

In a case where the transparent resin layer has the first transparent resin layer and the second transparent resin layer, from the viewpoint of preventing the corrosion of metal wiring, the hydroxyl number of the polymer contained in the first transparent resin layer is preferably equal to or less than 40 mgKOH/g.

In a case where the second transparent resin layer is made into an extremely thin layer, the second transparent resin layer is not so negatively affected by the hydroxyl number of the polymer.

The resin layer, preferably the transparent resin layer, may contain polymer latex. The polymer latex mentioned herein is a substance obtained by dispersing fine water-soluble polymer particles in water. The polymer latex is described in, for example, Munekazu Muroi, "Chemistry of Polymer Latex" (published by POLYMER PUBLICATION COMMITTEE (1973)).

As polymer particles that can be used, an acrylic polymer, a vinyl acetate-based polymer, a rubber-based polymer (for example, a styrene-butadiene-based polymer or a chloroprene-based polymer), an olefin-based polymer, a polyester-based polymer, a polyurethane-based polymer, a polystyrene-based polymer, and polymer particles consisting of copolymers of these are preferable.

It is preferable to strengthen the bonding force between polymer chains constituting the polymer particles. Examples of means for strengthening the bonding force between the polymer chains, include a method of using the interaction resulting from hydrogen bonding and a method of generating a covalent bond.

As the means for imparting hydrogen bonding force, a method of introducing a monomer having a polar group into the polymer chain by copolymerization or graft polymerization is preferable. Examples of the polar group include a carboxyl group (contained in acrylic acid, methacrylic acid, itaconic acid, fumaric acid, maleic acid, crotonic acid, partially esterified maleic acid, or the like), a primary amino group, a secondary amino group, a tertiary amino group, an ammonium salt group, a sulfonic acid group (contained in styrene sulfonate or the like), and the like. Among these, a carboxyl group and a sulfonic acid group are particularly preferable. The ratio of the monomer having these polar groups to be copolymerized is, with respect to 100% by mass of the polymer, preferably within a range of 5% to 35% by mass, more preferably within a range of 5% to 20% by mass, and even more preferably within a range of 15% to 20% by mass.

Examples of the means for generating a covalent bond include a method of causing a reaction between a hydroxyl group, a carboxyl group, a primary or secondary amino group, an acetoacetyl group, a sulfonic acid group or the like and an epoxy compound, blocked isocyanate, isocyanate, a vinylsulfone compound, an aldehyde compound, a methylol compound, carboxylic acid anhydride, or the like. Among the polymers for which the above reaction is used, a polyurethane derivative obtained by the reaction between polyols and a polyisocyanate compound is preferable. It is preferable to use polyvalent amine in combination as a chain extender. Particularly, a polymer is preferable which is made into an ionomer by introducing the aforementioned polar group into the polymer chain.

The weight-average molecular weight of the polymer is preferably equal to or greater than 10,000, and more preferably 20,000 to 100,000. Examples of polymers suitable in the present invention include an ethylene ionomer, which is a copolymer of ethylene and methacrylic acid, and a polyurethane ionomer.

The polymer latex which can be used in the present invention may be obtained by emulsification polymerization or by emulsification. The method for preparing the polymer latex is described in, for example, "Emulsion•Latex Handbook" (edited by Editorial Board of Emulsion•Latex Handbook, published by TAISEISHA, LTD. (1975)).

Examples of the polymer latex which can be used in the present invention include those obtained by neutralizing an aqueous dispersion of a polyethylene ionomer (trade name: CHEMIPEARL S120, manufactured by Mitsui Chemicals, Inc., solid content 27%; trade name: CHEMIPEARL S100, manufactured by Mitsui Chemicals, Inc., solid content 27%; trade name: CHEMIPEARL S111, manufactured by Mitsui Chemicals, Inc., solid content 27%; trade name: CHEMIPEARL S200, manufactured by Mitsui Chemicals, Inc., solid content 27%; trade name: CHEMIPEARL S300, manufactured by Mitsui Chemicals, Inc., solid content 35%; trade name: CHEMIPEARL S650, manufactured by Mitsui Chemicals, Inc., solid content 27%; trade name: CHEMIPEARL S75N, manufactured by Mitsui Chemicals, Inc., solid content 24%), an aqueous dispersion of polyether-based polyurethane (trade name: HYDRAN WLS-201, manufactured by DIC Corporation, solid content 35%, Tg-50° C.; trade name: HYDRAN WLS-202, manufactured by DIC Corporation, solid content 35%, Tg-50° C.; trade name: HYDRAN WLS-221, manufactured by DIC Corporation, solid content 35%, Tg-30° C.; trade name: HYDRAN WLS-210, manufactured by DIC Corporation, solid content 35%, Tg-15° C.; trade name: HYDRAN WLS-213, manufactured by DIC Corporation, solid content 35%, Tg-15° C.; trade name: HYDRAN WLI-602, manufactured by DIC Corporation, solid content 39.5%, Tg-50° C.; trade name: HYDRAN WLI-611, manufactured by DIC Corporation, solid content 39.5%, Tg-15° C.), acrylic acid alkyl copolymer ammonium (trade name: JURYMER AT-210, manufactured by TOAGOSEI CO., LTD.), acrylic acid alkyl copolymer ammonium (trade name: JURYMER ET-410, manufactured by TOAGOSEI CO., LTD.), acrylic acid alkyl copolymer ammonium (trade name: JURYMER AT-510, manufactured by TOAGOSEI CO., LTD.), or polyacrylic acid (trade name: JURYMER AC-10L, manufactured by TOAGOSEI CO., LTD.) by using ammonia and emulsifying the neutralized resultant.

<Polymerizable Compound>

As the polymerizable compound used in the water-soluble layer or in the non-water-soluble layer, the polymerizable compounds described in paragraphs 0023 and "0024" of JP4098550B or ammonium salts of acid group-containing monomers can be used. Among these, it is possible to preferably use pentaerythritol tetraacrylate, pentaerythritol triacrylate, tetraacrylate of pentaerythritol ethylene oxide (EO) adduct, and ammonium salts of acid group-containing monomers. These polymerizable compounds may be used singly, or a plurality of polymerizable compounds described above may be used in combination. In a case where a mixture of pentaerythritol tetraacrylate and pentaerythritol triacrylate is used, a proportion of the pentaerythritol triacrylate is preferably 0% to 80% and more preferably 10% to 60% in terms of mass ratio.

Specific examples of the polymerizable compound in the present invention include a water-soluble polymerizable compound represented by the following Structural Formula 1, a pentaerythritol tetraacrylate mixture (NK ESTER A-TMMT, manufactured by SHIN-NAKAMURA CHEMICAL CO., LTD., containing 10% triacrylate as an impurity), a mixture of pentaerythritol tetraacrylate and triacrylate (NK ESTER A-TMM3LM-N, manufactured by SHIN-NAKAMURA CHEMICAL CO., LTD., 37% triacrylate), a mixture of pentaerythritol tetraacrylate and triacrylate (NK ESTER A-TMM-3L, manufactured by SHIN-NAKAMURA CHEMICAL CO., LTD., 55% triacrylate), a mixture of pentaerythritol tetraacrylate and triacrylate (NK ESTER A-TMM3, manufactured by SHIN-NAKAMURA CHEMICAL CO., LTD., 57% triacrylate), tetraacrylate of pentaerythritol ethylene oxide (EO) adduct (KAYARAD RP-1040, manufactured by Nippon Kayaku Co., Ltd.), a compound obtained by neutralizing ARONIX M-520 (manufactured by TOAGOSEI CO., LTD.), which is a monomer modified with carboxylic acid, or TO2349 (manufactured by TOAGOSEI CO., LTD.) by using ammonium, a phosphoric acid monomer (JPA-514, manufactured by JOHOKU CHEMICAL CO., LTD.), and the like.

Among these, as the polymerizable compound used in the water-soluble layer, from the viewpoint of improving the reticulation of the transfer film of the present invention, by concurrently using a lower alcohol having 1 to 4 carbon atoms as a solvent in addition to the water-soluble polymerizable compound represented by the following Structural Formula 1, it is also possible to preferably use a pentaerythritol tetraacrylate mixture (NK ESTER A-TMMT, manufactured by SHIN-NAKAMURA CHEMICAL CO., LTD.), a mixture of pentaerythritol tetraacrylate and triacrylate (NK ESTER A-TMM3LM-N, manufactured by SHIN-NAKAMURA CHEMICAL CO., LTD., 37% triacrylate), a mixture of pentaerythritol tetraacrylate and triacrylate (NK ESTER A-TMM-3L, manufactured by SHIN-NAKAMURA CHEMICAL CO., LTD., 55% triacrylate), a compound obtained by neutralizing ARONIX M-520 (manufactured by TOAGOSEI CO., LTD.), which is a monomer modified with carboxylic acid, or TO2349 (manufactured by TOAGOSEI CO., LTD.) by using ammonium, a phosphoric acid monomer (JPA-514, manufactured by JOHOKU CHEMICAL CO., LTD.), and the like.

Structural Formula 1

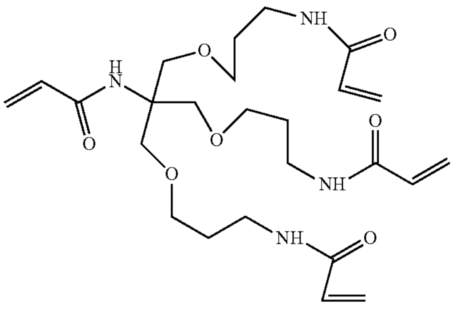

Other polymerizable compounds used in the water-soluble layer include polymerizable compounds dissolving in water or in a mixed solvent of a lower alcohol having 1 to 3 carbon atoms and water. As these polymerizable compounds, it is possible to use a hydroxyl group-containing monomer and a monomer having an ethylene oxide, polypropylene oxide, or a phosphoric acid group in a molecule.

Examples of the polymerizable compound used in the non-water-soluble layer include tricyclodecane dimethanol di(meth)acrylate, polyethylene glycol di(meth)acrylate, polypropylene glycol di(meth)acrylate, trimethylol ethane tri(meth)acrylate, trimethylol propane tri(meth)acrylate, trimethylol propane di(meth)acrylate, neopentyl glycol di(meth)acrylate, pentaerythritol tetra(meth)acrylate, pentaerythritol tri(meth)acrylate, dipentaerythritol hexa(meth) acrylate, dipentaerythritol penta(meth)acrylate, hexanediol di(meth)acrylate, trimethylolpropane tri((meth)acryloyloxypropyl)ether, tri((meth)acryloyloxyethyl)isocyanurate, tri ((meth)acryloyloxyethyl)cyanurate, glycerin tri(meth)acrylate, trimethylolpropane, glycerin, a compound obtained by causing an addition reaction between a polyfunctional alcohol such as bisphenol and ethylene oxide or propylene oxide and then (meth)acrylating the resultant, urethane acrylates described in JP1973-41708B (JP-S48-41708B), JP1975-6034B (JP-S50-6034B), JP1976-37193A (JP-S51-37193A), and the like; polyester acrylates described in JP1973-64183A (JP-S48-64183A), JP1974-43191B (JP-S49-43191B), JP1977-30490B (JP-S52-30490B), and the like; polyfunctional acrylate or methacrylate such as epoxy acrylates which are reaction products of an epoxy resin and (meth)acrylic acid; and the like. Among these, it is possible to preferably use tricyclodecane dimethanol di(meth)acrylate, trimethylol propane tri(meth)acrylate, pentaerythritol tetra(meth)acrylate, dipentaerythritol hexa(meth)acrylate, a mixture of dipentaerythritol penta(meth)acrylate and pentaerythritol tetraacrylate (NK ESTER A-TMMT, manufactured by SHIN-NAKAMURA CHEMICAL CO., LTD.), and tetraacrylate (KAYARAD RP-1040, manufactured by Nippon Kayaku Co., Ltd.) of pentaerythritol ethylene oxide (EO) adduct. One kind of these may be used singly, or two or more kinds thereof may be used in combination.

<Photopolymerization Initiator>

As the photopolymerization initiator dissolving in water or in a mixed solvent of a lower alcohol having 1 to 3 carbon atoms and water, IRGACURE 2959 (manufactured by BASF SE) or an initiator represented by the following Structural Formula 3 can be used.

Structural Formula 3

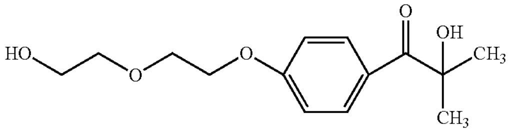

As the photopolymerization initiator or the polymerization initiating system used in the non-water-soluble layer, the photopolymerization initiators described in paragraphs 0031 to 0042 of JP2011-95716A can be used. For example, it is possible to preferably use 1,2-octanedione, 1-[4-(phenylthio)-,2-(O-benzoyloxime)] (trade name; IRGACURE OXE-01, manufactured by BASF SE), ethanone,1-[9-ethyl-6-(2-methylbenzoyl)-9H-carbazol-3-yl]-,1-(0-acetyloxime) (trade name: IRGACURE OXE-02, manufactured by BASF SE), 2-(dimethylamino)-2-[(4-methylphenyl)methyl]-1-[4-(4-morpholinyl)phenyl]-1-butanone (trade name: IRGACURE 379EG; manufactured by BASF SE), 2-methyl-1-(4-methylthiophenyl)-2-morpholinopropan-1-one (trade name: IRGACURE 907, manufactured by BASF SE), 2-hydroxy-1-{4-[4-(2-hydroxy-2-methyl-propionyl)-benzyl]phenyl}-

2-methyl-propan-1-one (trade name: IRGACURE 127, manufactured by BASF SE), 2-benzyl-2-methylamino-1-(4-morpholinophenyl)-butanone-1 (trade name: IRGACURE 369, manufactured by BASF SE), 2-hydroxy-2-methyl-1-phenyl-propan-1-one (trade name: IRGACURE 1173, manufactured by BASF SE), 1-hydroxy-cyclohexyl-phenyl-ketone (trade name: IRGACURE 184, manufactured by BASF SE), 2,2-dimethoxy-1,2-diphenylethan-1-one (trade name: IRGACURE 651, manufactured by BASF SE), an oxime ester-based photopolymerization initiator (trade name: Lunar 6, manufactured by DKSH Japan K. K.), and the like.

The resin (referred to as a binder or polymer as well) or other additives used in the resin film in addition to the binder or the like dissolving in water or in the mixed solvent of a lower alcohol having 1 to 3 carbon atoms and water are not particularly limited as long as the resin or the additives do not depart from the gist of the present invention.

In the resin layer, additives may be used. Examples of the additives include the surfactants described in paragraph 0017 of JP4502784B and paragraphs 0060 to 0071 of JP2009-237362A, the thermal polymerization inhibitors described in paragraph 0018 of JP4502784B, and other additives described in paragraphs 0058 to 0071 of JP2000-310706A.

Hitherto, a case where the transfer film of the present invention is a negative material has been mainly described, but the transfer film of the present invention may be a positive material. In a case where the transfer film of the present invention is a positive material, in the resin layer, for example, the materials described in JP2005-221726A and the like are used, but the present invention is not limited thereto.

<Transparent Resin Layer>

In the transfer film of the present invention, the resin layer is preferably a transparent resin layer. In a case where the transparent resin layer is a single layer (one layer) and uniform in the film thickness direction, the refractive index of the transparent resin layer is preferably 1.50 to 1.60, more preferably 1.51 to 1.59, and even more preferably 1.52 to 1.57. In a case where the refractive index is within the above range, the visibility of the transparent electrode is improved.

In order to make the refractive index fall into the above range, the transparent resin layer preferably contains the aforementioned particles, and more preferably contains particles having a refractive index of equal to or higher than 1.55.

The dry film thickness of the transparent resin layer is preferably equal to or greater than 1 μm, more preferably 1 to 15 μm, even more preferably 2 to 12 μm, and particularly preferably 3 to 10 μm.

The transparent resin layer is more preferably a transparent resin layer which is prepared such that the refractive index continuously varies in the thickness direction, the refractive index of a surface contacting the cover film is high, and the refractive index of a surface contacting the temporary support is low. By means of impregnating the first transparent resin layer with a coating solution for a second transparent resin layer, the refractive index can be controlled by the acid value of the binder used in the first transparent resin layer and by the pH of the coating solution for a second transparent resin layer.

<Refractive Index in Transfer Film and Method for Measuring Dry Film Thickness>

In a case where the transparent resin layer is a single layer (one layer) and uniform in the film thickness direction, the refractive index of the transparent resin layer can be determined as below by using a reflection spectroscopic film thickness meter FE-3000 (manufactured by OTSUKA ELECTRONICS Co., Ltd.). Hereinafter, the refractive index will be measured under the condition of 25° C.

(1) A temporary support is prepared and cut in 10 cm (length)×10 cm (width). A black polyethylene terephthalate (PET) material is brought into contact with one surface of the cut temporary support through a transparent adhesive tape (Optically Clear Adhesive Tape (OCA tape)) 8171CL: manufactured by 3M), thereby preparing a laminate (first laminate). By using the reflection spectroscopic film thickness meter FE-3000, the reflection spectrum (wavelength: 430 to 800 nm) of the first laminate is evaluated, and a refractive index $n_0$ of the temporary support at each wavelength is determined.

(2) A sample in which only a transparent resin layer is formed on a temporary support is prepared and cut in 10 cm (length)×10 cm (width). A black PET material is brought into contact with the surface of the temporary support of the cut sample through a transparent adhesive tape (OCA tape 8171CL: manufactured by 3M), thereby preparing a laminate (second laminate). By using a transmission electron microscope (TEM), the structure of the second laminate is analyzed. At 10 points within the first transparent resin layer, dry film thicknesses are measured, the average is calculated, and a first estimated value $T_1$(I) of the average of the dry film thicknesses of the first transparent resin layer is determined. Furthermore, by using the reflection spectroscopic film thickness meter FE-3000, the reflection spectrum (wavelength: 430 to 800 nm) of the second laminate is evaluated. A refractive index $n_1$ of the transparent resin layer at each wavelength and a second estimated value $T_1$(II) of the average of the dry film thicknesses of the transparent resin layer are determined. At this time, the reflection that occurs in the interface between the first transparent resin layer and the temporary support is taken into consideration. Accordingly, in a state where the value of refractive index $n_0$ determined in the aforementioned section (1) and the first estimated value $T_1$(I) are plugged into a calculation formula, the refractive index $n_1$ determined from the reflection spectrum of the second laminate and the second estimated value $T_1$(II) are obtained by fitting through simulation calculation.

<Constitution of First Transparent Resin Layer>

The transfer film of the present invention preferably has a first transparent resin layer and a second transparent resin layer as the transparent resin layer. The refractive index of the first transparent resin layer is preferably 1.50 to 1.53, more preferably 1.50 to 1.52, and even more preferably 1.51 to 1.52.

In the transfer film of the present invention, from the viewpoint of making the first transparent resin layer perform a sufficient surface protection function at the time of forming a transparent protective layer of a capacitance-type input device by using the first transparent resin layer, the dry film thickness of the first transparent resin layer is preferably equal to or greater than 1 μm, more preferably 1 to 15 μm, even more preferably 2 to 12 μm, and particularly preferably 3 to 10 μm.

It is preferable that the dry film thickness is within the above range, because then the occurrence of lamination bubbles can be inhibited, a transfer film that can form a laminate remaining unproblematic even after a moist heat test can be provided, and winding wrinkles or cracking of the transfer film is inhibited.

The first transparent resin layer is preferably a curable resin and a film being flexible to some extent before curing. Particularly, an aspect is preferable in which the first transparent resin layer contains at least one kind of material selected from organic polymer substances whose softening point measured by a Vicat method (specifically, a method for measuring the softening point of a polymer according to America material testing method, ASTMD1235) is equal to or lower than 80° C.

As the material of the first transparent resin layer, any of polymer components or any of polymerizable compound components can be used without particular limitation. From the viewpoint of using the first transparent resin layer as a transparent protective film of a capacitance-type input device, the materials having a high surface hardness and heat resistance after curing are preferable. Among the alkali-soluble resins or the polymerizable compounds contained in the first transparent resin layer and the second transparent resin layer, known photosensitive siloxane resin materials, acryl resin materials, and the like are preferably used.

In the transfer film of the present invention, the first transparent resin layer preferably contains a polymerizable compound and a photopolymerization initiator. In a case where the first transparent resin layer contains these, the patterns of the first transparent resin layer and the second transparent resin layer can be easily formed.

The amount of the photopolymerization initiator contained in the first transparent resin layer is, with respect to the solid content of the first transparent resin layer, preferably equal to or greater than 1% by mass and more preferably equal to or greater than 2% by mass. It is preferable that the amount of the photopolymerization initiator contained in the first transparent resin layer is equal to or less than 10% by mass with respect to the solid content of the first transparent resin layer. From the viewpoint of improving the patterning properties, coloring properties, and substrate adhesiveness of the laminate of the present invention, the amount is more preferably equal to or less than 5% by mass.

The first transparent resin layer may or may not contain the metal oxide particles. In order to control the refractive index of the first transparent resin layer within the aforementioned range, the first transparent resin layer can contain the metal oxide particles at any ratio, according to the type of the polymer or the polymerizable compound to be used. The amount of the metal oxide particles contained in the first transparent resin layer is, with respect to the solid content of the first transparent resin layer, preferably 0% to 35% by mass, and more preferably 0% to 10% by mass. It is particularly preferable that the first transparent resin layer does not contain the metal oxide particles.

<Method for Measuring Refractive Index and Dry Film Thickness in Transfer Film>

In the present invention, in a case where the transparent resin layer includes a first transparent resin layer and a second transparent resin layer, the refractive index of the first transparent resin layer, the dry film thickness of the first transparent resin layer, and the refractive index of the second transparent resin layer which will be described later can be determined as below by using a reflection spectroscopic film thickness meter FE-3000 (manufactured by OTSUKA ELECTRONICS Co., Ltd.). Hereinafter, the refractive index will be measured under the condition of 25° C.

(1) A temporary support is prepared and cut in 10 cm (length)×10 cm (width). A black polyethylene terephthalate (PET) material is brought into contact with one surface of the cut temporary support through a transparent adhesive tape (Optically Clear Adhesive Tape (OCA tape)) 8171CL: manufactured by 3M), thereby preparing a laminate (first laminate). By using the reflection spectroscopic film thickness meter FE-3000, the reflection spectrum (wavelength: 430 to 800 nm) of the first laminate is evaluated, and a refractive index $n_0$ of the temporary support at each wavelength is determined.

(2) A sample in which only a transparent resin layer is formed on a temporary support is prepared and cut in 10 cm (length)×10 cm (width). A black PET material is brought into contact with the surface of the temporary support of the cut sample through a transparent adhesive tape (OCA tape 8171CL: manufactured by 3M), thereby preparing a laminate (second laminate). By using a transmission electron microscope (TEM), the structure of the second laminate is analyzed. At 10 points within the first transparent resin layer, dry film thicknesses are measured, the average is calculated, and a first estimated value $T_1$(I) of the average of the dry film thicknesses of the first transparent resin layer is determined. Furthermore, by using the reflection spectroscopic film thickness meter FE-3000, the reflection spectrum (wavelength: 430 to 800 nm) of the second laminate is evaluated. A refractive index $n_1$ of first the transparent resin layer at each wavelength and a second estimated value $T_1$(II) of the average of the dry film thicknesses of the first transparent resin layer are determined. At this time, the reflection that occurs in the interface between the first transparent resin layer and the temporary support is taken into consideration. Accordingly, in a state where the value of refractive index $n_0$ determined in the aforementioned section (1) and the first estimated value $T_1$(I) are plugged into a calculation formula, the refractive index $n_1$ determined from the reflection spectrum of the second laminate and the second estimated value $T_1$(II) are obtained by fitting through simulation calculation.

(3) A transfer film in which a first transparent resin layer and a second transparent resin layer are formed on a temporary support is prepared and cut in 10 cm (length)×10 cm (width) (in a case where the transfer film has a protective film, the protective film is peeled). A black PET material is brought into contact with the surface of the temporary support of the cut transfer film through a transparent adhesive tape (OCA tape 8171CL: manufactured by 3M), thereby preparing a sample piece (third laminate). By using a transmission electron microscope (TEM), the structure of the sample piece is analyzed. At 10 points within the first transparent resin layer, dry film thicknesses are measured, the average is calculated, and an estimated value $T_2$(I) of the average of the dry film thicknesses of the second transparent resin layer is determined. Furthermore, for the sample piece, by using the reflection spectroscopic film thickness meter FE-3000, reflection spectra of 200 measurement spots having a diameter φ of 40 μm on a straight line (that is, the line 4 cm long) in an arbitrary direction are evaluated at an interval of 0.2 mm. The evaluation is performed on 5 lines (1 cm intervals) in a direction orthogonal to the direction of the aforementioned straight line such that the evaluation is repeated for 1,000 spots in total. At this time, the reflection that occurs in the interface between the first transparent resin layer and the temporary support and the reflection that occurs in the interface between the second transparent resin layer and the first transparent resin layer are considered. Accordingly, in a state where the refractive index $n_0$ determined in the aforementioned section (1), the refractive index $n_1$ and the second estimated value $T_1$(II) determined in the aforementioned section (2), and the first estimated value $T_1$(I) are plugged into a calculation formula, from the reflection spectrum of the third laminate, the refractive index $n_1$ of the second transparent resin layer and the dry film thicknesses of the second transparent resin layer and the first transparent resin layer at 1,000 measurement spots are determined by fitting through simulation calculation. In addition, the average, the maximum value, the minimum value, and the standard deviation of the dry film thicknesses of the second transparent resin layer and the first transparent resin layer are calculated, thereby determining $n_1$, $n_2$, $T_1$, $T_2$, $\sigma_2$, and $H_2$. $n_2$ represents the refractive index of the second transparent resin layer, $n_1$ represents the refractive index of the first transparent resin layer, $T_2$ represents the average dry film thickness of the second transparent resin layer, $T_1$ represents the average dry film thickness of the first transparent resin layer, o represents the standard deviation of the dry film thickness of the second transparent resin layer, and $H_2$ represents a difference between the maximum dry film thickness and the minimum dry film thickness of the second transparent resin layer.

Regarding the dry film thickness of the second transparent resin layer and the dry film thickness of the first transparent resin layer, by inputting the estimated values obtained by analyzing the structure by using TEM into the reflection spectroscopic film thickness meter, the fitting accuracy of the simulation can be heightened.

In a case where the transfer film of the present invention has a third transparent resin layer which will be described later, the dry film thickness and the refractive index of the third transparent resin layer can be calculated in the same manner as described above by preparing a transfer film, in which the first transparent resin layer, the second transparent resin layer, and the third transparent resin layer are formed on the temporary support.

<Constitution of Second Transparent Resin Layer>

The transfer film of the present invention preferably has the first transparent resin layer and the second transparent resin layer. The refractive index of the second transparent resin layer adjacent to and disposed on the first transparent resin layer is preferably higher than the refractive index of the first transparent resin layer, and is preferably equal to or higher than 1.60.

In a case where the refractive index of the first transparent resin layer is denoted by $n_1$, and the refractive index of the second transparent resin layer is denoted by $n_2$, $n_2-n_1$ preferably equals 0.03 to 0.30 and more preferably equals 0.05 to 0.20.

In the transfer film of the present invention, the refractive index of the second transparent resin layer is preferably equal to or higher than 1.60.

The upper limit of the refractive index of the second transparent resin layer is not particularly limited, but is preferably equal to or lower than 1.78 for practical use. The upper limit may be equal to or lower than 1.74.

In the transfer film of the present invention, the dry film thickness of the second transparent resin layer is preferably equal to or less than 500 nm, and more preferably equal to or less than 110 nm. The thickness of the second transparent resin layer is even more preferably 55 to 100 nm, particularly preferably 60 to 100 nm, and most preferably 70 to 100 nm.

From the viewpoint of improving the film strength or the like by curing, the second transparent resin layer in the transfer film of the present invention preferably contains a polymerizable compound. As the material of the second transparent resin layer, known photosensitive siloxane resin materials, acryl resin materials, and the like are preferably used.

The second transparent resin layer may or may not contain metal oxide particles. However, from the viewpoint of controlling the refractive index of the second transparent resin layer within the above range, the second transparent resin layer preferably contains metal oxide particles. The second transparent resin layer can contain metal oxide particles at any ratio according to the type of the polymer or polymerizable compound to be used. The amount of the metal oxide particles contained in the second transparent resin layer is, with respect to the solid content of the second transparent resin layer, preferably 40% to 95% by mass, more preferably 55% to 95% by mass, even more preferably 62% to 90% by mass from the viewpoint of improving the cracking of the transfer film of the present invention, particularly preferably 62% to 75% by mass from the viewpoint of further improving the cracking of the transfer film of the present invention and improving the substrate adhesiveness of the laminate of the present invention, and most preferably 62% to 73% by mass.

<Third Transparent Resin Layer>

In the transfer film of the present invention, a third transparent resin layer may be provided on the second transparent resin layer.

In a case where the second transparent resin layer is water-soluble, it is preferable that the third transparent resin layer is non-water-soluble. In a case where the second transparent resin layer is non-water-soluble, it is preferable that the third transparent resin layer is water-soluble.

The refractive index of the third transparent resin layer is preferably equal to or higher than 1.60.

The upper limit of the refractive index of the third transparent resin layer is not particularly limited, but is preferably equal to or lower than 1.78 for practical use and more preferably equal to or lower than 1.74.

In the transfer film of the present invention, the dry film thickness of the third transparent resin layer is preferably equal to or less than 500 nm, and more preferably equal to or less than 110 nm. The thickness of the third transparent resin layer is even more preferably 55 to 100 nm, particularly preferably 60 to 100 nm, and most preferably 70 to 100 nm.

In the transfer film of the present invention, from the viewpoint of improving the film strength or the like by curing, the third transparent resin layer preferably contains a polymerizable compound.

The third transparent resin layer may or may not contain metal oxide particles. However, from the viewpoint of controlling the refractive index of the third transparent resin layer within the above range, the third transparent resin layer preferably contains metal oxide particles. The third transparent resin layer can contain metal oxide particles at any ratio according to the type of the polymer or polymerizable compound to be used. The amount of the metal oxide particles contained in the third transparent resin layer is, with respect to the solid content of the third transparent resin layer, preferably 40% to 95% by mass, more preferably 55% to 95% by mass, and even more preferably 82% to 90% by mass.

(Thermoplastic Film Layer)

In the transfer film of the present invention, a thermoplastic resin layer may be provided between the temporary support and the resin layer (preferably the transparent resin layer). The use of the transfer film having the thermoplastic resin layer makes it difficult for image unevenness to occur in an image display device and makes it possible to obtain excellent display characteristics.

The thermoplastic resin layer is preferably alkali-soluble. The thermoplastic resin layer plays a role of a cushioning material that can cover irregularities (including irregularities resulting from an image or the like that has already been formed) of the surface of the base. The thermoplastic resin layer preferably has properties of being able to be deformed along the irregularities on the surface of a subject.

For the thermoplastic resin layer, an aspect is preferable in which the thermoplastic resin layer contains the organic polymer substance described in JP1993-72724A (JP-H05-72724A) as a component, and an aspect is particularly preferable in which the thermoplastic resin layer contains at least one kind of substance selected from organic polymer substances whose softening point measured by a Vicat method (specifically, a method for measuring the softening point of a polymer according to America material testing method, ASTMD1235) is equal to or lower than 80° C.

Specifically, examples of the organic polymer substances include organic polymers like polyolefin such as polyethylene or polypropylene, a copolymer of ethylene and vinyl acetate or a saponified product thereof, a copolymer of ethylene and an acrylic acid ester or a saponified product thereof, a copolymer of polyvinyl chloride or vinyl chloride and vinyl acetate or a saponified product thereof, polyvinylidene chloride, a vinylidene chloride copolymer, polystyrene, a copolymer of styrene and a (meth)acrylic acid ester or a saponified product thereof, polyvinyl toluene, a copolymer of vinyl toluene and a (meth)acrylic acid ester or a saponified product thereof, a poly(meth)acrylic acid ester, a copolymer of butyl (meth)acrylate and vinyl acetate and the like, a vinyl acetate copolymer, nylon, copolymerized nylon, a polyamide resin such as N-alkoxymethylated nylon and N-dimethylaminated nylon.

The thickness of the thermoplastic resin layer is preferably 3 to 30 μm. In a case where the thickness of the thermoplastic resin layer is equal to or greater than 3 μm, the thermoplastic resin layer exhibits excellent conformity at the time of lamination and can excellently cover the irregularities on the surface of the base. In a case where the thickness is equal to or less than 30 μm, at the time of forming the thermoplastic resin layer on the temporary support, drying (removal of a solvent) becomes easy, the time taken for developing the thermoplastic resin layer is shortened, and the process suitability becomes excellent. The thickness of the thermoplastic resin layer is more preferably 4 to 25 μm, and even more preferably 5 to 20 μm.

The thermoplastic resin layer can be formed by coating or the like by using a prepared solution containing a thermoplastic organic polymer. The prepared solution used at the time of coating or the like can be prepared using a solvent. The solvent is not particularly limited as long as it can dissolve a polymer component constituting the thermoplastic resin layer, and examples thereof include methyl ethyl ketone, cyclohexanone, propylene glycol monomethyl ether acetate (MMPGAc), n-propanol, 2-propanol, and the like.

<Viscosity of Thermoplastic Resin Layer and Photocurable Resin Layer>

The viscosity of the thermoplastic resin layer measured at 100° C. is preferably within a range of 1,000 to 10,000 Pa·sec, and the viscosity of the transparent resin layer measured at 100° C. is preferably within a range of 2,000 to 50,000 Pa·sec.

(Interlayer)

In the transfer film of the present invention, an interlayer may be provided between the thermoplastic resin layer and the resin layer. The interlayer is described as a "separation layer" in JP1993-72724A (JP-H05-72724A).

Figure 13:
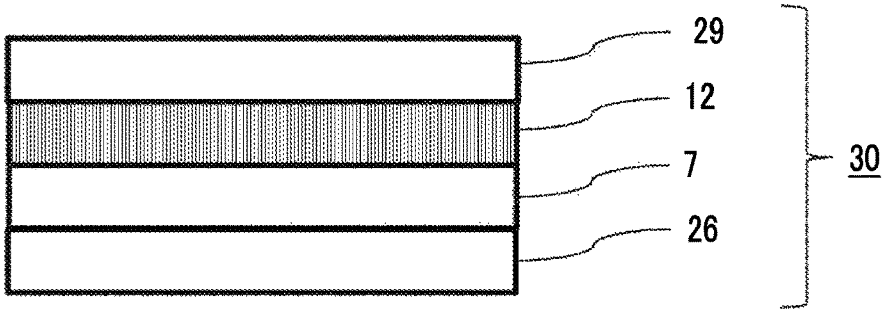
FIG. 13 is a schematic cross-sectional view showing an example of a constitution of a transfer film of the present invention.

FIG. 13 shows an example of a preferred constitution of the transfer film of the present invention. FIG. 13 is a schematic view of the transfer film 30 of the present invention constituted with a temporary support 26, a first transparent resin layer 7, a second transparent resin layer 12, and a cover film 29 in this order that are adjacent to and laminated on each other.

(Method for Manufacturing Transfer Film)

The transfer film of the present invention can be prepared based on the method for preparing a photosensitive transfer material described in paragraphs 0094 to 0098 of JP2006-259138A. Particularly, the transfer film of the present invention is preferably manufactured by the following method for manufacturing a transfer film of the present invention.

That is, the method for manufacturing a transfer film of the present invention includes a step of laminating a resin layer on a temporary support and a step of laminating a cover film on the resin layer in this order. When the cover film is peeled from the resin layer, a surface of the cover film that contacted the resin layer preferably has surface roughnesses SRz and SRa of equal to or less than 130 nm and equal to or less than 8 nm respectively that are measured based on JIS-B0601-2001. The resin layer is preferably a transparent resin layer.

In the method for manufacturing a transfer film of the present invention, the step of laminating a resin layer on a temporary support preferably includes a step of forming a first transparent resin layer on the temporary support, and a step of directly forming a second transparent resin layer on the first transparent resin layer. Furthermore, it is preferable that any one of the first transparent resin layer and the second transparent resin layer is formed by coating by using a coating solution containing water or a mixed solvent in which a content rate of water/alcohol having 1 to 3 carbon atoms is 35/65 to 100/0 in terms of a mass ratio, and the other layer is formed by coating by using a coating solution containing an organic solvent. The refractive index of the second transparent resin layer is preferably higher than the refractive index of the first transparent resin layer. The refractive index of the second transparent resin layer is preferably equal to or higher than 1.60.

According to the constitution described above, by clarifying the interface between the first transparent resin layer and the second transparent resin layer, the visibility of a transparent electrode pattern can be further improved. Furthermore, it is preferable that any one of the first and second transparent resin layers is formed by coating by using a coating solution containing water or a mixed solvent in which a content rate of water/alcohol having 1 to 3 carbon atoms is 35/65 to 100/0 in terms of a mass ratio, and the other layer is formed by coating by using a coating solution containing an organic solvent, because then even if the second transparent resin layer is laminated after the lamination of the first transparent resin layer without curing, the layers are excellently fractionated, the visibility of a transparent electrode pattern can be improved, and a desired pattern can be developed by photolithography after the refractive index adjusting layer (that is, the first and second transparent resin layer) is transferred onto the transparent electrode pattern from the transfer film.

The method for manufacturing a transfer film of the present invention preferably further includes a step of forming a thermoplastic resin layer before forming the resin layer on the temporary support.

The method for manufacturing a transfer film of the present invention preferably further includes, after the step of forming a thermoplastic resin layer, a step of forming an interlayer between the thermoplastic resin layer and the resin layer. Specifically, in a case where a transfer film having an interlayer is formed, the transfer film can be suitably prepared by a method in which a temporary support is coated with a solution (coating solution for a thermoplastic resin layer), in which both of the thermoplastic organic polymer and additives are dissolved, and the solution is dried such that a thermoplastic resin layer is provided; the thermoplastic resin layer is then coated with a prepared solution (coating solution for an interlayer), which is prepared by adding a resin or additives to a solvent that does not dissolve the thermoplastic resin layer, and the solution is dried such that an interlayer is laminated; and the interlayer is coated with a coating solution for a resin layer, which is prepared by using a solvent that does not dissolve the interlayer, and the solution is dried such that a resin layer is laminated.

2. Laminate and Method for Manufacturing Same

The laminate of the present invention has a base material, an electrode for a touch panel (hereinafter, referred to as a "transparent electrode pattern" as well) positioned on the base material, and a resin layer disposed on the electrode for a touch panel.

It is preferable that the electrode for a touch panel directly contacts the resin layer.

The method for manufacturing a laminate of the present invention includes a step of laminating the resin layer of the transfer film of the present invention on the transparent electrode pattern position on the base material. The laminate of the present invention is preferably a transparent laminate, and the method for manufacturing the transparent laminate includes a step of laminating the transparent resin layer of the transfer film of the present invention on the transparent electrode pattern.

In the aforementioned step, it is preferable that the transparent resin layer of the transfer film of the present invention is laminated on the transparent electrode pattern such that they contact each other.

The transparent laminate refers to a laminate in which at least a portion is transparent. It is preferable that a portion of area including the transparent electrode pattern, which will be described later, is transparent. Regarding the laminate, being transparent means that the transmittance of the laminate is equal to or higher than 80%. As the transmittance, it is possible to use a value measured within a wavelength range of 400 to 780 nm at a pitch of 1 nm.

In a case where the transmittance is measured at a pitch of 1 nm, the minimum value of the transmittance measured at 400 to 450 nm is referred to as "a transmittance within a range of 400 to 450 nm", and the minimum value of the transmittance measured at 450 to 780 nm is referred to as a "transmittance within a range of 450 to 780 nm". It is preferable that both of the transmittance within a range of 400 to 450 nm and the transmittance within a range of 450 nm to 780 nm are equal to or higher than 80%. It is more preferable that the transmittance within a range of 400 to 450 nm is equal to or higher than 90%, and the transmittance within a range of 450 to 780 nm is equal to or higher than 95%. It is even more preferable that the transmittance within a range of 400 to 450 nm is equal to or higher than 95%, and the transmittance within a range of 450 to 780 nm is equal to or higher than 97%.

According to the aspect described above, the visibility of the transparent electrode pattern can be reduced.

The laminate of the present invention is obtained by the aforementioned method for manufacturing a laminate of the present invention, and has the transparent electrode pattern and a resin layer.

Furthermore, the laminate of the present invention is obtained by the aforementioned method for manufacturing a laminate of the present invention, and has the transparent electrode pattern and the transparent resin layer adjacent to and disposed on the transparent electrode pattern. In a case where this constitution is adopted, the problem in that the transparent electrode pattern becomes visible can be solved.

In addition, the laminate of the present invention preferably has the transparent electrode pattern, the second transparent resin layer adjacent to and disposed on the transparent electrode pattern, and the first transparent resin layer adjacent to and disposed on the second transparent resin layer. The refractive index of the second transparent resin layer is preferably higher than the refractive index of the first transparent resin layer, and the refractive index of the second transparent resin layer is more preferably equal to or higher than 1.60.

It is preferable that the laminate of the present invention is excellently colored. That is, it is preferable that the laminate does not appear yellowish. Furthermore, it is preferable that the laminate of the present invention has excellent substrate adhesiveness.

Hereinafter, a case where the laminate of the present invention is a transparent laminate will be mainly described, but the present invention is not limited thereto.

(Constitution of Transparent Laminate)

From the viewpoint of further improving the visibility of the transparent electrode pattern, it is preferable that the transparent laminate of the present invention further has a transparent film having a refractive index of 1.60 to 1.78 and a film thickness of 55 to 110 nm, on a side of the transparent electrode pattern that is opposite to the side on which the transparent resin layer is formed. In the present specification, unless otherwise specified, a description of "transparent film" refers to the aforementioned "transparent film having a refractive index of 1.60 to 1.78 and a film thickness of 55 to 110 nm".

The transparent laminate of the present invention preferably further has a transparent substrate, on a side of the transparent film having a refractive index of 1.60 to 1.78 and a film thickness of 55 to 110 nm that is opposite to the side on which the transparent electrode pattern is formed.

The aforementioned transparent substrate is preferably a transparent film substrate. In this case, the transparent film is preferably disposed between the transparent electrode pattern and the transparent film substrate.

In the laminate of the present invention, the transparent electrode pattern is preferably formed on the transparent film substrate.

Figure 12:
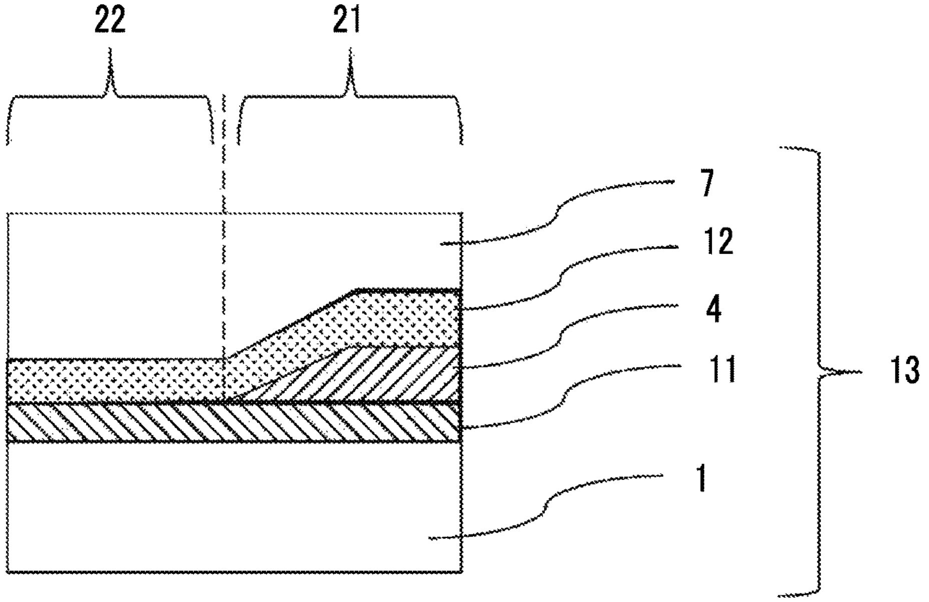
FIG. 12 is a schematic cross-sectional view showing an example of a constitution of a transparent laminate of the present invention.

FIG. 12 shows an example of the constitution of the transparent laminate of the present invention.

In FIG. 12, the transparent laminate has a transparent substrate 1 and a transparent film 11 having a refractive index of 1.60 to 1.78 and a film thickness of 55 to 110 nm, and also has an area 21, which is constituted with a transparent electrode pattern 4, a second transparent resin layer 12, and a first transparent resin layer 7 that are laminated in this order, within the plane thereof. Furthermore, as shown in FIG. 12, the transparent laminate includes, in addition to the aforementioned area, an area 22 constituted with the transparent substrate 1, the transparent film 11, and the transparent resin layers that are laminated in this order (in the constitution shown in FIG. 12, an area 22 constituted with the second transparent resin layer 12 and the first transparent resin layer 7 that are laminated in this order (that is, a non-pattern area 22 in which the transparent electrode pattern is not formed)).

In other words, the substrate with a transparent electrode pattern includes the area 21, which is constituted with the transparent substrate 1, the transparent film 11, the transparent electrode pattern 4, the second transparent resin layer 12, and the first transparent resin layer 7 that are laminated in this order, in the in-plane direction.

The in-plane direction means a direction approximately parallel to a plane that is parallel to the transparent substrate of the transparent laminate. Accordingly, having the area, which is constituted with the transparent electrode pattern 4, the second transparent resin layer 12, and the first transparent resin layer 7 that are laminated in this order, within the plane means that an orthography of the area, which is constituted with the transparent electrode pattern 4, the second transparent resin layer 12, and the first transparent resin layer 7 that are laminated in this order, projected to the plane parallel to the transparent substrate of the transparent laminate exists within the plane parallel to the transparent substrate of the transparent laminate.

In a case where the transparent laminate of the present invention is used in a capacitance-type input device which will be described later, sometimes the transparent electrode pattern is provided as a first transparent electrode pattern and a second transparent electrode pattern respectively in two directions consisting of a row direction and a column direction that are approximately orthogonal to each other (for example, see FIG. 4). For example, in the constitution shown in FIG. 4, the transparent electrode pattern in the transparent laminate of the present invention may be the second transparent electrode pattern 4 or a pad portion 3*a* of a first transparent electrode pattern 3. In other words, in the following description of the transparent laminate of the present invention, the transparent electrode pattern will be represented by a reference "4" in some cases, but the transparent electrode pattern in the transparent laminate of the present invention is not limited to and used only as the second transparent electrode pattern 4 in the capacitance-type input device of the present invention, and may be used as, for example, the pad portion 3*a* of the first transparent electrode pattern 3.

The transparent laminate of the present invention preferably includes a non-pattern area in which the transparent electrode pattern is not formed. In the present specification, the non-pattern area means an area in which the transparent electrode pattern 4 is not formed.

FIG. 12 shows an aspect in which the transparent laminate of the present invention includes the non-pattern area 22.

It is preferable that the transparent laminate of the present invention includes an area, which is constituted with the transparent substrate, the transparent film, and the transparent resin layers that are laminated in this order, in the plane thereof, within at least a portion of the non-pattern area 22 in which the transparent electrode pattern is not formed. Furthermore, it is preferable that the transparent resin layer has a first transparent resin layer and a second transparent resin layer, and the transparent laminate of the present invention has an area, which is constituted with the transparent substrate, the transparent film, and the second transparent resin layer that are laminated in this order, in the plane thereof within at least a portion of the non-pattern area.

In the transparent laminate of the present invention, within the area constituted with the transparent substrate, the transparent film, and the transparent resin layer that are laminated in this order, the transparent film and the transparent resin layer are preferably adjacent to each other. In a case where the transparent resin layer has the first transparent resin layer and the second transparent resin layer, the transparent film and the second transparent resin layer are preferably adjacent to each other.

Here, in an area other than the non-pattern area 22, other members may be disposed in any position as long as the members do not depart from the gist of the present invention. For example, in a case where the transparent laminate of the present invention is used in the capacitance-type input device which will be described later, a mask layer 2, an insulating layer 5, a conductive element 6, or the like shown in FIG. 1 can be laminated.

In the transparent laminate of the present invention, the transparent substrate and the transparent film are preferably adjacent to each other.

FIG. 12 shows an aspect in which the transparent film 11 is adjacent to and laminated on the transparent substrate 1.

Here, a third transparent film may be laminated between the transparent substrate and the transparent film as long as the third transparent film does not depart from the gist of the present invention. For example, the transparent laminate preferably includes a third transparent film (not shown in FIG. 12) having a refractive index of 1.50 to 1.52 between the transparent substrate and the transparent film.

In the transparent laminate of the present invention, the thickness of the transparent film is preferably 55 to 110 nm, more preferably 60 to 110 nm, and even more preferably 70 to 90 nm.

The transparent film may have a single-layer structure or a laminated structure consisting of two or more layers. In a case where the transparent film has a laminated structure consisting of two or more layers, the film thickness of the transparent film mans the total film thickness of all the layers.

In the transparent laminate of the present invention, the transparent film and the transparent electrode pattern are preferably adjacent to each other.

FIG. 12 shows an aspect in which the transparent electrode pattern 4 is adjacent to and laminated on a portion of area of the transparent film 11.

As shown in FIG. 12, the end portion of the transparent electrode pattern 4 may have a tapered shape, although the shape is not particularly limited. For example, the end portion of the transparent electrode pattern 4 may have a tapered shape in which the surface on the transparent substrate side is wider than the surface on the side opposite to the transparent substrate.

When the end portion of the transparent electrode pattern has a tapered shape, an angle (hereinafter, also referred to as a taper angle) of the end portion of the transparent electrode pattern is preferably equal to or less than 30°, more preferably 0.1° to 15°, and particularly preferably 0.5° to 5°.

In the present specification, examples of the method for measuring the taper angle include a method in which a photomicrograph of the end portion of the transparent electrode pattern is captured, the tapered portion in the photomicrograph is approximated to a triangle, and the taper angle thereof is directly measured.

Figure 11:
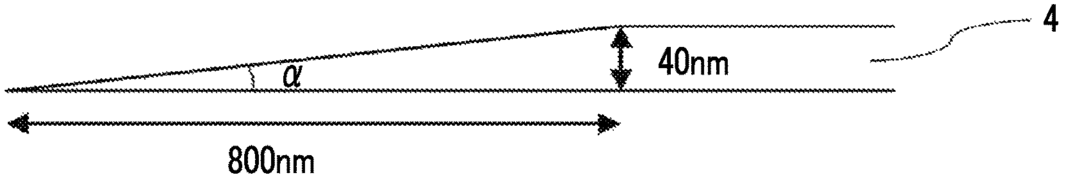
FIG. 11 is a view illustrating an example of a tapered shape of the end portion of the transparent electrode pattern.

FIG. 11 shows an example of a case where the end portion of the transparent electrode pattern has a tapered shape. A triangle obtained by the approximation of the tapered portion shown in FIG. 11 has a base side 800 nm long, and a height (a film thickness in an upper bottom portion approximately parallel to the base side) of 40 nm. At this time, a taper angle $\alpha$ is about 3°. The base side of the triangle obtained by the approximation of the tapered portion is preferably 10 to 3,000 nm long, more preferably 100 to 1,500 nm long, and even more preferably 300 to 1,000 nm long.

The preferred range of the height of the triangle obtained by the approximation of the tapered portion is the same as the preferred range of the film thickness of the transparent electrode pattern.

It is preferable that the transparent laminate of the present invention includes an area in which the transparent electrode pattern and the transparent resin layer are adjacent to each other.

FIG. 12 shows an aspect in which within the area 21, which is constituted with the transparent electrode pattern, the second transparent resin layer, and the first transparent resin layer that are laminated in this order, the transparent electrode pattern, the second transparent resin layer, and the first transparent resin layer are adjacent to each other.

Furthermore, in the transparent laminate of the present invention, both of the transparent electrode pattern and the non-pattern area 22 in which the transparent electrode pattern is not formed are preferably continuous and covered with the transparent film and the transparent resin layer, directly or through another layer.

Herein, "continuous" means that the transparent film and the transparent resin layer are not pattern films but are continuous films. That is, from the viewpoint of making it difficult for the transparent electrode pattern to be visually recognized, the transparent film and the second transparent resin layer preferably do not have an opening portion.

The transparent electrode pattern and the non-pattern area 22 are preferably covered directly with the transparent film and the transparent resin layer rather than covered with these through another layer. In a case where the transparent electrode pattern and the non-pattern area 22 are covered with the transparent film and the second transparent resin layer through another layer, examples of "another layer" include the insulating layer 5 included in the capacitance-type input device of the present invention that will be described later. In a case where two or more layers of the transparent electrode pattern are included as in the capacitance-type input device of the present invention that will be described later, examples of "another layer" include the second transparent electrode pattern layer and the like.

FIG. 12 shows an aspect in which the second transparent resin layer 12 is laminated. The second transparent resin layer 12 is laminated in a state of straddling two areas including an area in which the transparent electrode pattern 4 is not laminated on the transparent film 11 and an area in which the transparent electrode pattern 4 is laminated on the transparent film 11. That is, the second transparent resin layer 12 is adjacent to the transparent film 11 and the transparent electrode pattern 4.

In a case where the end portion of the transparent electrode pattern 4 has a tapered shape, the second transparent resin layer 12 is preferably laminated along the tapered shape (in the same slope as the taper angle).

FIG. 12 shows an aspect in which the first transparent resin layer 7 is laminated on the surface of the second transparent resin layer 12 that is opposite to the surface on which the transparent electrode pattern is formed.

<Material of Transparent Laminate>

[Base Material]

The laminate of the present invention includes a base material.

As the base material, a transparent substrate is preferable.

As the transparent substrate, a transparent resin substrate or a glass substrate can be used. From the viewpoint of productivity, a resin substrate having a refractive index of 1.50 to 1.66 is preferable. The resin substrate enables the transfer film to be continuously subjected to treatments such as lamination, exposure, development, rinsing, drying, and baking in the shape of a roll. As the resin substrate, polyimide, polycarbonate, polyether sulfone, and polyester are preferable, and from the viewpoint of cost, transparency, and strength, polyimide and polyester are preferable.

From the viewpoint of heat resistance, the transparent substrate is preferably a glass substrate having a refractive index of 1.50 to 1.55. The refractive index of the transparent substrate is more preferably 1.50 to 1.52.

The transparent substrate is constituted with a light transmitting substrate such as a transparent resin substrate or a glass substrate, and as glass, for example, it is possible to use reinforced glass represented by GORILLA GLASS from Corning Incorporated. Furthermore, as the transparent substrate, it is possible to preferably use the materials used in JP2010-86684A, JP2010-152809A, and JP2010-257492A.

[Transparent Electrode Pattern]

The refractive index of the transparent electrode pattern is preferably 1.75 to 2.10.

The material of the transparent electrode pattern is not particularly limited, and known materials can be used. For example, the transparent electrode pattern can be prepared by using a light-transmitting conductive metal oxide film such as indium tin oxide (ITO) or indium zinc oxide (IZO). Examples of the metal film include an ITO film; a film of a metal such as Al, Zn, Cu, Fe, Ni, Cr, or Mo; a film of metal oxide such as $SiO_2$; and the like. At this time, the film thickness of each element can be set to be 10 to 200 nm. Furthermore, by making an amorphous ITO film into a polycrystalline ITO film by means of firing, electrical resistance can be reduced. Moreover, the first transparent electrode pattern 3, the second transparent electrode pattern 4, and the conductive element 6 which will be described later can be manufactured by using a photosensitive film having a photocurable resin layer using the conductive fiber which will be described later. In addition, in a case where the conductive pattern is formed using ITO and the like, paragraphs 0014 to 0016 of JP4506785B and the like can be referred to. Particularly, the transparent electrode pattern is preferably an ITO film.

In the transparent laminate of the present invention, the transparent electrode pattern is preferably an ITO film having a refractive index of 1.75 to 2.10.

[Transparent Resin Layer]

The preferred scope of the transparent resin layer included in the transparent laminate of the present invention is the same as the preferred scope of the transparent resin layer in the transfer film of the present invention.

<Refractive Index in Laminate and Method for Measuring Dry Film Thickness>

In a case where the transparent resin layer is a single layer (one layer) and is uniform in the film thickness direction, the refractive index of the transparent resin layer can be measured in the same manner as used for measuring the refractive index in the transfer film by using the reflection spectroscopic film thickness meter FE-3000 (manufactured by OTSUKA ELECTRONICS Co., Ltd.).

Specifically, the refractive index can be measured by the following method.

(1) For a transparent laminate, a sample in which a transparent substrate, a transparent film, and a transparent electrode pattern are laminated in this order, a sample in which a transparent substrate, a transparent film, a transparent electrode pattern, and a transparent resin layer are laminated in this order, or the like is prepared, and the refractive index of each layer and the estimated value of the dry film thickness of each layer are measured in advance.

(2) Within the transparent laminate, a portion constituted with 4 layers of the transparent substrate/transparent film/transparent electrode pattern/transparent resin layer is cut in 10 cm (length)×10 cm (width). A black PET material is brought into contact with the cut transparent laminate through a transparent adhesive tape (OCA tape 8171CL: manufactured by 3M), thereby preparing a sample piece. By using a transmission electron microscope (TEM), the structure of the sample piece is analyzed, and the estimated value of the dry film thickness of each layer is determined. For the sample piece, by using FE-3000 (manufactured by OTSUKA ELECTRONICS Co., Ltd.), reflection spectra of 100 measurement spots having a diameter φ of 40 μm on a straight line in an arbitrary direction are evaluated at an interval of 0.2 mm. At this time, the interface between the transparent resin layer and the transparent electrode pattern is taken into consideration. Accordingly, in a state where the refractive indices of the transparent resin layer, the transparent substrate, the transparent film, and the transparent electrode pattern, and the estimated value of the average dry film thickness of the transparent resin layer are plugged into a calculation formula, from the reflection spectrum of the portion constituted with 4 layers of the transparent substrate/transparent film/transparent electrode pattern/transparent resin layer, the refractive index of the transparent resin layer and the film thickness of the transparent resin layer at 100 measurement spots are determined by fitting through simulation calculation. In the present specification, the arbitrary direction is a direction parallel to one side of the sample piece, and the 100 measurement spots are within a range (that is, a range 2 cm long) evenly extending 1 cm from the center of one side of the sample piece.

In a case where a non-transparent base material is used, a sample piece is prepared by bonding a black PET material to the back surface of the base material through a transparent adhesive tape. Then, by using a reflection spectroscopic film thickness meter FE-3000, the reflection spectrum (wavelength: 430 to 800 nm) of the laminate of the base material and the black PET material is evaluated, and a refractive index n at each wavelength, a dry film thickness T, and an extinction coefficient k are determined. At the time of performing simulation calculation on a sample constituted with 5 layers, by plugging in the refractive index n, the dry film thickness T, and the extinction coefficient k as the characteristics of the base material, it is possible to determine the refractive index and the dry film thickness of the transparent resin layer.

In a case where the transparent resin layer includes 2 layers and is uniform in the film thickness direction, $n_1$, $n_2$, $T_2$, $\sigma_1$, and $H_1$ in the obtained transparent laminate can be determined by repeating the same method as used for calculating $n_1$, $n_2$, $T_2$, $\sigma_1$, and $H_1$ in the transfer film for each layer by using the reflection spectroscopic film thickness meter FE-3000 (manufactured by OTSUKA ELECTRONICS Co., Ltd.). The method will be schematically described below. Hereinafter, the refractive index will be measured under the condition of 25° C.

In a case where a transparent substrate is used as a base material, the refractive index can be measured as below. The transparent base material refers to a base material having a transmittance of equal to or higher than 80%. As the transmittance, it is possible to use the minimum value of transmittance measured at a pitch of 1 nm within a wavelength range of 400 to 780 nm. In addition, a base material having a transmittance of less than 80% is referred to as a non-transparent base material.

(1) For a transparent laminate, a sample in which a transparent substrate, a transparent film, and a transparent electrode pattern are laminated in this order, a sample in which a transparent substrate, a transparent film, a transparent electrode pattern, and a second transparent resin layer are laminated in this order, or the like is prepared, and the refractive index of each layer and the estimated value of the dry film thickness of each layer are measured in advance.

(2) Within the transparent laminate, a portion constituted with 5 layers of the transparent substrate/transparent film/transparent electrode pattern/second transparent resin layer/first transparent resin layer is cut in 10 cm (length)×10 cm (width). A black PET material is brought into contact with the cut transparent laminate through a transparent adhesive tape (OCA tape 8171CL: manufactured by 3M), thereby preparing a sample piece. By using a transmission electron microscope (TEM), the structure of the sample piece is analyzed, and the estimated value of the dry film thickness of each layer is determined. For the sample piece, by using FE-3000 (manufactured by OTSUKA ELECTRONICS Co., Ltd.), reflection spectra of 100 measurement spots having a diameter φ of 40 μm on a straight line in an arbitrary direction are evaluated at an interval of 0.2 mm. At this time, the interface between the second transparent resin layer and the transparent electrode pattern as well as the interface between the first transparent resin layer and the second transparent resin layer are taken into consideration. Accordingly, in a state where the refractive indices of the second transparent resin layer, the transparent substrate, the transparent film, and the transparent electrode pattern, the estimated value of the average dry film thickness of the first transparent resin layer, and the estimated value of the average dry film thickness of the second transparent resin layer are plugged into a calculation formula, from the reflection spectrum of the portion constituted with 5 layers of the transparent substrate/transparent film/transparent electrode pattern/second transparent resin layer/first transparent resin layer, a refractive index $n_1$ of the first transparent resin layer, a refractive index $n_2$ of the second transparent resin layer, and the dry film thicknesses of the first transparent resin layer and the second transparent resin layer at the 100 measurement spots are determined by fitting through simulation calculation. Furthermore, the average, the maximum value, the minimum value, and the standard deviation of the dry film thicknesses of the first transparent resin layer and the second transparent resin layer are calculated, thereby calculating $n_1$, $n_2$, $T_1$, $T_2$, $\sigma_1$, and $H_1$. In the present specification, the arbitrary direction is a direction parallel to one side of the sample piece, and the 100 measurement spots are within a range (that is, a range 2 cm long) evenly extending 1 cm from the center of one side of the sample piece.

In a case where a non-transparent base material is used, a sample piece is prepared by bonding a black PET material to the back surface of the base material through a transparent adhesive tape. Then, by using a reflection spectroscopic film thickness meter FE-3000, the reflection spectrum (wavelength: 430 to 800 nm) of the laminate of the base material and the black PET material is evaluated, and a refractive index n at each wavelength, a dry film thickness T, and an extinction coefficient k are determined. At the time of performing simulation calculation on a sample constituted with 5 layers, by plugging in the refractive index n, the dry film thickness T, and the extinction coefficient k as the characteristics of the base material, it is possible to determine the refractive indices and the dry film thicknesses of the first transparent resin layer and the second transparent resin layer.

[Transparent Film]

In the transparent laminate of the present invention, the refractive index of the transparent film is preferably 1.60 to 1.78, and more preferably 1.65 to 1.74. The transparent film may have a single-layer structure or a laminated structure consisting of two or more layers. In a case where the transparent film has a laminated structure including two or more layers, the refractive index of the transparent film means the refractive index of all the layers.

The material of the transparent film is not particularly limited.

The preferred scope of the material of the transparent film and the preferred scope of physical properties thereof such as the refractive index are the same as the preferred scope of the material and refractive index of the second transparent resin layer.

From the viewpoint of optical homogeneity, the transparent film and the second transparent resin layer of the transparent laminate of the present invention are preferably constituted with the same material.

In the transparent laminate of the present invention, the transparent film is preferably a transparent resin film.

The metal oxide particles, the resin (binder), or other additives used in the transparent resin film are not particularly limited as long as they do not depart from the gist of the present invention, and the resin or other additives used in the second transparent resin layer in the transfer film of the present invention can be preferably used.

In the transparent laminate of the present invention, the transparent film may be an inorganic film. As the material used for the inorganic film, it is possible to preferably use the material used in the second transparent resin layer in the transfer film of the present invention.

[Third Transparent Film]

From the viewpoint of improving the visibility of the transparent electrode pattern by making the refractive index thereof close to the refractive index of the transparent substrate, the refractive index of the third transparent film is preferably 1.50 to 1.55 and more preferably 1.50 to 1.52.

<Method for Manufacturing Transparent Laminate>

The method for manufacturing a transparent laminate of the present invention includes a step of laminating the transparent resin layer of the transfer film of the present invention on a transparent electrode pattern.

Furthermore, the method for manufacturing a transparent laminate of the present invention preferably includes a step of laminating the second transparent resin layer and the first transparent resin layer of the transfer film of the present invention in this order on the transparent electrode pattern.

In a case where the aforementioned constitution is adopted, it is possible to collectively transfer the second transparent resin layer and the first transparent resin layer of the transparent laminate, and to manufacture a transparent laminate without a problem in that the transparent electrode pattern becomes visible with excellent productivity.

In the method for manufacturing a transparent laminate of the present invention, the second transparent resin layer is formed on the transparent electrode pattern and the transparent film in the non-pattern area, directly or through other layers.

<Surface Treatment for Transparent Substrate>

In order to improve the adhesiveness of each layer by lamination in a transfer step performed later, the non-contact surface of the transparent substrate (front panel) can be subjected to a surface treatment in advance. The surface treatment is preferably performed as a surface treatment using a silane compound (silane coupling treatment). As the silane coupling agent, the compounds having a functional group interacting with a photosensitive resin are preferable. For example, a silane coupling solution (a 0.3% by mass aqueous N-β-aminoethyl-γ-aminopropyltrimethoxysilane solution (trade name: KBM603, manufactured by Shin-Etsu Chemical Co., Ltd.)) is sprayed to the transparent substrate for 20 seconds by shower, and then the substrate is washed with pure water by shower. Thereafter, a reaction is caused by heating. At this time, a heating tank may be used, and in a case where the transparent substrate is preheated using a laminator, the reaction can be accelerated.

<Formation of Transparent Electrode Pattern>

The transparent electrode pattern can be formed on the transparent substrate or on the transparent film which has a refractive index of 1.60 to 1.78 and a film thickness of 55 to 110 nm, by the method for forming the first transparent electrode pattern 3, the second transparent electrode pattern 4, and the different conductive element 6 described for the capacitance-type input device of the present invention that will be described later. It is preferable to use a method using a photosensitive film.

<Formation of Transparent Resin Layer>

Examples of the method for forming the transparent resin layer include a method including a cover film removing step of removing the cover film from the transfer film of the present invention, a transfer step of transferring the transparent resin layer of the transfer film of the present invention, from which the cover film has been removed, onto the transparent electrode pattern, an exposure step of performing exposure on the transparent resin layer that has been transferred onto the transparent electrode pattern, and a development step of developing the transparent resin layer that have undergone exposure.

[Transfer Step]

The transfer step is a step of transferring the transparent resin layer of the transfer film of the present invention, from which the cover film has been removed, onto the transparent electrode pattern.

At this time, it is preferable to use a method including a step of laminating the transparent resin layer of the transfer film of the present invention onto the transparent electrode pattern and then removing the temporary support.

The transfer (bonding) of the transparent resin layer onto the surface of the base material can be performed in a manner in which the transparent resin layer is stacked on the surface of the transparent electrode pattern and then pressed and heated. For the bonding, it is possible to use known laminators such as a laminator, a vacuum laminator, and an auto cut laminator which can further improve productivity.

[Exposure Step, Development Step, and Other Steps]

As the exposure step, the development step, and other steps, for example, the methods described in paragraphs 0035 to 0051 of JP2006-23696A can also be suitably used in the present invention.

The exposure step is a step of performing exposure on the transparent resin layer that has been transferred onto the transparent electrode pattern.

Specifically, for example, the exposure step is performed by a method in which a predetermined mask is disposed on top of the transparent resin layer formed on the transparent electrode pattern, and then the transparent resin layer is subjected to exposure from the top of the mask through the mask and the temporary support.

As a light source of for the exposure, it is possible to appropriately select and use any light source, as long as the light source can radiate light in a wavelength region (for example, 365 nm or 405 nm) that can cure the transparent resin layer. Specific examples of the light source include an ultrahigh-pressure mercury lamp, a high-pressure mercury lamp, a metal halide lamp, and the like. The exposure amount is preferably about 5 to 200 $mJ/cm^2$, and more preferably about 10 to 100 $mJ/cm^2$.

The development step is a step of developing the transparent resin layer which is a photocurable resin layer having undergone exposure.

In the present invention, the development step is a development step in a narrow sense in which the transparent resin layer having undergone patternwise exposure is patternwise-exposed by a developer.

The development can be performed using a developer. The developer is not particularly limited, and it is possible to use known developers such as the developers described in JP1993-72724A (JP-H05-72724A). As the developer, a developer is preferable which shows developing behavior of dissolving the photocurable resin layer. For example, a developer is preferable which contains a compound having pKa of 7 to 13 at a concentration of 0.05 to 5 mol/L. In contrast, in a case where the transparent resin layer itself does not form a pattern, as the developer, a developer is preferable which contains a compound having pKa of 7 to 13 at a concentration of 0.05 to 5 mol/L.

A small amount of an organic solvent miscible with water may be further added to the developer. Examples of the organic solvent miscible with water include methanol, ethanol, 2-propanol, 1-propanol, butanol, diacetone alcohol, ethylene glycol monomethyl ether, ethylene glycol monoethyl ether, ethylene glycol mono-n-butyl ether, benzyl alcohol, acetone, methyl ethyl ketone, cyclohexanone, ε-caprolactone, γ-butyrolactone, dimethylformamide, dimethylacetamide, hexamethylphosphonamide, ethyl lactate, methyl lactate, ε-caprolactam, N-methylpyrrolidone, and the like. The concentration of the organic solvent is preferably 0.1% by mass to 30% by mass.

Moreover, a known surfactant can be further added to the developer. The concentration of the surfactant is preferably 0.01% by mass to 10% by mass.

The development may be performed by any method such as puddle development, shower development, shower/spin development, and dip development. The shower development is a method of spraying a developer to the transparent resin layer having undergone exposure by shower, and in this way, an uncured portion can be removed. In a case where the thermoplastic resin layer or the interlayer is provided, it is preferable to remove the thermoplastic resin layer, the interlayer, or the like in advance by spraying an alkaline liquid, which poorly dissolves the photocurable resin layer, by shower or the like before the development. Furthermore, after the development, it is preferable to remove the development residues by spraying a washer or the like by shower and rubbing the transparent resin layer with a brush or the like. The temperature of the developer is preferably 20° C. to 40° C., and the pH of the developer is preferably 8 to 13.

The method for manufacturing a capacitance-type input device may include other steps such as a post-exposure step and a post-baking step. In a case where the transparent resin layer is a thermosetting transparent resin layer, it is preferable to perform the post-baking step.

The patterning exposure or the flood exposure may be performed after the temporary support is peeled. Alternatively, the exposure may be performed before the temporary support is peeled, and then the temporary support may be peeled. The exposure may be performed through a mask, or may be performed in the form of digital exposure using laser or the like.

<Formation of Transparent Film>

In a case where the transparent laminate of the present invention further has the transparent film, which has a refractive index of 1.60 to 1.78 and a film thickness of 55 to 110 nm, on a side of the transparent electrode pattern that is opposite to the side on which the transparent resin layer is formed, the transparent film is formed on the transparent electrode pattern, directly or through another layer such as the aforementioned third transparent film.

The method for forming the transparent film is not particularly limited, but it is preferable to form the transparent film by transfer or sputtering.

Particularly, in the transparent laminate of the present invention, the transparent film is preferably formed by transferring the transparent curable resin film formed on the temporary support onto the transparent substrate, and more preferably formed by transfer followed by curing. Examples of the method of the transfer and curing include a method in which the transfer, exposure, development, and other steps are performed in the same manner as in the method of transferring the transparent resin layer in the method for manufacturing a transparent laminate of the present invention by using the photosensitive film described for the capacitance-type input device of the present invention that will be described later. In this case, it is preferable to adjust the refractive index of the transparent film within the aforementioned range by dispersing the metal oxide particles in the photocurable resin layer in the photosensitive film.

In contrast, in a case where the transparent film is an inorganic film, the transparent film is preferably formed by sputtering. That is, in the transparent laminate of the present invention, the transparent film is preferably formed by sputtering.

As the sputtering method, it is possible to preferably use the methods used in JP2010-86684A, JP2010-152809A, and JP2010-257492A.

<Formation of Third Transparent Film>

The method for forming a third transparent film is the same as the method for forming the transparent film, which has a refractive index of 1.60 to 1.78 and a film thickness of 55 to 110 nm, on the transparent substrate.

<Method for Manufacturing Transparent Laminate>

The method for manufacturing a transparent laminate of the present invention includes a step of laminating the transparent resin layer of the transfer film of the present invention onto the transparent electrode pattern.

In the present invention, in a case where the transparent resin layer has the first transparent resin layer and the second transparent resin layer, the method for manufacturing a transparent laminate of the present invention preferably includes a step of laminating the second transparent resin layer and the first transparent resin layer of the transfer film of the present invention in this order on the transparent electrode pattern.

In a case where the transparent resin layer has the first transparent resin layer and the second transparent resin layer, the method for manufacturing a transparent laminate of the present invention preferably includes a step of simultaneously curing the first transparent resin layer and the second transparent resin layer, and more preferably includes a step of simultaneously pattern-wise curing the first and second transparent resin layers. For the transfer film of the present invention, it is preferable that, after the first transparent resin layer is laminated, the second transparent resin layer is laminated without curing the first transparent resin layer. The first transparent resin layer and the second transparent resin layer transferred from the transfer film of the present invention obtained in this way can be simultaneously cured. As a result, after the first and second transparent resin layers are transferred onto the transparent electrode pattern from the transfer film of the present invention, a desired pattern can be developed by photolithography.

The method for manufacturing a transparent laminate of the present invention more preferably includes, after the step of simultaneously curing the first transparent resin layer and the second transparent resin layer, a step of removing an uncured portion (in a case of photocuring, only an unexposed portion or only an exposed portion) of the first transparent resin layer and the second transparent resin layer by developing the portion.

3. Capacitance-Type Input Device

The capacitance-type input device of the present invention is prepared using the transfer film of the present invention or has the transparent laminate of the present invention.

The capacitance-type input device of the present invention is preferably prepared by transferring the transparent resin layer onto the transparent electrode pattern of a capacitance-type input device from the transfer film of the present invention.

In a case where the transparent resin layer has the first transparent resin layer and the second transparent resin layer, the capacitance-type input device of the present invention is preferably prepared by simultaneously curing the first transparent resin layer and the second transparent resin layer transferred from the transfer film of the present invention, and more preferably prepared by simultaneously pattern-wise curing the first transparent resin layer and the second transparent resin layer. At the time of simultaneously curing the first transparent resin layer and the second transparent resin layer transferred from the transfer film of the present invention, it is preferable that the temporary support is not peeled from the transfer film of the present invention.

The capacitance-type input device of the present invention is more preferably prepared by removing an uncured portion of the transparent resin layer, which has been transferred from the transfer film of the present invention and pattern-wise cured, by development. After the transparent resin layer transferred from the transfer film of the present invention is cured, it is preferable that the temporary support is peeled from the transfer film of the present invention before development. In the capacitance-type input device of the present invention, the terminal portion of the routing wiring needs to be connected to flexible wiring formed on a polyimide film. Accordingly, it is preferable that the terminal portion is not covered with the transparent resin layer.

Figure 14:
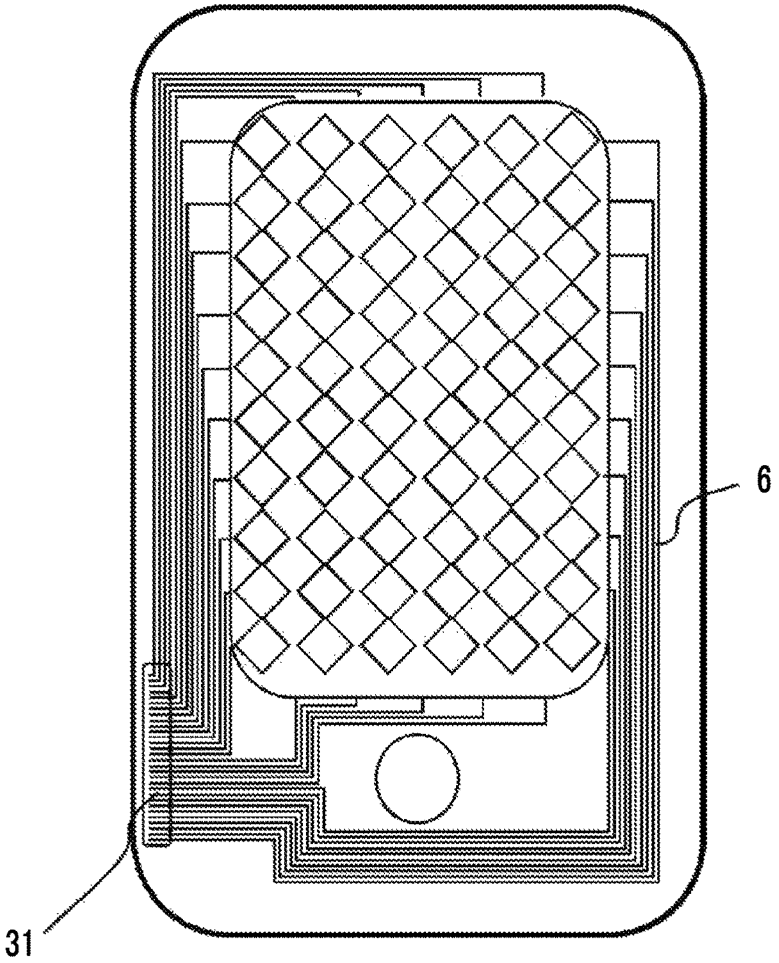
FIG. 14 is a top view showing another example of a constitution of a capacitance-type input device of the present invention, and shows an aspect including an end portion (terminal portion) of pattern-wise exposed routing wiring not being covered with the first transparent resin layer.

The aforementioned aspect is shown in FIG. 14. FIG. 14 shows a capacitance-type input device constituted as below that includes the routing wiring (different conductive element 6) of the transparent electrode pattern and a terminal portion 31 of the routing wiring.

The transparent resin layer on the terminal portion 31 of the routing wiring is an uncured portion (unexposed portion). Therefore, the transparent resin layer is removed, and the terminal portion 31 of the routing wiring is exposed.

Figure 15:
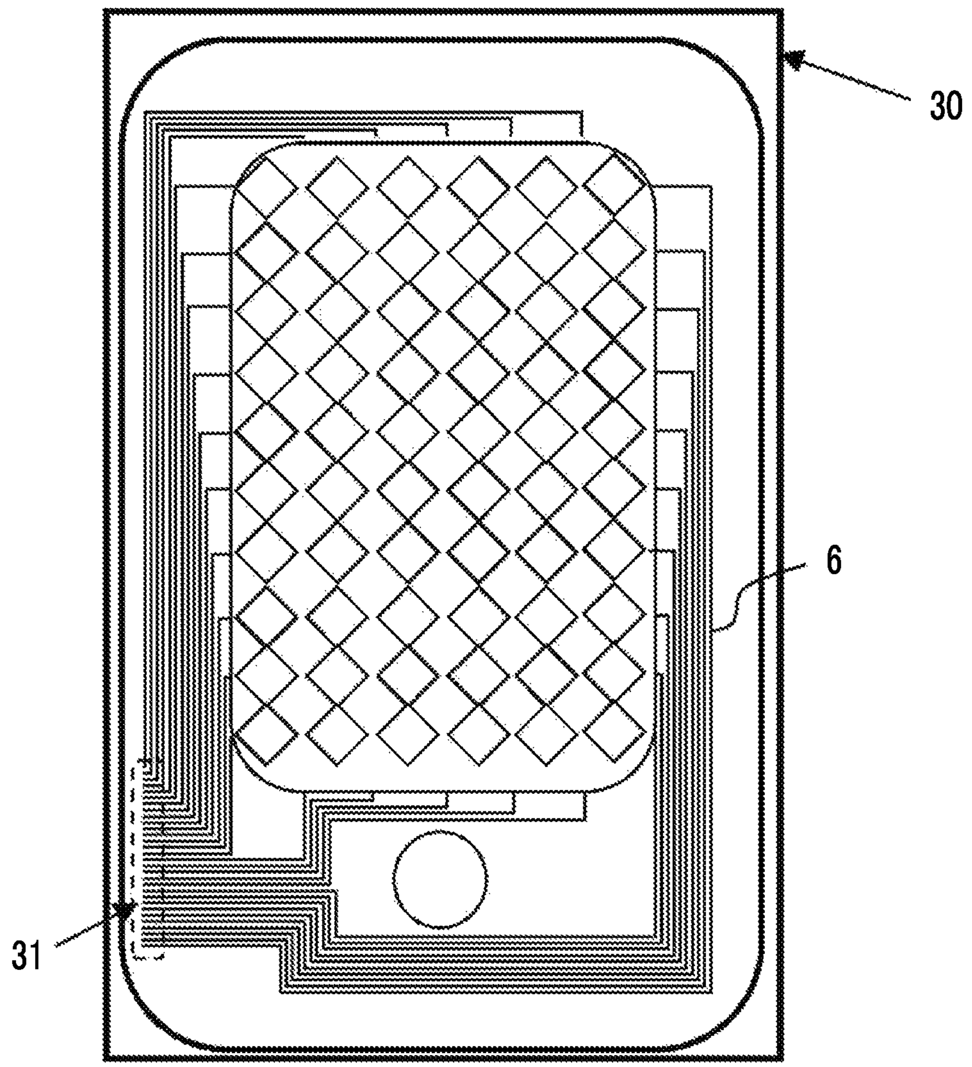
Figure 16:
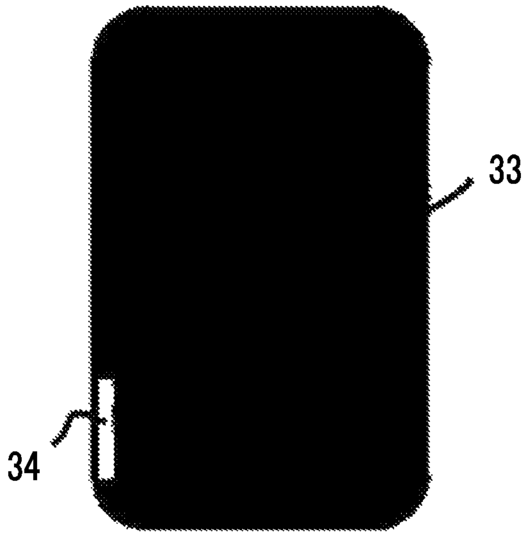
FIG. 16 is a schematic view showing an example of a desired pattern obtained by curing the first transparent resin layer and the second transparent resin layer.

A specific aspect of exposure and development is shown in FIGS. 15 and 16. FIG. 15 shows a state where the transfer film 30 of the present invention having the transparent resin layer is laminated on the transparent electrode pattern of the capacitance-type input device by lamination but has not yet been cured by exposure or the like. In a case where photolithography is used, that is, in a case where the transparent resin layer is cured by exposure, a cured portion (exposed portion) 33 of the transparent resin layer having the shape shown in FIG. 16 can be obtained by pattern-wise exposure using a mask or by developing the unexposed portion. Specifically, in FIG. 16, as an uncured portion of the transparent resin layer, an opening portion 34 corresponding to the terminal portion of the routing wiring and the end portion of the transfer film of the present invention having the first and second transparent resin layers sticking outside the contour of the frame portion of the capacitance-type input device are removed, and in this way, a cured portion (desired pattern) of the transparent resin layer that does not cover the terminal portion (extraction wiring portion) of the routing wiring is obtained.

As a result, the flexible wiring prepared on the polyimide film can be directly connected to the terminal portion 31 of the routing wiring, and hence the signal of a sensor can be sent to the electric circuit.

The capacitance-type input device of the present invention preferably has the transparent electrode pattern and the transparent resin layer adjacent to and disposed on the transparent electrode pattern, more preferably has the second transparent resin layer adjacent to and disposed on the transparent electrode pattern and the first transparent resin layer adjacent to and disposed on the second transparent resin layer, and even more preferably has a transparent laminate in which the refractive index of the second transparent resin layer is higher than the refractive index of the first transparent resin layer, and the refractive index of the second transparent resin layer is equal to or higher than 1.60.

Hereinafter, preferred aspects of the capacitance-type input device of the present invention will be specifically described.

The capacitance-type input device of the present invention preferably has a front panel (corresponding to the transparent substrate in the transparent laminate of the present invention), at least the following elements (3) to (5), (7), and (8) on the non-contact surface side of the front panel, and the transparent laminate of the present invention.

(3) A plurality of first transparent electrode patterns in which a plurality of pad portions is formed in a state of extending in a first direction through connection portions;

(4) A plurality of second electrode patterns which is electrically insulated from the first transparent electrode patterns and consists of a plurality of pad portions formed in a state of extending in a direction crossing the first direction;

(5) An insulating layer which electrically insulates the first transparent electrode patterns from the second electrode patterns;

(7) A second transparent resin layer formed to completely or partially cover the elements (3) to (5);

(8) A first transparent resin layer formed adjacent to the element (7) so as to cover the element (7).

Herein, the second curable transparent resin layer (7) corresponds to the second transparent resin layer in the transparent laminate of the present invention. Furthermore, the first transparent resin layer (8) corresponds to the first transparent resin layer in the transparent laminate of the present invention. The first transparent resin layer is preferably a so-called transparent protective layer in generally known capacitance-type input devices.

In the capacitance-type input device of the present invention, the second electrode patterns (4) may or may not be transparent electrode patterns. However, they are preferably transparent electrode patterns.

The capacitance-type input device of the present invention may further include a conductive element (6) which is electrically connected to at least one of the first transparent electrode patterns and the second electrode patterns and different from the first transparent electrode patterns and the second electrode patterns.

Herein, in a case where the second electrode patterns (4) are not transparent electrode patterns, and the capacitance-type input device of the present invention does not have the different conductive element (6), the first transparent electrode patterns (3) correspond to the transparent electrode pattern in the transparent laminate of the present invention.

In a case where the second electrode patterns (4) are transparent electrode patterns, and the capacitance-type input device of the present invention does not have the different conductive element (6), at least one of the first transparent electrode patterns (3) and the second electrode patterns (4) correspond to the transparent electrode pattern in the transparent laminate of the present invention.

In a case where the second electrode patterns (4) are not transparent electrode patterns, and the capacitance-type input device of the present invention has the different conductive element (6), at least one of the first transparent electrode patterns (3) and the different conductive element (6) corresponds to the transparent electrode pattern of the transparent laminate of the present invention.

In a case where the second electrode patterns (4) are transparent electrode patterns, and the capacitance-type input device of the present invention has the different conductive element (6), at least one of the first transparent electrode patterns (3), the second electrode patterns (4), and the different conductive element (6) corresponds to the transparent electrode pattern in the transparent laminate of the present invention.

The capacitance-type input device of the present invention preferably further includes a transparent film (2) between the first transparent electrode patterns (3) and the front panel, between the second electrode patterns (4) and the front panel, or between the different conductive element (6) and the front panel. Herein, from the viewpoint of further improving the visibility of the transparent electrode pattern, the transparent film (2) preferably corresponds to the transparent film, which has a refractive index of 1.60 to 1.78 and a film thickness of 55 to 110 nm, in the transparent laminate of the present invention.

If necessary, the capacitance-type input device of the present invention preferably further has a mask layer and/or a decorative layer (1). The mask layer is provided in the form of a black frame around the area touched with a finger, a stylus, or the like, for the purpose of preventing the routing wiring of the transparent electrode patterns from being visually recognized from the contact side or for the purpose of decoration. A decorative layer is provided in the form of a frame around the area touched with a finger, a stylus, or the like, for the purpose of decoration. For example, it is preferable that a white decorative layer is provided.

Either or both of the mask layer and the decorative layer (1) are preferably provided between the transparent film (2) and the front panel, between the first transparent electrode patterns (3) and the front panel, between the second transparent electrode patterns (4) and the front panel, or between the different conductive element (6) and the front panel. Either or both of the mask layer and the decorative layer (1) are more preferably adjacent to and provided on the front panel.

Even in a case where the capacitance-type input device of the present invention includes various members described above, because the capacitance-type input device includes the transparent resin layer adjacent to and disposed on the transparent electrode pattern and preferably includes the second transparent resin layer as well as the first transparent resin layer adjacent to and disposed on the second transparent resin layer, it is possible to prevent the transparent electrode patterns from becoming noticeable and to improve the problem of visibility of the transparent electrode patterns. Furthermore, as described above, because the capacitance-type input device adopts a constitution in which the transparent electrode patterns are interposed between the transparent film, which has a refractive index of 1.60 to 1.78 and a film thickness of 55 to 110 nm, and the second transparent resin layer, it is possible to greatly improve the problem of visibility of the transparent electrode patterns.

(Constitution of Capacitance-Type Input Device)

First, a preferred constitution of the capacitance-type input device of the present invention will be described in relation to the methods for manufacturing the respective members constituting the device. FIG. 1 is a cross-sectional view showing a preferred constitution of the capacitance-type input device of the present invention. FIG. 1 shows an aspect in which a capacitance-type input device 10 is constituted with the transparent substrate (front panel) 1, the mask layer 2, the transparent film 11 which has a refractive index of 1.60 to 1.78 and a film thickness of 55 to 110 nm, first transparent electrode patterns 3, second transparent electrode patterns 4, the insulating layer 5, the conductive element 6, the second transparent resin layer 12, and the first transparent resin layer 7.

Figure 2:
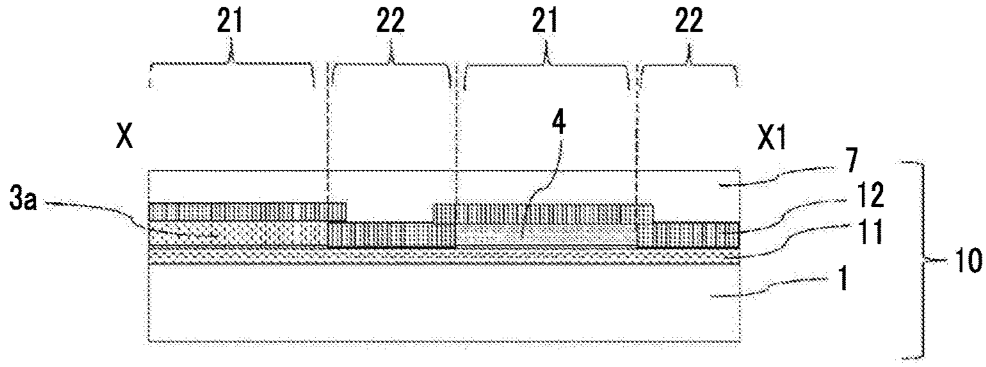
FIG. 2 is a schematic cross-sectional view showing another example of the constitution of the capacitance-type input device of the present invention.

FIG. 2 as a cross-sectional view taken along the line X-X1 in FIG. 4, which will be described later, also shows a preferred constitution of the capacitance-type input device of the present invention. FIG. 2 shows an aspect in which the capacitance-type input device 10 is constituted with the transparent substrate (front panel) 1, the transparent film 11 which has a refractive index of 1.60 to 1.78 and a film thickness of 55 to 110 nm, the first transparent electrode patterns 3, the second transparent electrode patterns 4, the second transparent resin layer 12, and the first transparent resin layer 7.

As the material of the transparent substrate (front panel) 1, it is possible to use those exemplified above as the materials of the transparent electrode pattern in the transparent laminate of the present invention. In FIG. 1, the side on which the respective elements of the front panel 1 are provided is referred to as a non-contact surface side. In the capacitance-type input device 10 of the present invention, a contact surface (a surface opposite to the non-contact surface) of the front panel 1 is brought into contact with a finger or the like, and in this way, an input operation is performed.

The mask layer 2 is provided on the non-contact surface of the front panel 1. The mask layer 2 is a pattern in the form of a frame around a display area formed on the non-contact surface side of the front panel of a touch panel. The mask layer 2 is formed to prevent the routing wiring or the like from being visually recognized.

Figure 3:
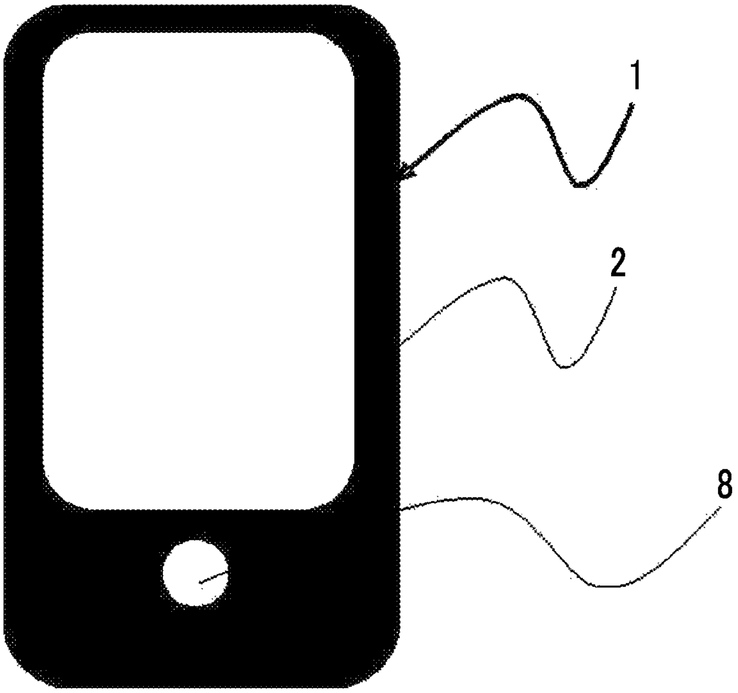
FIG. 3 is a view illustrating an example of a front panel in the present invention.

As shown in FIG. 3, in the capacitance-type input device 10 of the present invention, the mask layer 2 is provided in a partial area (an area other than an input surface in FIG. 3) of the front panel 1. Furthermore, as shown in FIG. 3, an opening portion 8 can be provided in a portion of the front panel 1. A pressing-type mechanical switch can be installed in the opening portion 8.

A plurality of first transparent electrode patterns 3 in which a plurality of pad portions is formed in a state of extending in a first direction through connection portions, a plurality of the second transparent electrode patterns 4 which is electrically insulated from the first transparent electrode patterns 3 and consists of a plurality of pad portions formed in a state of extending in a direction crossing the first direction, and the insulating layer 5 which electrically insulates the first transparent electrode patterns 3 from the second transparent electrode patterns 4 are formed within the contact surface of the front panel 1. As the material of the first transparent electrode patterns 3, the second transparent electrode patterns 4, and the conductive element 6 which will be described later, it is possible to use those exemplified above as the material of the transparent electrode pattern in the transparent laminate of the present invention. The material is preferably an ITO film.

At least one of the first transparent electrode patterns 3 and the second transparent electrode patterns 4 can be installed in a state of straddling two areas including the non-contact surface of the front panel 1 and the surface of the mask layer 2 that is opposite to the front panel 1. FIG. 1 shows a state where the second transparent electrode patterns are installed in a state of straddling two areas including the non-contact surface of the front panel 1 and the surface of the mask layer 2 that is opposite to the front panel 1.

In this way, even in a case where the photosensitive film is laminated in a state of straddling two areas including the mask layer, which needs to have a certain thickness, and the back surface of the front panel, in a case where a photosensitive film having a specific layer constitution which will be described later is used, even though expensive facilities such as a vacuum laminator is not used, it is possible to laminate the photosensitive film by a simple step without causing the lamination bubbles to be generated in the boundary of the mask portion.

The first transparent electrode patterns 3 and the second transparent electrode patterns 4 will be described using FIG. 4. FIG. 4 is a view illustrating an example of the first transparent electrode patterns and the second transparent electrode patterns in the present invention. As shown in FIG. 4, in the first transparent electrode patterns 3, the pad portions 3*a* are formed in a state of extending in the first direction through connection portions 3*b*. The second transparent electrode patterns 4 are electrically insulated from the first transparent electrode patterns 3 by the insulating layer 5 and constituted with a plurality of pad portions formed in a state of extending in a direction (a second direction in FIG. 4) crossing the first direction. In a case where the first transparent electrode patterns 3 are formed, the pad portions 3*a* and the connection portions 3*b* may be integrally prepared. Alternatively, only the connection portions 3*b* may be prepared, and then the pad portions 3*a* and the second transparent electrode patterns 4 may be integrally prepared (patterned). In a case where the pad portions 3*a* and the second transparent electrode patterns 4 are integrally prepared (patterned), the respective layers are formed such that, as shown in FIG. 4, a portion of the connection portions 3*b* is linked to a portion of the pad portions 3*a*, and the first transparent electrode patterns 3 are electrically insulated from the second transparent electrode patterns 4 by the insulating layer 5.

Figure 4:
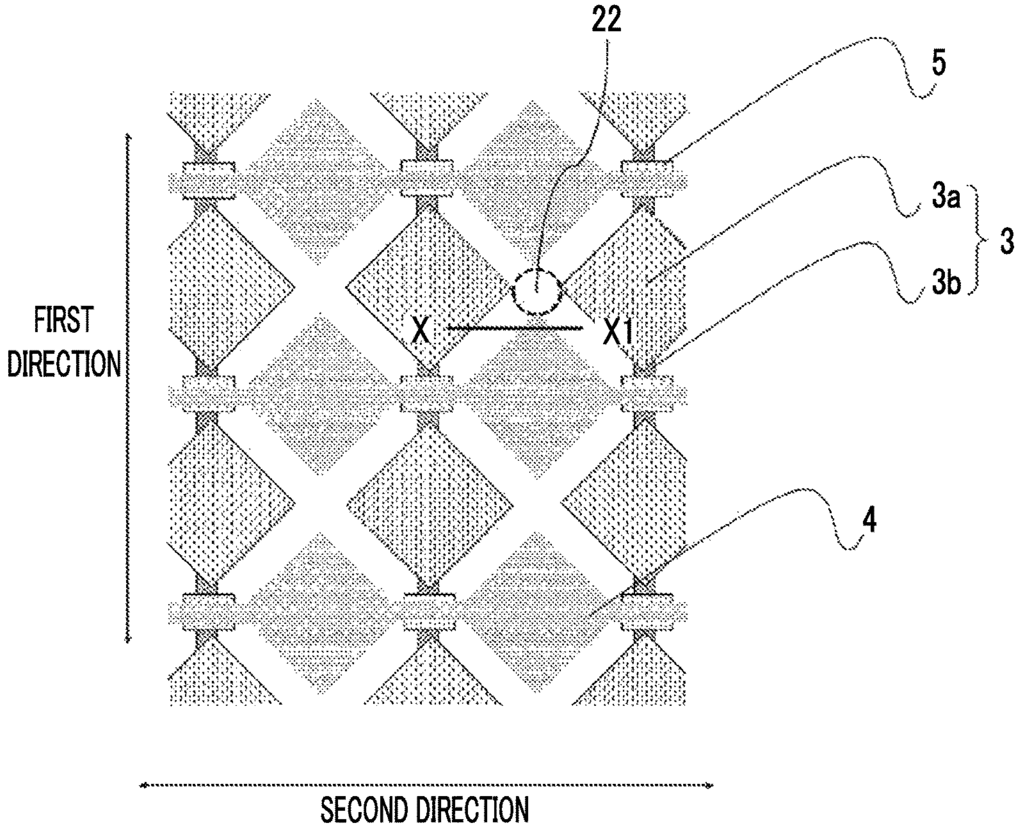
FIG. 4 is a view illustrating an example of a relationship between a transparent electrode pattern and a non-pattern area in the present invention.

In FIG. 4, the area, in which the first transparent electrode patterns 3, the second transparent electrode patterns 4, or the conductive element 6 which will be described later is not formed, corresponds to the non-pattern area 22 in the transparent laminate of the present invention.

In FIG. 1, the conductive element 6 is installed on the side of the surface of the mask layer 2 that is opposite to the front panel 1. The conductive element 6 is an element which is electrically connected to at least one of the first transparent electrode patterns 3 and the second transparent electrode patterns 4 and is different from the first transparent electrode patterns 3 and the second transparent electrode patterns 4.

FIG. 1 shows a state in which the conductive element 6 is connected to the second transparent electrode patterns 4.

Furthermore, in FIG. 1, the first curable transparent resin layer 7 is installed to cover all of the constituents. The first curable transparent resin layer 7 may be constituted so as to cover only a portion of the respective constituents. The insulating layer 5 and the first transparent resin layer 7 may be formed of the same material or different materials. As the material constituting the insulating layer 5, it is possible to preferably use those exemplified above as the material of the first or second transparent resin layer in the transparent laminate of the present invention.

(Method for Manufacturing Capacitance-Type Input Device)

Figure 5:
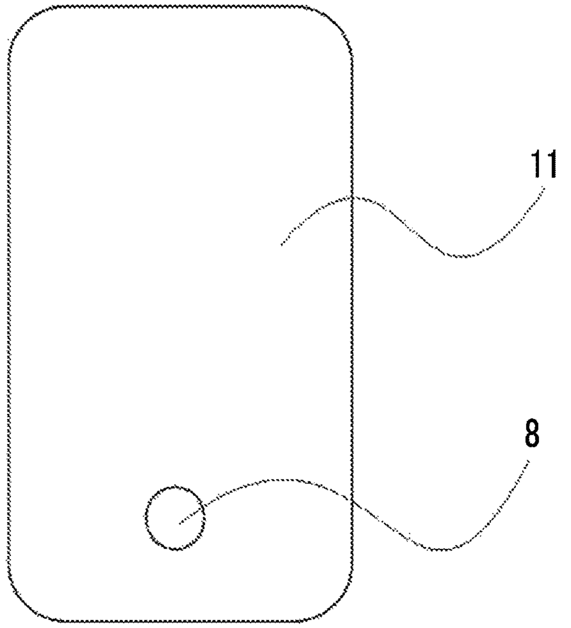
FIG. 5 is a top view showing an example of reinforced glass in which an opening portion is formed.
Figure 6:
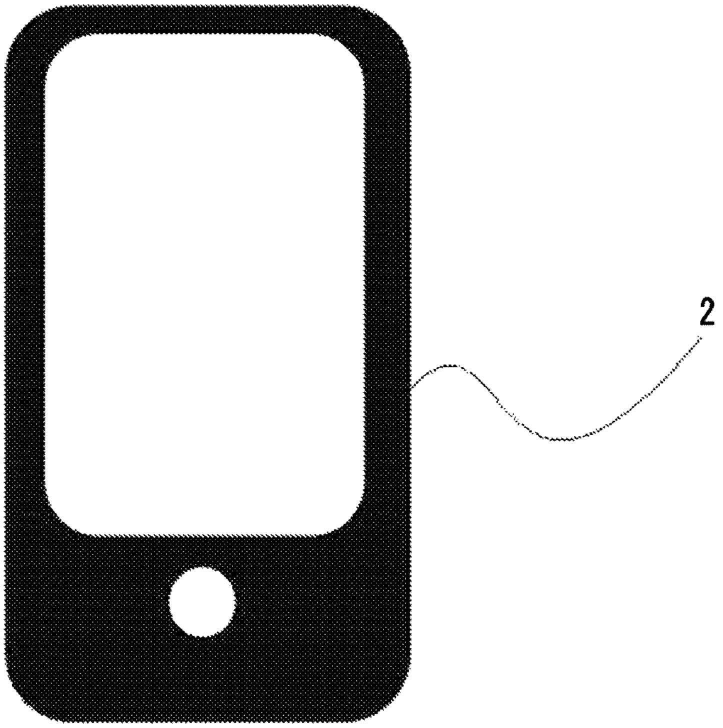
FIG. 6 is a top view showing an example of a front panel in which a mask layer is formed.
Figure 7:
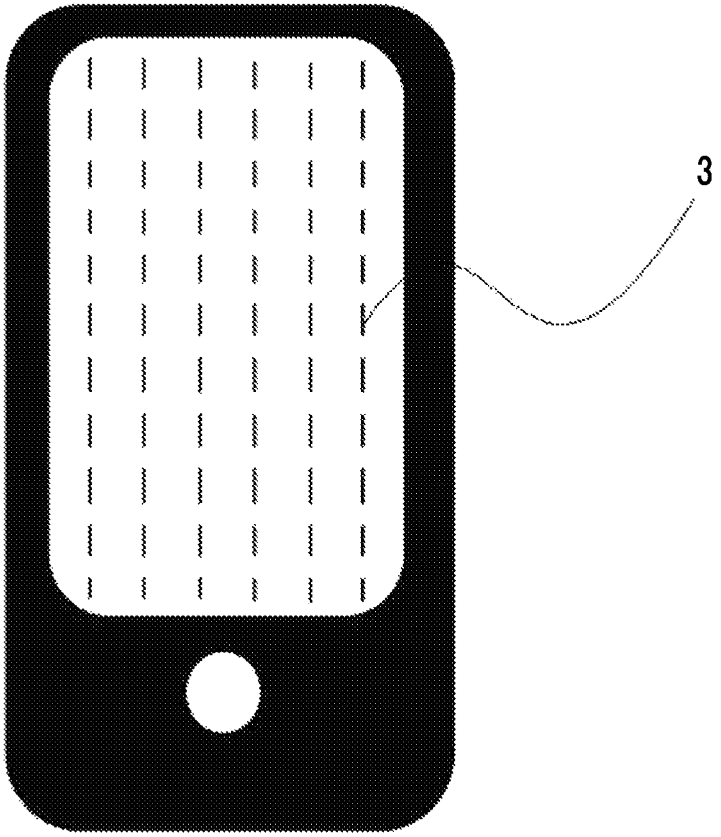
FIG. 7 is a top view showing an example of the front panel in which a first transparent electrode pattern is formed.
Figure 8:
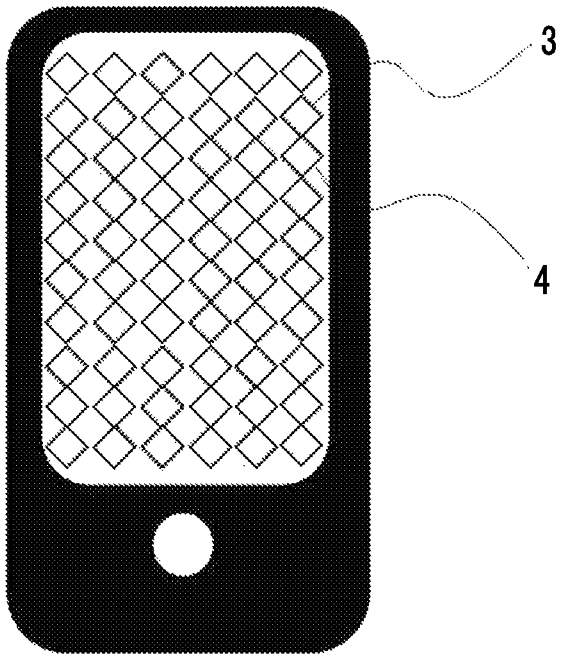
FIG. 8 is a top view showing an example of the front panel in which first and second transparent electrode patterns are formed.
Figure 9:
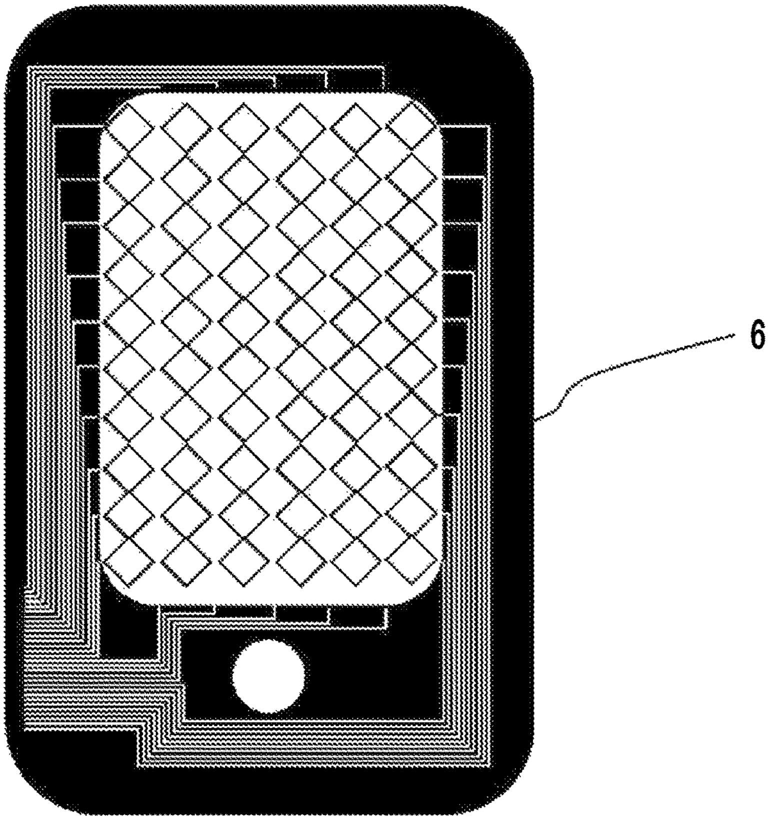
FIG. 9 is a top view showing an example of the front panel in which a conductive element different from the first and second transparent electrode patterns is formed.

Examples of aspects formed in the process of manufacturing the capacitance-type input device of the present invention include the aspects shown in FIGS. 5 to 9. FIG. 5 is a top view showing an example of reinforced glass 11 in which the opening portion 8 is formed. FIG. 6 is a top view showing an example of a front panel in which the mask layer 2 is formed. FIG. 7 is a top view showing an example of a front panel in which the first transparent electrode patterns 3 are formed. FIG. 8 is a top view showing an example of a front panel in which the first transparent electrode patterns 3 and the second transparent electrode patterns 4 are formed. FIG. 9 is a top view showing an example of a front panel in which the different conductive element 6 different from the first and second transparent electrode patterns is formed. These drawings show examples of the following description that is specifically embodied, and the scope of the present invention is not limited to the drawings.

In a case where the second transparent resin layer 12 and the first transparent resin layer 7 are formed in the method for manufacturing a capacitance-type input device, they can be formed by transferring the second transparent resin layer and the first transparent resin layer onto the surface of the front panel 1, in which the respective elements are randomly formed, by using the transfer film of the present invention.

In the method for manufacturing a capacitance-type input device, at least one of the elements including the mask layer 2, the first transparent electrode patterns 3, the second transparent electrode patterns 4, the insulating layer 5, and the conductive element 6 is preferably formed using the transfer film constituted with the temporary support and the transparent resin layer in this order.

In a case where the respective elements are formed using the transfer film of the present invention or a photosensitive film which will be described later, even in the substrate (front panel) has the opening portion, the resist component does not leak from the opening portion. Particularly, in the mask layer in which a light-shielding pattern needs to be formed up to a portion immediately above the boundary line of the front panel, the resist component does not stick (leak) out of the edge of glass. Accordingly, it is possible to manufacture a touch panel in the form of a thin and lightweight layer by a simple step without contaminating the back side of the front panel.

In a case where the mask layer, the insulating layer, and the conductive photocurable resin layer are used, in a case where the permanent materials such as the first transparent electrode patterns, the second transparent electrode patterns, and the conductive element are formed using a photosensitive film, the photosensitive film is laminated on a base material and then subjected to pattern-wise exposure if necessary. Then, in a case of a negative material, an unexposed portion is removed, and in a case of a positive material, an exposed portion is removed by a development treatment. In this way, a pattern can be obtained. During the development, the thermoplastic resin layer and the photocurable resin layer may be developed and removed using different developers or the same developer. If necessary, known development facilities such as a brush or a high-pressure jet may be used in combination. If necessary, after the development, post-exposure and post-baking may be performed.

(Photosensitive Film)

A photosensitive film will be described which is preferably used at the time of manufacturing the capacitance-type input device of the present invention and different from the transfer film of the present invention. The photosensitive film preferably has a temporary support, a photocurable resin layer, and a thermoplastic resin layer between the temporary support and the photocurable resin layer. In a case where a mask layer and the like are formed using the photosensitive film having the thermoplastic resin layer, air bubbles do not easily occur in the element formed by the transfer of the photocurable resin layer, image unevenness or the like does not easily occur in an image display device, and excellent display characteristics can be obtained.

The photosensitive film may be a negative material or a positive material.

<Layer Other than Photocurable Resin Layer and Method for Preparing Same>

As the temporary support, the cover film, and the thermoplastic resin layer in the photosensitive film, it is possible to use the same temporary support, cover film, and thermoplastic resin layer as used in the transfer film of the present invention. Moreover, as the method for preparing the photosensitive film, it is possible to use the same method as the method for preparing the transfer film of the present invention.

<Photocurable Resin Layer>

According to the use of the photosensitive film, additives are added to the photocurable resin layer. That is, in a case where the photosensitive film is used for forming the mask layer, a colorant is incorporated into the photocurable resin layer. Furthermore, in a case where the photosensitive film has a conductive photocurable resin layer, conductive fiber and the like are incorporated into the photocurable resin layer.

In a case where the photosensitive film is a negative material, the photocurable resin layer preferably contains alkali-soluble resin, a polymerizable compound, a polymerization initiator, or a polymerization initiating system. Moreover, conductive fiber, a colorant, other additives, and the like are used, but the present invention is not limited to these.

<Alkali-Soluble Resin, Polymerizable Compound, Polymerization Initiator, or Polymerization Initiating System>

As the alkali-soluble resin, the polymerizable compound, the polymerization initiator, or the polymerization initiating system contained in the photosensitive film, it is possible to use the same alkali-soluble resin, polymerizable compound, polymerization initiator, or polymerization initiating system as used in the transfer film of the present invention.

<Conductive Fiber (In Case where Photosensitive Film is Used as Conductive Photocurable Resin Layer)>

In a case where the photosensitive film, on which the conductive photocurable resin layer is laminated, is used for forming the transparent electrode pattern or for forming the different conductive element, the following conductive fiber and the like can be used in the photocurable resin layer.

The structure of the conductive fiber is not particularly limited and can be appropriately selected according to the purpose. However, the structure is preferably either a solid structure or a hollow structure.

Herein, the fiber having a solid structure is referred to as a “wire” in some cases, and the fiber having a hollow structure is referred to as a “tube” in some cases. Moreover, the conductive fiber having an average minor axis length of 1 nm to 1,000 nm and an average major axis length of 1 μm to 100 μm is referred to as a “nanowire” in some cases.

Furthermore, the conductive fiber having an average minor axis length of 1 nm to 1,000 nm and an average major axis length of 0.1 μm to 1,000 μm and having a hollow structure is referred to as a “nanotube” in some cases.

The material of the conductive fiber is not particularly limited as long as the material has conductivity, and can be appropriately selected according to the purpose. The material is preferably at least one of the metals and carbon, and among these, at least one of the metal nanowires, metal nanotubes, and carbon nanotubes are particularly preferable as the conductive fiber.

In addition, as the conductive fiber, it is also possible to preferably use the mesh pattern described in JP2014-191445A or the mesh formed of thin silver wires described in JP2014-191441A.

The material of the metal nanowires is not particularly limited. For example, at least one kind of metal selected from the group consisting of metals of the fourth period, the fifth period, and the sixth period of the long periodic table (IUPAC 1991) is preferable; at least one kind of metal selected from group 2 to group 14 is more preferable; and at least one kind of metal selected from group 2, group 8, group 9, group 10, group 11, group 12, group 13, and group 14 is even more preferable. The metal nanowires particularly preferably contain these metals as a main component.

Examples of the metal include copper, silver, gold, platinum, palladium, nickel, tin, cobalt, rhodium, iridium, iron, ruthenium, osmium, manganese, molybdenum, tungsten, niobium, tantalum, titanium, bismuth, antimony, lead, an alloy of these, and the like. From the viewpoint of excellent conductivity, metal nanowires containing silver as a main component among these metals or metal nanowires containing an alloy of silver and other metals are preferable.

Containing silver as a main component means that the metal nanowires contain silver in an amount of equal to or greater than 50% by mass and preferably in an amount of equal to or greater than 90% by mass.

Examples of the metal used in the form of an alloy with silver include platinum, osmium, palladium, iridium, and the like. One kind of these metals may be used singly, or two or more kinds thereof may be used in combination.

The shape of the metal nanowires is not particularly limited and can be appropriately selected according to the purpose. For example, the metal nanowires can have any of the shape of a cylinder, a rectangle, and a column having a polygonal cross-section. In a case where the use of the metal nanowires requires a high degree of transparency, the metal nanowires preferably has a cylindrical shape or a shape having a cross-sectional shape with rounded corner.

The cross-sectional shape of the metal nanowires can be investigated by coating a base material with a aqueous dispersion of metal nanowire and observing the cross-section thereof by using a transmission electron microscope (TEM).

Figure 10:
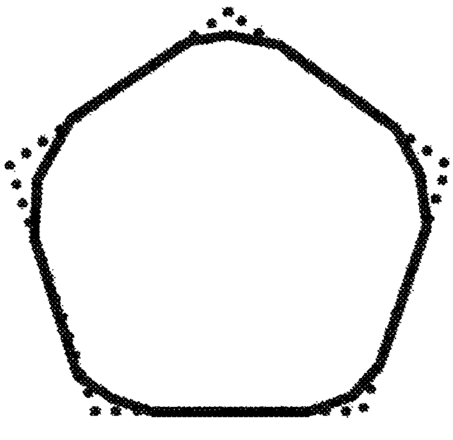
FIG. 10 is a view illustrating the cross-section of a metal nanowire.

Regarding the corner of the cross-section of the metal nanowires, when each side of the cross-section is extended, there is a point that meets perpendicular lines drawn from the sides adjacent to each other, and at this time, the portion in the vicinity of the point means the corner. Furthermore, "each side of the cross-section" refers to a straight line by which the corners adjacent to each other are connected to each other. In this case, a ratio of the "outer circumferential length of the cross-section" to the total length of the "each side of the cross-section" is taken as sharpness. For example, in the cross-section of a metal nanowire shown in FIG. 10, the sharpness can be represented by the ratio between the outer circumferential length of the cross-section indicated by a solid line and the outer circumferential length of the pentagon indicated by a dotted line. In a case where the sharpness is equal to or less than 75%, the cross-sectional shape is defined as a round cross-sectional shape. The sharpness is preferably equal to or less than 60%, and more preferably equal to or less than 50%. In a case where the sharpness is equal to or less than 75%, electrons are inhibited from being localized in the corner, plasmon absorption is inhibited, and accordingly, the deterioration of transparency is inhibited. In addition, the deterioration of linearity of the edge portion of the pattern is inhibited, and hence wobbling does not easily occur. The lower limit of the sharpness is not particularly limited, but is preferably equal to or higher than 30% and more preferably equal to or higher than 40%.

The average minor axis length (referred to as "average manor axis diameter" or "average diameter" in some cases) of the metal nanowires is preferably equal to or less than 150 nm, more preferably 1 nm to 40 nm, even more preferably 10 nm to 40 nm, and particularly preferably 15 nm to 35 nm.

In a case where the average minor axis length is equal to or greater than 1 nm, oxidation resistance becomes excellent, and high durability is obtained. In a case where the average minor axis length is equal to or less than 150 nm, light scattering resulting from the metal nanowires is inhibited, and hence high transparency is obtained.

In order to measure the average minor axis length of the metal nanowires, 300 metal nanowires are observed with a transmission electron microscope (TEM; manufactured by JEOL, Ltd., JEM-2000FX), and from the average thereof, the average minor axis length is determined.

In a case where the minor axis of the metal nanowires is not circular, the greatest length thereof is taken as the minor axis length.

The average major axis length (also referred to as "average length" in some cases) of the metal nanowires is preferably 1 μm to 40 μm, more preferably 3 μm to 35 μm, and even more preferably 5 μm to 30 μm.

In a case where the average major axis length is equal to or greater than 1 μm, a dense network is formed, and hence sufficient conductivity is obtained. In a case where the average major axis length is equal to or less than 40 μm, the metal nanowires are inhibited from being tangled, and hence the occurrence of aggregates during the manufacturing process is inhibited.

In order to measure the average major axis length of the metal nanowire, for example, 300 metal nanowires are observed with a transmission electron microscope (TEM; manufactured by JEOL, Ltd., JEM-2000FX), and from the average thereof, the average major axis length is determined. In a case where the metal nanowires are curved, a circle having the curve as an arc is imagined, and the value calculated from the radius and curvature thereof is taken as the major axis length.

From the viewpoint of process suitability such as stability of the coating solution, drying at the time of coating, and development time at the time of patterning, the thickness of the conductive photocurable resin layer is preferably 0.1 to 20 μm, more preferably 0.5 to 18 μm, and particularly preferably 1 to 15 μm.

From the viewpoint of the conductivity and stability of the coating solution, the content of the conductive fiber with respect to the total solid content of the conductive photocurable resin layer is preferably 0.01% to 50% by mass, more preferably 0.05% to 30% by mass, and particularly preferably 0.1% to 20% by mass.

<Colorant (In Case where Photosensitive Film is Used as Mask Layer)>

In a case where the photosensitive film is used as the mask layer, a colorant can be used in the photocurable resin layer. As the colorant used in the present invention, known colorants (organic pigments, inorganic pigments, dyes, and the like) can be suitably used. Furthermore, in the present invention, in addition to a black colorant, a mixture of pigments of red, blue, green and the like can be used.

In a case where the photocurable resin layer is used as a black mask layer, from the viewpoint of optical density, the photocurable resin layer preferably contains a black colorant. Examples of the black colorant include carbon black, titanium black, iron oxide, titanium oxide, graphite, and the like, and among these, carbon black is preferable.

In a case where the photocurable resin layer is used as a white mask layer, it is possible to use the white pigments described in paragraph 0015 or 0114 of JP2005-7765A. In order to use the photocurable resin layer as a mask layer of other colors, the pigments or dyes described in paragraphs 0183 to 0185 of JP4546276B and the like may be used by being mixed together. Specifically, the pigments and dyes described in paragraphs 0038 to 0054 of JP2005-17716A, the pigments described in paragraphs 0068 to 0072 of JP2004-361447A, the colorants described in paragraphs 0080 to 0088 of JP2005-17521A, and the like can be suitably used.

The colorant (preferably a pigment and more preferably carbon black) is preferably used in the form of a dispersion. The dispersion can be prepared by adding a composition, which is obtained by premixing the colorant with a pigment dispersant, to an organic solvent (or vehicle) which will be described later, and dispersing the resultant. The "vehicle" refers to the portion of medium, in which a pigment is dispersed, in a coating material staying in liquid form. The vehicle includes a component (a binder), which is in liquid form and forms a coating film by being bonded to the pigment, and a component (an organic solvent) which dissolves and dilutes the binder.

A disperser used at the time of dispersing the pigment is not particularly limited, and examples thereof include known dispersers such as a kneader, a roll mill, an attritor, a super mill, a dissolver, a homomixer, a sand mill, and a beads mill described on page 438 of "Pigment Dictionary", Kunizo Asakura, $1^{st}$ edition, Asakura Publishing Co., Ltd., 2000.

Furthermore, the pigment may be finely pulverized by means of mechanical grinding described on page 310 of the same document by using frictional force.

From the viewpoint of dispersion stability, the number-average particle size of the colorant is preferably 0.001 μm to 0.1 μm, and more preferably 0.01 μm to 0.08 μm. Herein, the "particle size" refers to the diameter obtained when images of the particles shown in an electromicrograph are regarded as being circles having the same area. Furthermore, the "number-average particle size" refers to a value determined by measuring the particle size of a large number of particles and calculating the average of 100 particle sizes randomly selected.

From the viewpoint of a difference in the thickness between the photocurable resin layer containing the colorant and other layers, the thickness of the photocurable resin layer is preferably 0.5 to 10 μm, more preferably 0.8 to 5 μm, and even more preferably 1 to 3 μm.

The content rate of the colorant in the solid content of the colored photosensitive resin composition is not particularly limited. From the viewpoint of sufficiently shortening the time taken for development, the content rate is preferably 15% to 70% by mass, more preferably 20% to 60% by mass, and even more preferably 25% to 50% by mass.

In the present specification, the "total solid content" means the total mass of nonvolatile components in the colored photosensitive resin composition excluding a solvent and the like.

In a case where the insulating layer is formed by using the photosensitive film, from the viewpoint of maintaining insulating properties, the thickness of the photocurable resin layer is preferably 0.1 to 5 μm, more preferably 0.3 to 3 μm, and even more preferably 0.5 to 2 μm.

<Other Additives>

Other additives may be used in the photocurable resin layer. As the additives, it is possible to use the same additives as used in the transfer film of the present invention.

As the solvent used at the time of manufacturing the photosensitive film by coating, it is possible to use the same solvent as used for the transfer film of the present invention.

Hitherto, a case where the photosensitive film is a negative material has been mainly described, but the photosensitive film may be a positive material. In a case where the photosensitive film is a positive material, for example, the materials described in JP2005-221726A and the like are used in the photocurable resin layer, but the present invention is not limited thereto.

(Formation of Mask Layer and Insulating Layer by Using Photosensitive Film)

The mask layer 2 and the insulating layer 5 can be formed by transferring the photocurable resin layer onto the front panel 1 or the like by using the aforementioned photosensitive film. For example, in a case where a black mask layer 2 is formed, it can be formed by transferring a black photocurable resin layer onto the surface of the front panel 1 by using the photosensitive film having the black photocurable resin layer as the photocurable resin layer. In a case where the insulating layer 5 is formed, it can be formed by transferring the photocurable resin layer onto the surface of the front panel 1 in which the first transparent electrode patterns are formed, by using the photosensitive film having the photocurable resin layer having insulating properties as the aforementioned photocurable resin layer.

In a case where the photosensitive film, which has a specific layer constitution in which the thermoplastic resin layer is disposed between the photocurable resin layer and the temporary support, is used for forming the mask layer 2 that needs to have light-shielding properties, it is possible to prevent the occurrence of air bubbles at the time of laminating the photosensitive film and to form the high-quality mask layer 2 or the like that does not cause the leakage of light.

(Formation of First and Second Transparent Electrode Patterns and Different Conductive Element by Using Photosensitive Film)

The first transparent electrode patterns 3, the second transparent electrode patterns 4, and the different conductive element 6 can be formed by an etching treatment. Alternatively, they can be formed by using the photosensitive film having the conductive photocurable resin layer or using the photosensitive film as a lift-off material.

<Etching Treatment>

In a case where the first transparent electrode patterns 3, the second transparent electrode patterns 4, and the different conductive element 6 are formed by an etching treatment, first, on the non-contact surface of the front panel 1 in which the mask layer 2 or the like is formed, a transparent electrode layer of ITO or the like is formed by sputtering. Then, on the transparent electrode layer, by using the photosensitive film, which has a photocurable resin layer for etching as the photocurable resin layer, an etching pattern is formed by exposure and development. Thereafter, the transparent electrode layer is etched so as to pattern the transparent electrode, and the etching pattern is removed. In this way, the first transparent electrode patterns 3 and the like can be formed.

Even in a case where the photosensitive film is used as an etching resist (etching pattern), resist patterns can be obtained by the same method as described above. In the etching treatment, etching and resist peeling can be performed by known methods described in paragraphs 0048 to 0054 of JP2010-152155A and the like.

Examples of the etching method include a generally used wet etching method in which the film is immersed into an etchant. The etchant used for wet etching may be appropriately selected from acidic etchants and alkaline etchants according to the subject to be etched. Examples of the acidic etchants include an aqueous solution containing only an acidic component such as hydrochloric acid, sulfuric acid, hydrofluoric acid, and phosphoric acid, an aqueous mixed solution of an acidic component and ferric chloride, ammonium fluoride, or a salt such as potassium permanganate, and the like. As the acidic component, a combination of a plurality of acidic components may be used. Examples of the alkaline etchants include an aqueous solution containing only an alkaline component such as sodium hydroxide, potassium hydroxide, ammonia, organic amine, or a salt of organic amine like tetramethyl ammonium hydroxide, an aqueous mixed solution of an alkaline component and a salt such as potassium permanganate, and the like. As the alkaline component, a combination of a plurality of alkaline components may be used.

The temperature of the etchant is not particularly limited but is preferably equal to or lower than 45° C. In a case where the resin pattern used as an etching mask (etching pattern) in the present invention is formed using the aforementioned photocurable resin layer, the resin pattern exhibits particularly excellent resistance to the acidic and alkaline etchants in the aforementioned temperature range. Accordingly, the resin pattern is prevented from being peeled in the process of etching, and the portion free of the resin pattern is selectively etched.

After the etching, if necessary, in order to prevent line contamination, a washing step and a drying step may be performed. In the washing step, for example, the base material may be washed with pure water at room temperature for 10 to 300 seconds, and in the drying step, the base material may be dried by using an air blower by appropriately adjusting the air blow pressure (about 0.1 to 5 kg/$cm^2$).

The peeling method of the resin pattern is not particularly limited. Examples of the method include a method of immersing the base material in a remover stirred at 30° C. to 80° C., preferably at 50° C. to 80° C., for 5 to 30 minutes. As described above, the resin pattern used as the etching mask in the present invention exhibits excellent chemical resistance at a temperature equal to or lower than 45° C. However, the resin pattern has properties of swelling by the alkaline remover when the temperature of the chemical is equal to or higher than 50° C. Due to such properties, the resin pattern has an advantage in that the time taken for the peeling step is shortened in a case where the remover with a temperature of 50° C. to 80° C. is used for the peeling step, and the resin pattern is peeled leaving a small amount of peeling residues. That is, in a case where the temperature of the chemical is varied between the etching step and the peeling step, the resin pattern used as the etching mask in the present invention exhibits excellent chemical resistance in the etching step and excellent peeling properties in the peeling step. Consequentially, both of the chemical resistance and the peeling properties, which are conflicting characteristics, can be satisfied at the same time.

Examples of the remover include those obtained by dissolving an inorganic alkaline component such as sodium hydroxide or potassium hydroxide or an organic alkaline component such as a tertiary amine or a quaternary ammonium salt in water, dimethyl sulfoxide, N-methylpyrrolidone, or a mixed solution of these. The resin pattern may be peeled by means of a spray method, a shower method, a paddle method, or the like by using the remover.

(Photosensitive Film Having Conductive Photocurable Resin Layer)

In a case where the first transparent electrode patterns 3, the second transparent electrode patterns 4, and the different conductive element 6 are formed by using the photosensitive film having the conductive photocurable resin layer, they can be formed by transferring the conductive photocurable resin layer onto the surface of the front panel 1.

In a case where the first transparent electrode patterns 3 and the like are formed using the photosensitive film having the conductive photocurable resin layer, it is possible to manufacture a touch panel that can be made into a thin and lightweight layer by a simple step, without causing the resist component to leak from an opening portion even when the substrate (front panel) has the opening portion and without contaminating the back side of the substrate.

Furthermore, in a case where the photosensitive film, which has a specific layer constitution in which the thermoplastic resin layer is disposed between the conductive photocurable resin layer and the temporary support, is used for forming the first transparent electrode patterns 3 and the like, it is possible to prevent the occurrence of air bubbles at the time of laminating the photosensitive film and to form the first transparent electrode patterns 3, the second transparent electrode patterns 4, and the different conductive element 6 that have excellent conductivity and exhibit low electrical resistance.

(Use of Photosensitive Film as Lift-Off Material)

The first transparent electrode layer, the second transparent electrode layer, and the different conductive member can also be formed using the photosensitive film as a lift-off material.

In this case, after patterning is performed using the photosensitive film, transparent conductive layers are formed on the entire surface of the base material, and then the photocurable resin layer is dissolved and removed for each of the deposited transparent conductive layers. In this way, desired patterns of the transparent conductive layers can be obtained (a lift-off method).

4. Image Display Device

The image display device of the present invention includes the capacitance-type input device of the present invention as a constituent.

To the capacitance-type input device of the present invention and the image display device including the capacitance-type input device as a constituent, the constitution disclosed in "The Latest Touch Panel Technologies" (published on Jul. 6, 2009, Techno-Times Co., Ltd.), "Technologies and Development of Touch Panel" (supervised by Yuji Mitani, CMC Publishing CO., LTD., 2004, 12), T-11 lecture textbook of FPD International 2009 Forum, Cypress Semiconductor Corporation Application Note AN2292, and the like can be applied.

The method for manufacturing an image display device of the present invention includes a step of laminating the resin layer of the transfer film of the present invention.

The step of laminating the resin layer of the transfer film of the present invention has the same definition as the step of laminating the resin layer of the transfer film of the present invention on the transparent electrode pattern positioned on the base material in the method for manufacturing a laminate of the present invention, and the preferred aspect thereof is also the same.

Furthermore, the method for manufacturing an image display device of the present invention may include a step that can be included in the method for manufacturing a laminate of the present invention.

EXAMPLES

Hereinafter, the present invention will be more specifically described based on examples. The materials, the amount and proportion thereof used, the content of treatments, the procedure of treatments, and the like can be appropriately changed, as long as the change does not depart from the gist of the present invention. Accordingly, the scope of the present invention is not limited to the following specific examples. Herein, unless otherwise specified, "%" and "part" are based on mass.

Example 1

<Preparation of Transfer Film I1 Including Transparent Resin Layer>

[Formation of First Transparent Resin Layer]

By using a slit-like nozzle, a biaxially-stretched polyethylene terephthalate film (temporary support) having a thickness of 16 μm was coated with the following formulation OC1 prepared as below and dried for 2 minutes at 100° C. and then for 1 minute at 120° C., thereby forming a first transparent resin layer.

Coating Solution for First Transparent Resin Layer: Formulation OC1

Tricyclodecane dimethanol diacrylate (A-DCP, manufactured by SHIN-NAKAMURA CHEMICAL CO., LTD.): 8.31 parts by mass Urethane acrylate U-15HA (manufactured by SHIN-NAKAMURA CHEMICAL CO., LTD.): 2.52 parts by mass Polymer solution 1 (1-methoxy-2-propanol (40%), and 1-methoxy-2-propylacetate (40%) solution (solid content: 45%) of the following Structural Formula P-25; cyclohexyl methacrylate (a)/methyl methacrylate (b)/glycidyl methacrylate adduct (d) of methacrylic acid copolymer (c) (composition (mol %): a/b/c/d=46/2/20/32, weight-average molecular weight: 35,000, acid value: 66 mgKOH/g)): 9.60 parts by mass Photoradical polymerization initiator: 1,2-octandione,1-[4-(phenylthio)-,2-(O-benzoyloxime)] (trade name: IRGACURE OXE-01, manufactured by BASF SE): 0.61 parts by mass Surfactant (trade name: MEGAFACE F-784F, manufactured by DIC Corporation): 0.03 parts by mass Methyl ethyl ketone: 37.87 parts by mass 1-Methoxy-2-propylacetate (manufactured by Daicel Corporation): 41.06 parts by mass The details of the formulation OC1 are shown in the following Table 1 in relation to T1 which will be described later. In the table "-" means that the corresponding component is not contained in the formulation.

(P-25)

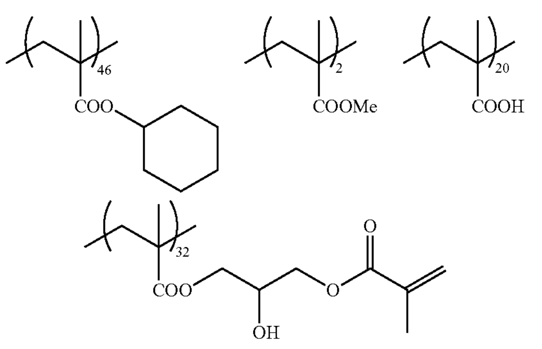

The polymer represented by Structural Formula P-25 used in the polymer solution 1 was synthesized according to the method of paragraph 0106 of JP2008-146018A.

[Formation of Second Transparent Resin Layer]

Then, the first transparent resin layer was coated with a coating solution for a second transparent resin layer composed of the following formulation IM1 such that desired dry film thicknesses as described in the following Tables 2 to 5 were obtained. The coating solution was dried for 1 minute at 80° C. and then for 1 minute at 110° C., thereby forming a second transparent resin layer.

Coating Solution for Second Transparent Resin Layer: Formulation IM1

Zirconia ($ZrO_2$) dispersion (trade name: NANOUSE OZ-S30M; manufactured by NISSAN CHEMICAL INDUSTRIES, LTD., inorganic particles: 30.5% by mass, organic acid: 2.8% by mass, methanol: 66.7% by mass): 4.71 parts by mass Aqueous ammonia: 3.92 parts by mass Methacrylic acid/allyl methacrylate copolymer resin (Mw: 25,000, compositional ratio (molar ratio)=23.5/76.5, nonvolatile fraction: 99.8%): 0.33 parts by mass

TABLE 1

| Material | OC1 | T1 |
|---|---|---|
| $ZrO_2$: manufactured by SOLAR CO., LTD., ZR-010 | — | 2.08 |
| DPHA solution (dipentaerythritol hexaacrylate: 38%, dipentaerythritol pentaacrylate: 38%, 1-methoxy-2-propylacetate: 24%) | — | 0.29 |
| Urethane-based monomer (NK OLIGO UA-32P, manufactured by SHIN-NAKAMURA CHEMICAL CO., LTD., nonvolatile fraction: 75%, 1-methoxy-2-propylacetate: 25%) | — | 0.14 |
| Monomer mixture (polymerizable compound (b2-1) described in paragraph [0111] of JP2012-78528A, content rate of n = 1 tripentaerythritol octaacrylate: 85%, total amount of n = 2 and n = 3 as impurities: 15%) | — | 0.36 |
| Tricyclodecane dimethanol diacrylate (A-DCP, manufactured by SHIN-NAKAMURA CHEMICAL CO., LTD.) | 8.31 | — |
| Urethane acrylate U-15HA (manufactured by SHIN-NAKAMURA CHEMICAL CO., LTD.) | 2.52 | — |
| Polymer solution 1 (Structural Formula P-25: weight-average molecular weight = 35,000, solid content: 45%, 1-methoxy-2-propylacetate: 15%, 1-methoxy-2-propanol: 40%) | 9.60 | 1.89 |
| Photoradical polymerization initiator: 1,2-octanedione,1-[4-(phenylthio)-,2-(O-benzoyloxime)] (Irgacure OXE-01, manufactured by BASF SE) | 0.61 | 0.03 |
| Photopolymerization initiator: KAYACURE DETX-S (manufactured by Nippon Kayaku Co., Ltd., alkyl thioxanthone) | — | 0.03 |
| Surfactant (trade name: MEGAFACE F-784F, manufactured by DIC Corporation) | 0.03 | 0.01 |
| 1-Methoxy-2-propylacetate | 41.06 | 38.73 |
| Methyl ethyl ketone | 37.87 | 56.80 |
| Total (parts by mass) | 100 | 100 |

Polymerizable compound of Structural Formula 1: 0.3 parts by mass

Water-soluble photopolymerization initiator (IRGACURE 2959, manufactured by BASF SE): 0.03 parts by mass Deionized water: 30.7 parts by mass Methanol: 60.0 parts by mass Structural Formula 1

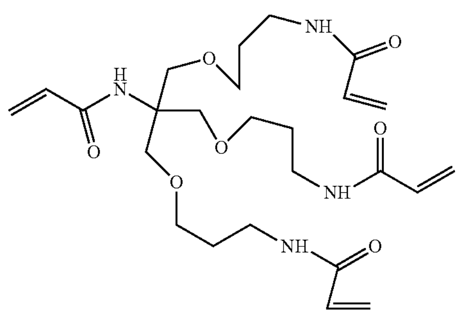

$ZrO_2$ used in the zirconia dispersion in IM1 is particles having a refractive index of 2.2 and an average particle size of 12 nm.

<Pressure Bonding of Cover Film>

In the manner described above, on the temporary support, the first transparent resin layer and the second transparent resin layer were provided such that the dry film thickness described in the following tables was obtained. Then, finally, as a cover film, a smooth surface of LUMIRROR #16QS62 (polyester film; surface roughness SRz after peeling=69 nm, SRa after peeling=5.5 nm) manufactured by TORAY INDUSTRIES, INC having a thickness of 16 μm was pressure-bonded to the resin layer.

In this way, a transfer film in which the temporary support, the first transparent resin layer, the second transparent resin layer, and the cover film were integrated was prepared. The obtained transfer film was named a transfer film I1 of Example 1.

(Evaluation of Surface Roughnesses SRz and SRa of Cover Film)

<Evaluation of Surface Roughnesses SRz and SRa of Cover Film Before Pressure Bonding>

Before the cover film was pressure-bonded by the aforementioned method, the surface roughnesses of the surface of the cover film that will be pressure-bonded to the resin layer were measured by the following method.

By using a fine profile analyzer ET-350K (manufactured by Kosaka Laboratory Ltd.), the surface roughnesses SRz and SRa of the cover film before pressure bonding were measured under the following conditions. The values of SRz and SRa were calculated using the following three-dimensional analysis software based on JIS-B-0601-2001.

The measured results are described in the column of "Surface roughnesses before pressure bonding" in Table 2.

Three-dimensional analysis software: TDA-22 (manufactured by Kosaka Laboratory Ltd.)

Stylus pressure: 0.04 mN

Measurement length: 0.5 mm

Feed rate: 0.1 mm/s

Line pitch: 5 μm

Number of lines: 40

Magnification of height: ×50,000

Measurement direction: MD direction

<Evaluation of Dimensional Stability of Cover Film Before Pressure Bonding>

Before the cover film was pressure-bonded by the aforementioned method, the dimensional stability of the cover film was measured by the following method.

What percent of change occurred in the width of the cover film along a machine direction (MD) and a transverse direction (TD) respectively after the cover film was thermally treated for 30 minutes at 100° C. compared to the width before the thermal treatment was measured.

The measured results are described in the column of "Dimensional stability" in Table 2. In the table, "%" is used as the unit, the column of "MD (%)" shows the results measured in the machine direction, and the column of "TD (%)" shows the results measured in the transverse direction.

<Method for Peeling Cover Film>

The transfer film I1 was cut in the shape of an A4-size sheet and placed on a flat glass plate, on the cover film side up. The cover film at the corner of the transfer film I1 was peeled a little, the portion in which the second transparent resin layer was exposed (the corner of the transfer film I1 from which a portion of the cover film had been peeled) was fixed to the glass plate by using a tape, and the corner of the cover film was fixed to a paper tube having a diameter of 3 cm by using a tape. While being wound around the paper tube, the cover film was peeled at a rate of 1 cm/sec at an angle of 45° with respect to the glass plate.

<Evaluation of Surface Roughnesses SRz and SRa of Cover Film After Peeling>

The surface roughnesses SRz and SRa of the cover film after peeling were measured in the same manner as used for measuring the surface roughnesses SRz and SRa of the cover film before pressure bonding. The surface roughnesses SRz and SRa of the cover film after peeling are referred to as "SRz and SRa after peeling" as well. The measured results are shown in the column of "Surface roughnesses after peeling" in Table 2.

(Evaluation of Transfer Film)

<Evaluation of Winding Wrinkles>

The transfer film I1, which was prepared by laminating the transparent resin layer (consisting of two layers including the first transparent resin layer and the second transparent resin layer) and the cover film in this order on the temporary support was slit in a width of 45 cm, and at the same time, the transfer film I1 was wound 100 m around a winding core made of ABS having a diameter of 3 inches (1 inch=2.54 cm) at a tension of 11.5 kg/m. The surface of the wound transfer film I1 was visually observed. The evaluation result is preferably A, B, or C, more preferably A or B, and particularly preferably A.

[Evaluation Standards]

A: The transfer film was in an extremely excellent state where the entire surface was uniformly wound, and the transferred transparent resin layer (consisting of two layers including the first transparent resin layer and the second transparent resin layer) had no problem.

B: Although the layer of air drawn in between the temporary support and the cover film was observed as vertical stripes, the layer disappeared after the transfer film was allowed to stand for 24 hours. The transfer film was in an excellent state where the entire surface was uniform, and the transferred transparent resin layer (consisting of two layers including the first transparent resin layer and the second transparent resin layer) had no problem.

C: Although the layer of air drawn in between the temporary support and the cover film was observed as vertical stripes even after the transfer film was allowed to stand for 24 hours, the transfer film was in a normal state where the transparent resin layer (consisting of two layers including the first transparent resin layer and the second transparent resin layer) had no problem.

D: The transfer film was in a poor state where winding wrinkles were drawn into the central portion and remained even after the transfer film was allowed to stand for 24 hours, and the trace of the wrinkles also remained in the transferred transparent resin layer (consisting of two layers including the first transparent resin layer and the second transparent resin layer).

E: The transfer film was in an extremely poor state where winding wrinkles were drawn into the entire surface and remained in the entire surface even after the transfer film was allowed to stand for 24 hours, and the trace of wrinkles also remained in the transferred transparent resin layer (consisting of two layers including the first transparent resin layer and the second transparent resin layer).

The obtained results are described in Table 2.

<Evaluation of Cracking>

The transfer film I1, which was prepared by laminating the transparent resin layer (consisting of two layers including the first transparent resin layer and the second transparent resin layer) and the cover film in this order on the temporary support, was folded by being wound around rods with different diameters in a state where the temporary support side faced inward, and the folded sites were observed with an optical microscope so as to evaluate cracking. The evaluation result is preferably A, B, or C, more preferably A or B, and even more preferably A.

[Evaluation Standards]

A: Cracking did not occur even when the transfer film was folded by being wound around a 2 mmΦ rod.

B: Cracking did not occur even when the transfer film was folded by being wound around a 3 mmΦ rod.

C: Cracking did not occur even when the transfer film was folded by being wound around a 4 mmΦ rod.

D: Cracking did not occur even when the transfer film was folded by being wound around a 5 mmΦ rod.

E: At the point in time when the transfer film was prepared, fine cracks occurred.

The obtained results are described in the following Table 2.

<Evaluation of Transparency of Transparent Resin Layer Before Curing Formed on Temporary Support>

After the cover film of the transfer film I1 was peeled, the transfer film was subjected to lamination such that a glass substrate and the transparent resin layers contacted each other (base material temperature: 25° C., rubber roller temperature: 100° C., line pressure: 100 N/cm, transport rate: 1.0 m/min). After the temporary support was peeled, the transmittance of the glass substrate with transparent resin layers was measured within a range of 400 to 780 nm by using a spectrophotometer (manufactured by Shimadzu Corporation: UV-VISIBLE RECORDING SPECTROPHOTOMETER UV-2100 model). At this time, as a reference, a glass from which a portion was cut off in advance was used. The transmittance was measured at a pitch of 1 nm. The minimum value of the transmittance measured within a range of 400 to 450 nm was taken as a "transmittance within a range of 400 to 450 nm", and the minimum value of the transmittance measured within a range of 450 to 780 nm was taken as a "transmittance within a range of 450 to 780 nm". The evaluation result is preferably A, B, or C, more preferably A or B, and particularly preferably A.

[Evaluation Standards]

A: The transmittance within a range of 400 to 450 nm was equal to or higher than 95%, and the transmittance within a range of 450 to 780 nm was equal to or higher than 97%. Therefore, the transparency was extremely excellent.

B: The transmittance within a range of 400 to 450 nm was equal to or higher than 90% and less than 95%, and the transmittance within a range of 450 to 780 nm was equal to or higher than 95% and less than 97%. Therefore, the transparency was excellent.

C: The transmittance within a range of 400 to 450 nm was equal to or higher than 80% and less than 90%, and the transmittance within a range of 450 to 780 nm was equal to or higher than 80% and less than 95%. Therefore, the transparency was normal.

D: The transmittance within a range of 400 to 450 nm or 450 to 780 nm was less than 80%. Therefore, the transparency was poor.

The obtained results are described in Table 2.

(Preparation of Transparent Laminate)

By using the transfer film I1 of Example 1 obtained as above, a transparent laminate was prepared by the following method.

<1. Formation of Transparent Film>

On a transparent substrate made of glass (glass substrate) having a refractive index of 1.51, a transparent film having a refractive index of 1.60 and a film thickness of 80 nm was prepared by the following method by using T1 shown in Table 1.

[Preparation of Transfer Material]

A polyethylene terephthalate film (temporary support) having a thickness of 75 μm was coated with a coating solution for a thermoplastic resin layer composed of the following formulation H1 by using a slit-like nozzle, and the coating solution was dried, thereby forming a thermoplastic resin layer. Then, the thermoplastic resin layer was coated with a coating solution for an interlayer composed of the following formulation P1, and the coating solution was dried, thereby forming an interlayer.

Then the interlayer was coated with a coating solution (composition for forming a transparent resin layer) T1 for a composition for a transparent curable composition, and the coating solution was dried, thereby forming a transparent resin layer. In this way, on the temporary support, the thermoplastic resin layer having a dry film thickness of 15.1 μm, the interlayer having a dry film thickness of 1.6 μm, and the transparent resin layer having a dry film thickness of 80 nm were provided. Finally, a cover film (thickness: 12 μm, a polypropylene film) was pressure-bonded onto the transparent resin layer. In this way, a transfer material was prepared in which the temporary support, the thermoplastic resin layer, the interlayer (oxygen barrier layer), the transparent resin layer, and the cover film were integrated.

Coating Solution for Thermoplastic Resin Layer: Formulation H1

Methanol: 11.1 parts by mass

Propylene glycol monomethyl ether acetate: 6.36 parts by mass

Methyl ethyl ketone: 52.4 parts by mass

Methyl methacrylate/2-ethylhexyl acrylate/benzyl methacrylate/methacrylic acid copolymer (compositional ratio of copolymerization (molar ratio)=55/11.7/4.5/28.8, weight-average molecular weight=100,000, Tg (glass transition temperature) 70° C.): 5.83 parts by mass Styrene/methacrylic acid copolymer (compositional ratio of copolymerization (molar ratio)=63/37, weight-average molecular weight=10,000, Tg 100° C.): 13.6 parts by mass Monomer 1 (trade name: BPE-500, manufactured by SHIN-NAKAMURA CHEMICAL CO., LTD.): 9.1 parts by mass Fluorine-based polymer: 0.54 parts by mass The aforementioned fluorine-based polymer is a 30% by mass methyl ethyl ketone solution of a copolymer of $C_6F_{13}CH_2CH_2OCOCH{=}CH_2$ (40 parts), $H(OCH(CH_3)CH_2)_7OCOCH{=}CH_2$ (55 parts), and $H(OCHCH_2)_7OCOCH{=}CH_2$ (5 parts) having a weight-average molecular weight of 30,000 (trade name: MEGAFACE F780F, manufactured by DIC Corporation).

Coating Solution for Interlayer: Formulation P1

Polyvinyl alcohol: 32.2 parts by mass (trade name: PVA205, manufactured by KURARAY CO., LTD., degree of saponification=88%, degree of polymerization: 550)

Polyvinyl pyrrolidone: 14.9 parts by mass (trade name: K-30, manufactured by ISP JAPAN)

Distilled water: 524 parts by mass

Methanol: 429 parts by mass

[Formation of Transparent Film]

By using the transfer material from which the cover film was peeled, the transparent resin layers, the thermoplastic resin, the interlayer, and the PET temporary support were transferred together onto the transparent substrate made of glass, and then the PET temporary support was peeled. Thereafter, by using a proximity-type exposure machine (manufactured by Hitachi High-Tech Electronics Engineering Co. Ltd.) having an ultrahigh-pressure mercury lamp, flood exposure was performed from the thermoplastic resin layer side by using an i-line at 40 mJ/cm$^2$. Subsequently, by using a triethanolamine-based developer (containing 30% triethanolamine, obtained by diluting T-PD2 (trade name, manufactured by FUJIFILM Corporation) with pure water by 10-fold (mixing 1 part of T-PD2 with 9 parts of pure water)), shower development was performed for 60 seconds at 30° C. and at a flat nozzle pressure of 0.04 MPa, and the thermoplastic resin and the interlayer were removed. Then air was blown onto the upper surface (transparent resin layer side) of the transparent substrate made of glass such that the developer was removed, pure water was sprayed onto the substrate for 10 seconds by shower such that the substrate was washed with pure water by shower, and air was blown into the substrate such that the liquid puddle on the transparent substrate made of glass was reduced. Thereafter, the transparent substrate made of glass was subjected to a heating treatment (post-baking) for 60 minutes at 230° C. such that transparent resin layer was heated, cured, and became a transparent film. In this way, a substrate in which the transparent film was laminated on the transparent substrate made of glass was obtained.

<2. Formation of Transparent Electrode Pattern>

The substrate obtained as above in which the transparent film was laminated on the transparent substrate made of glass was put into a vacuum chamber, and by using an ITO (indium:tin=95:5 (molar ratio)) target containing 10% by mass of $SnO_2$, an ITO thin film having a thickness of 40 nm and a refractive index of 1.82 was formed by DC magnetron sputtering (condition: base material temperature of 250° C., argon pressure of 0.13 Pa, oxygen pressure of 0.01 Pa), thereby obtaining a front panel in which the transparent electrode layer was formed. The surface electrical resistance of the ITO thin film was 80Ω/square.

<Preparation of Photosensitive Film E1 for Etching>

A polyethylene terephthalate film (temporary support) having a thickness of 75 μm was coated with the coating solution for a thermoplastic resin layer composed of the aforementioned formulation H1 by using a slit-like nozzle, and the coating solution was dried, thereby forming a thermoplastic resin layer. Then, the thermoplastic resin layer was coated with the coating solution for an interlayer composed of the aforementioned formulation P1, and the coating solution was dried, thereby forming an interlayer.

The interlayer was then coated with a coating solution for a photocurable resin layer for etching: formulation E1, and the coating solution was dried, thereby forming a photocurable resin layer for etching. In this way, a laminate was obtained in which the thermoplastic resin layer having a dry film thickness of 15.1 μm, the interlayer having a dry film thickness of 1.6 μm, and the photocurable resin layer for etching having a film thickness of 2.0 μm were laminated on the temporary support. Finally, a cover film (polypropylene film having a thickness of 12 μm) was pressure-bonded onto the photocurable resin layer for etching. In this way, a transfer material was prepared in which the temporary support, the thermoplastic resin layer, the interlayer (oxygen barrier layer), and the photocurable resin layer for etching were integrated.

[Coating Solution for Photocurable Resin Layer for Etching: Formulation E1]

Methyl methacrylate/styrene/methacrylic acid copolymer (composition of copolymer (% by mass): 31/40/29, weight-average molecular weight: 60,000, acid value: 163 mgKOH/g): 16 parts by mass Monomer 1 (trade name: BPE-500, manufactured by SHIN-NAKAMURA CHEMICAL CO., LTD.): 5.6 parts by mass 0.5 mol Tetraethylene oxide monomethacrylate adduct of hexamethylene diisocyanate: 7 parts by mass Cyclohexane dimethanol monoacrylate as a compound having one polymerizable group in a molecule: 2.8 parts by mass 2-Chloro-N-butylacridone: 0.42 parts by mass 2,2-Bis(o-chlorophenyl)-4,4',5,5'-tetraphenylbiimidazole: 2.17 parts by mass Malachite green oxalate: 0.02 parts by mass Leucocrystal violet: 0.26 parts by mass Phenothiazine: 0.013 parts by mass Surfactant (trade name: MEGAFACE F-780F, manufactured by DIC Corporation): 0.03 parts by mass Methyl ethyl ketone: 40 parts by mass 1-Methoxy-2-propanol: 20 parts by mass The viscosity of the coating solution for a photocurable resin layer for etching that was measured at 100° C. after removing the solvent of the formulation E1 was 2,500 Pa·sec.

<Formation of Transparent Electrode Pattern>

The front panel in which the transparent electrode layer was formed was washed, and the photosensitive film E1 for etching from which the cover film was removed was laminated thereon (base material temperature: 130° C., rubber roller temperature: 120° C., line pressure: 100 N/cm, transport rate: 2.2 m/min). After the temporary support was peeled, the distance between the surface of a mask (quartz exposure mask having a transparent electrode pattern) and the photocurable resin layer for etching was set to be 200 μm, and pattern-wise exposure was performed in an exposure amount of 50 mJ/cm$^2$ (i-line).

Then, by using a triethanolamine-based developer (containing 30% by mass triethanolamine, a solution obtained by diluting T-PD2 (trade name, manufactured by FUJIFILM Corporation) with pure water by 10-fold), a developing treatment was performed for 100 seconds at 25° C. Thereafter, by using a surfactant-containing washer (a solution obtained by diluting T-SD3 (trade name, manufactured by FUJIFILM Corporation) with pure water by 10-fold), a washing treatment was performed for 20 seconds at 33° C. The front panel having undergone the washing treatment was scrubbed with a rotary brush, and ultrapure water was sprayed from an ultrahigh-pressure washing nozzle to the front panel, thereby removing residues. Subsequently, a post-baking treatment was performed for 30 minutes at 130° C., thereby obtaining a front panel in which the patterns of a transparent electrode layer and a photocurable resin layer for etching were formed.

The front panel, in which the patterns of a transparent electrode layer and a photocurable resin layer for etching were formed, was subjected to a treatment (etching treatment) for 100 seconds by being immersed into an etching tank containing an ITO etchant (hydrochloric acid, aqueous solution of potassium chloride, temperature of 30° C.) such that the transparent electrode layer in an exposed area not being covered with the photocurable resin layer for etching was dissolved and removed. In this way, a front panel with a transparent electrode layer pattern was obtained which included a photocurable resin layer pattern for etching.

Then, the front panel with a transparent electrode layer pattern including the photocurable resin layer pattern for etching was subjected to a treatment (removal treatment) for 200 seconds by being immersed into a resist removing tank containing a resist remover (N-methyl-2-pyrrolidone, monoethanolamine, surfactant (trade name: SURFYNOL 465, manufactured by Air Products and Chemicals, Inc.), temperature of 45° C.) such that the photocurable resin layer pattern for etching was removed. In this way, a substrate was obtained in which the transparent film and the transparent electrode pattern were formed on the transparent substrate made of glass.

The end portion of the transparent electrode pattern was coated with Pt (thickness: 20 nm) such that conductivity was imparted and the surface was protected. Then, by using a Nova 200-model FIB/SEM combined machine manufactured by FEI, the shape of the end portion of the transparent electrode pattern was observed (secondary electron image, acceleration voltage: 20 kV).

The formed ITO pattern was found to have a tapered shape as shown in FIG. 11 and have a taper angle α of 3°.

<3. Formation of First Transparent Resin Layer and Second Transparent Resin Layer>

On the substrate obtained as above by forming the transparent film and the transparent electrode pattern on the transparent substrate made of glass, the transfer film I1 of Example 1 from which the cover film was removed was laminated (rubber roller temperature: 100° C., line pressure: 0.6 Pa, transport rate: 4.0 m/min). As a result of evaluating the lamination bubbles based on the following standards, it was found that winding wrinkles were not drawn into the film and the film had no problem.

The distance between the surface of an exposure mask (quarts exposure mask having a pattern for forming an overcoat layer) and the temporary support was set to be 125 μm, and pattern-wise exposure was performed in an exposure amount of 100 mJ/cm$^2$ (i-line) through the temporary support. After the temporary support was peeled, a washing treatment was performed for 40 seconds at 33° C. by using 1% aqueous solution of sodium carbonate. The front panel having undergone the washing treatment was scrubbed with a rotary brush, and ultrapure water was sprayed from an ultrahigh-pressure washing nozzle to the front panel, thereby removing residues. Subsequently, by blowing air to the substrate, the water on the base material was removed, and a post-baking treatment was performed for 30 minutes at 145° C., thereby obtaining a transparent laminate in which the transparent film, the transparent electrode pattern, the second transparent resin layer, and the first transparent resin layer were consecutively laminated in this order on the transparent substrate made of glass.

In this way, a transparent laminate was obtained in which the transparent film, the transparent electrode pattern, the second transparent resin layer, and the first transparent resin layer were laminated in this order on the transparent substrate made of glass. The obtained transparent laminate was named a transparent laminate of Example 1.

By the method described above, the dry film thicknesses (thicknesses, μm) and the refractive indices of the first transparent resin layer and the second transparent resin layer were measured. The results are described in Table 2. In Table 2, the dry film thicknesses and refractive indices of the first transparent resin layer and the second transparent resin layer in the transparent laminate are also described.

(Evaluation of Transparent Laminate)

<Evaluation of Lamination Bubbles>

The substrate on which the transparent resin layer (consisting of two layers including the first transparent resin layer and the second transparent resin layer) were laminated was observed with eyes and an optical microscope and evaluated as below. For practical use, the evaluation result needs to be A, B, or C. The evaluation result is preferably A or B, and more preferably A.

[Evaluation Standards]

A: No lamination bubbles were seen on the base material, and the visually observed leveling had no problem. The level of the lamination bubbles was extremely excellent.

B: Although the lamination bubbles were slightly seen on the base material other than the transparent electrode pattern, there is no problem because the bubbles disappeared through development and the post-baking treatment. The level of the lamination bubbles was excellent.

C: Although the lamination bubbles were slightly observed in the edge portion of the transparent electrode pattern, there is no problem because the bubbles disappeared through development and the post-baking treatment. The level of the lamination bubbles was normal.

D: The lamination bubbles were observed in the edge portion of the transparent electrode pattern and did not disappear even through development and the post-baking treatment. The level of the lamination bubbles was poor.

E: The lamination bubbles were observed over the entire surface of the base material and did not disappear even through development and the post-baking treatment. The level of the lamination bubbles was extremely poor.

The obtained results are described in Table 2.

<Moist Heat Test>

The obtained transparent laminate was left as is for 72 hours in a thermohygrostat tank with a relative humidity of 85% and a temperature of 85° C. Before and after the test, the surfaces of the transparent film, the transparent electrode pattern, and the transparent resin layer (consisting of two layers including the second transparent resin layer and the first transparent resin layer) on the base material were observed with eyes and an optical microscope. Furthermore, the value of electrical resistance of the transparent electrode pattern was measured, evaluated as below. For practical use, the evaluation result needs to be A, B, or C. The evaluation result is preferably A or B, and more preferably A. Herein, the rate of an increase of the value of electrical resistance of the transparent electrode pattern was calculated by the following equation.

Rate of increase of resistivity of transparent electrode pattern (%)=(value of electrical resistance of transparent electrode pattern after being left for 72 hours−value of electrical resistance of transparent electrode pattern before being left for 72 hours−1)×100

[Evaluation Standards]

A: Before and after the test, no change was seen on the surfaces of the transparent film, the transparent electrode pattern, and the transparent resin layer (consisting of two layers including the second transparent resin layer and the first transparent resin layer) on the base material. The rate of increase of the value of electrical resistance of the transparent electrode pattern was less than 1%.

B: After the test, no change was seen on the surfaces of the transparent film, the transparent electrode pattern, and the transparent resin layer (consisting of two layers including the second transparent resin layer and the first transparent resin layer) on the base material. The rate of increase of the value of electrical resistance of the transparent electrode pattern was equal to or higher than 1% and less than 2%.

C: After the test, no change was seen on the surface of the transparent resin layer (consisting of two layers including the second transparent resin layer and the first transparent resin layer), but the edge portion of the transparent electrode pattern showed a change of a tint. The rate of increase of the value of electrical resistance of the transparent electrode pattern was equal to or higher than 2% and less than 4%.

D: After the test, the surface of the transparent resin layer (consisting of two layers including the second transparent resin layer and the first transparent resin layer) slightly became turbid. In the transparent electrode pattern, spot-like corroded portions were observed. The rate of increase of the value of electrical resistance of the transparent electrode pattern was equal to or higher than 5% and less than 20%.

E: Before and after the test, the surface condition of the transparent resin layer (consisting of two layers including the second transparent resin layer and the first transparent resin layer) greatly changed and became turbid. Due to the corrosion, disconnection was observed in the transparent electrode pattern, and the rate of increase of the value of electrical resistance of the transparent electrode pattern could not be measured.

The obtained results are described in the following Table 2.

<Evaluation of Transparency of Cured Transparent Resin Layer Formed in Transparent Laminate>

Lamination was performed as described above (base material temperature: 25° C., rubber roller temperature: 100° C., line pressure: 100 N/cm, transport rate: 1.0 m/min) such that a glass substrate and a transparent resin layer contacted each other. After the temporary support was peeled, flood exposure was performed in an exposure amount of 100 mJ/cm$^2$ (i-line). Then, development was performed for 40 seconds by using a 1% aqueous solution of sodium carbonate kept at 33° C., the substrate was then rinsed with pure water, and the surplus water was removed using an air knife. Thereafter, the substrate was baked for 30 minutes at 145° C. By using a spectrophotometer (manufactured by Shimadzu Corporation: UV-VISIBLE RECORDING SPECTROPHOTOMETER UV-2100 model), the transmittance of the obtained glass substrate with a transparent resin layer was measured within a range of 400 to 780 nm. At this time, as a reference, a glass substrate from which a portion was cut off in advance was used. The transmittance was measured at a pitch of 1 nm. The minimum value of the transmittance measured within a range of 400 to 450 nm was taken as a "transmittance within a range of 400 to 450 nm", and the minimum value of the transmittance measured within a range of 450 to 780 nm was taken as a "transmittance within a range of 450 to 780 nm". The evaluation result is preferably A, B, or C, more preferably A or B, and particularly preferably A.

[Evaluation Standards]

A: The transmittance within a range of 400 to 450 nm was equal to or higher than 95%, and the transmittance within a range of 450 to 780 nm was equal to or higher than 97%. Therefore, the transparency was extremely excellent.

B: The transmittance within a range of 400 to 450 nm was equal to or higher than 90% and less than 95%, and the transmittance within a range of 450 to 780 nm was equal to or higher than 95% and less than 97%. Therefore, the transparency was excellent.

C: The transmittance within a range of 400 to 450 nm was equal to or higher than 80% and less than 90%, and the transmittance within a range of 450 to 780 nm was equal to or higher than 80% and less than 95%. Therefore, the transparency was normal.

D: The transmittance within a range of 400 to 450 nm or 450 to 780 nm was less than 80%. Therefore, the transparency was poor.

The obtained results are described in Table 2.

(Manufacturing Capacitance-Type Input Device)

By using the transfer films manufactured in Example 1 and Examples 2 to 43 which will be described later, capacitance-type input devices were manufactured.

<Formation of Mask Layer>

[Preparation of Photosensitive Film K1 for Forming Mask Layer]

A polyethylene terephthalate film (temporary support) having a thickness of 75 μm was coated with the coating solution for a thermoplastic resin layer composed of the aforementioned formulation H1 by using a slit-like nozzle, and the coating solution was dried, thereby forming a thermoplastic resin layer. Then, the thermoplastic resin layer was coated with the coating solution for an interlayer composed of the aforementioned formulation P1, and the coating solution was dried, thereby obtaining an interlayer. Thereafter, the interlayer was coated with a coating solution for a black photocurable resin layer composed of the following formulation K1, and the coating solution was dried, thereby forming a black photocurable resin layer. In this way, on the temporary support, the thermoplastic resin layer having a dry film thickness of 15.1 μm, the interlayer having a dry film thickness of 1.6 μm, and the black photocurable resin layer having a dry film thickness of 2.2 μm are provided such that the optical density became 4.0, and finally, a cover film (polypropylene film having a thickness of 12 μm) was pressure-bonded onto the resin layer. In this way, a transfer material was prepared in which the temporary support, the thermoplastic resin layer, the interlayer (oxygen barrier layer), and the black photocurable resin layer were integrated. The transfer material was taken as a sample named a photosensitive film K1 for forming a mask layer.

Coating Solution for Black Photocurable Resin Layer: Formulation K1

K pigment dispersion 1: 31.2 parts by mass

R pigment dispersion 1 (the following composition): 3.3 parts by mass

MMPGAc (propylene glycol monomethyl ether acetate, manufactured by Daicel Corporation): 6.2 parts by mass Methyl ethyl ketone (manufactured by Tonen Chemical Corporation): 34.0 parts by mass Cyclohexanone (manufactured by Kanto Denka Kogyo Co., Ltd.): 8.5 parts by mass Binder 2 (a random copolymer of benzyl methacrylate/methacrylic acid=78/22 (molar ratio), weight-average molecular weight: 38,000): 10.8 parts by mass Phenothiazine (manufactured by TOKYO CHEMICAL INDUSTRY CO., LTD.): 0.01 parts by mass Propylene glycol monomethyl ether acetate solution (76% by mass) of DPHA (dipentaerythritol hexaacrylate, manufactured by Nippon Kayaku Co., Ltd.): 5.5 parts by mass 2,4-Bis(trichloromethyl)-6-[4'-(N,N-bis(ethoxycarbonymethyl)amino-3'-bromophenyl]-s-triazine: 0.4 parts by mass Surfactant (trade name: MEGAFACE F-780F, manufactured by DIC Corporation): 0.1 parts by mass The viscosity of the coating solution for a black photocurable resin layer composed of the formulation K1 that was measured at 100° C. after removing the solvent was 10,000 Pa·sec.

Composition of K Pigment Dispersion 1

Carbon black (trade name: Nipex 35, manufactured by Degussa AG): 13.1% by mass

The following dispersion 1: 0.65% by mass

Binder 1 (a random copolymer of benzyl methacrylate/methacrylic acid=72/28 (molar ratio), weight-average molecular weight: 37,000): 6.72% by mass Propylene glycol monomethyl ether acetate: 79.53% by mass

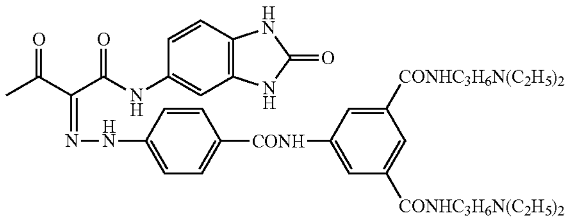

Dispersant 1

Composition for R Pigment Dispersion 1

Pigment (C. I. Pigment Red 177): 18% by mass

Binder 1 (a random copolymer of benzyl methacrylate/methacrylic acid=72/28 (molar ratio), weight-average molecular weight: 37,000): 12% by mass Propylene glycol monomethyl ether acetate: 70% by mass <Formation of Mask Layer>

Then, while a glass cleaner solution adjusted to have a temperature of 25° C. was being sprayed to reinforced glass (300 mm×400 mm×0.7 mm), in which an opening portion (15 mmΦ) was formed, for 20 seconds by shower, the glass was washed using a rotary brush having nylon bristles and then washed with pure water by shower. Thereafter, a silane coupling solution (0.3% by mass aqueous solution of N-β-aminoethyl-γ-aminopropyl trimethoxysilane, trade name: KBM 603, manufactured by Shin-Etsu Chemical Co., Ltd.) was sprayed to the substrate for 20 seconds by shower, and then the substrate was washed with pure water by shower. The base material was then heated for 2 minutes at 140° C. in a base material preheating device.

From the photosensitive film K1 for forming a mask layer obtained as above, the cover film was removed. Then, the film K1 was superposed on the glass base material having undergone the silane coupling treatment such that the surface of the black photocurable resin layer exposed after the removal of the cover film contacted the surface of the glass base material. Thereafter, the resultant was laminated on a base material heated to 140° C. by using a laminator (manufactured by Hitachi Industries Co., Ltd. (Lamic II model)) at a rubber roller temperature of 130° C., a line pressure of 100 N/cm, and a transport rate of 2.2 m/min. Subsequently, the polyethylene terephthalate temporary support was removed by being peeled from the interface between the thermoplastic resin layer and the temporary support. After the temporary support was peeled, in a state where the base material and an exposure mask (quartz exposure mask having a frame pattern) were stood upright in a proximity-type exposure machine (manufactured by Hitachi High-Tech Electronics Engineering Co. Ltd.) having an ultrahigh-pressure mercury lamp, the distance between the surface of the exposure mask and the black photocurable resin layer was set to be 200 μm, and pattern-wise exposure was performed in an exposure amount of 70 mJ/cm$^2$ (i-line).

Then, by using a triethanolamine-based developer (containing 30% by mass of triethanolamine, obtained by diluting T-PD2 (trade name, manufactured by FUJIFILM Corporation) with pure water by 10-fold), shower development was performed for 60 seconds at 33° C. at a flat nozzle pressure of 0.1 MPa, thereby removing the thermoplastic resin layer and the interlayer. Thereafter, by blowing air onto the upper surface of the glass base material, the developer was removed, the base material was then washed with pure water by shower by spraying pure water thereto for 10 seconds, and air was blown to the base material such that the liquid puddle on the base material was reduced.

Subsequently, by using a sodium carbonate/sodium hydrogen carbonate-based developer (solution obtained by diluting T-CD1 (trade name, manufactured by FUJIFILM Corporation) with pure water by 5-fold) and setting a shower pressure to be 0.1 MPa, development was performed for 45 seconds at 32° C., and the substrate was washed with pure water.

Then, a surfactant-containing washer (a solution obtained by diluting T-SD3 (trade name, manufactured by FUJIFILM Corporation) with pure water by 10-fold) was sprayed by shower to the substrate for 20 seconds at 33° C. and a conical nozzle pressure of 0.1 MPa, and the formed pattern image was scrubbed with a rotary brush having soft nylon bristles, thereby removing residues. Furthermore, by using an ultrahigh-pressure washing nozzle, the residues were removed by spraying ultrapure water thereto at a pressure of 9.8 MPa.

Then, post-exposure was performed in the atmosphere in an exposure amount of 1,300 mJ/cm$^2$, and a post-baking treatment was performed for 80 minutes at 240° C. In this way, a front panel was obtained in which a mask layer having an optical density of 4.0 and a film thickness of 2.0 μm was formed.

(Transparent Film)

For the front panel in which the mask layer was formed, a transparent film was formed in the same manner as used for forming a transparent film on the transparent substrate made of glass used at the time of forming the laminate described above.

<Formation of First Transparent Electrode Pattern>

[Formation of Transparent Electrode Layer]

The front panel in which the mask layer and the transparent film were formed was put into a vacuum chamber, and by using an ITO target (indium:tin=95:5 (molar ratio)) containing 10% by mass of $SnO_2$, an ITO thin film having a thickness of 40 nm was formed by DC magnetron sputtering (condition: base material temperature of 250° C., argon pressure of 0.13 Pa, oxygen pressure of 0.01 Pa), thereby obtaining a front panel in which the transparent electrode layer was formed. The surface electrical resistance of the ITO thin film was 80 Ω/square.

[Preparation of Photosensitive Film E1 for Etching]

A photosensitive film E1 for etching was obtained in the same manner as used in the preparation of the photosensitive film K1 for forming a mask layer, except that, in the preparation of the photosensitive film K1 for forming a mask layer, the coating solution for a black photocurable resin layer was replaced with a coating solution for a photocurable resin layer for etching composed of the following formulation E1 (the photocurable resin layer for etching had a film thickness of 2.0 μm).

Coating Solution for Photocurable Resin Layer for Etching: Formulation E1

Methyl methacrylate/styrene/methacrylic acid copolymer (composition of the copolymer (% by mass): 31/40/29, weight-average molecular weight: 60,000, acid value: 163 mgKOH/g): 16 parts by mass Monomer 1 (trade name: BPE-500, manufactured by SHIN-NAKAMURA CHEMICAL CO., LTD.): 5.6 parts by mass 0.5 mol Tetraethylene oxide monomethacrylate adduct of hexamethylene diisocyanate: 7 parts by mass Cyclohexane dimethanol monoacrylate as a compound having one polymerizable group in a molecule: 2.8 parts by mass 2-Chloro-N-butylacridone: 0.42 parts by mass 2,2-Bis(o-chlorophenyl)-4,4',5,5'-tetraphenylbiimidazole: 2.17 parts by mass Malachite green oxalate: 0.02 parts by mass Leucocrystal violet: 0.26 parts by mass Phenothiazine: 0.013 parts by mass Surfactant (trade name: MEGAFACE F-780F, manufactured by DIC Corporation): 0.03 parts by mass Methyl ethyl ketone: 40 parts by mass 1-Methoxy-2-propanol: 20 parts by mass The viscosity of the coating solution for a photocurable resin layer for etching composed of the formulation E1 that was measured at 100° C. after removing the solvent was 2,500 Pa·sec.

[Formation of First Transparent Electrode Pattern]

In the same manner as used for forming the mask layer, the front panel in which the mask layer, the transparent film, and the transparent electrode layer were formed was washed, and then the photosensitive film E1 from which the cover film was removed was laminated thereon (base material temperature: 130° C., rubber roller temperature: 120° C., line pressure: 100 N/cm, transport rate: 2.2 m/min). After the temporary support was peeled, the distance between the surface of an exposure mask (quartz exposure mask having a transparent electrode pattern) and the photocurable resin layer for etching was set to be 200 μm, and pattern-wise exposure was performed in an exposure amount of 50 $mJ/cm^2$ (i-line).

Then, by using a triethanolamine-based developer (containing 30% by mass of triethanolamine, a solution obtained by diluting T-PD2 (trade name, manufactured by FUJIFILM Corporation) with pure water by 10-fold), a developing treatment was performed for 100 seconds at 25° C. Thereafter, by using a surfactant-containing washer (a solution obtained by diluting T-SD3 (trade name, manufactured by FUJIFILM Corporation) with pure water by 10-fold), a washing treatment was performed for 20 seconds at 33° C. The front panel having undergone the washing treatment was scrubbed with a rotary brush, and then ultrapure water was sprayed thereto from the ultrahigh-pressure washing nozzle, thereby removing the residues. Subsequently, a post-baking treatment was performed for 30 minutes at 130° C., thereby obtaining a front panel in which the patterns of the transparent electrode layer and the photocurable resin layer for etching were formed.

The front panel, in which the patterns of the transparent electrode layer and the photocurable resin layer for etching were formed, was subjected to a treatment (etching treatment) for 100 seconds by being immersed into an etching tank containing an ITO etchant (hydrochloric acid, aqueous solution of potassium chloride, temperature of 30° C.) such that the transparent electrode layer in an exposed area not being covered with the photocurable resin layer for etching was removed. In this way, a front panel with a transparent electrode layer pattern was obtained which included a photocurable resin layer pattern for etching.

Then, the front panel with a transparent electrode layer pattern including the photocurable resin layer pattern for etching was subjected to a treatment (removal treatment) for 200 seconds by being immersed into a resist removing tank containing a resist remover (N-methyl-2-pyrrolidone, monoethanolamine, surfactant (trade name: SURFYNOL 465, manufactured by Air Products and Chemicals, Inc.), temperature of 45° C.) such that the photocurable resin layer pattern for etching was removed. In this way, a front panel was obtained in which the mask layer, the transparent film, and the first transparent electrode pattern were formed.

<Formation of Insulating Layer>

[Preparation of Photosensitive Film W1 for Forming Insulating Layer]

A photosensitive film W1 for forming an insulating layer was obtained in the same manner as used in the preparation of the photosensitive film K1 for forming a mask layer, except that, in the preparation of the photosensitive film K1 for forming a mask layer, the coating solution for a black photocurable resin layer was replaced with a coating solution for an insulating layer composed of the following formulation W1 (the insulating layer had a film thickness of 1.4 μm).

Coating Solution for Insulating Layer: Formulation W1

Binder 3 (1-methoxy-2-propanol and methyl ethyl ketone solution (solid content: 45%) of cyclohexyl methacrylate (a)/methyl methacrylate (b)/glycidyl methacrylate adduct (d) of methacrylic acid copolymer (c) (composition (% by mass): a/b/c/d=46/1/10/43, weight-average molecular weight: 36,000, acid value: 66 mgKOH/g): 12.5 parts by mass Propylene glycol monomethyl ether acetate solution (76% by mass) of DPHA (dipentaerythritol hexaacrylate, manufactured by Nippon Kayaku Co., Ltd.): 1.4 parts by mass Urethane-based monomer (trade name: NK OLIGO UA-32P, manufactured by SHIN-NAKAMURA CHEMICAL CO., LTD., nonvolatile fraction: 75%, propylene glycol monomethyl ether acetate: 25%): 0.68 parts by mass Tripentaerythritol octaacrylate (trade name: V#802, manufactured by OSAKA ORGANIC CHEMICAL INDUSTRY LTD.): 1.8 parts by mass Diethyl thioxanthone: 0.17 parts by mass 2-(Dimethylamino)-2-[(4-methylphenyl)methyl]-1-[4-(4-morpholinyl)phenyl]-1-butanone (trade name: Irgacure 379, manufactured by BASF SE): 0.17 parts by mass Dispersant (trade name: SOLSPERSE 20000, manufactured by Abisia): 0.19 parts by mass Surfactant (trade name: MEGAFACE F-780F, manufactured by DIC Corporation): 0.05 parts by mass Methyl ethyl ketone: 23.3 parts by mass MMPGAc (propylene glycol monomethyl ether acetate, manufactured by Daicel Corporation): 59.8 parts by mass The viscosity of the coating solution for forming an insulating layer composed of the formulation W1 that was measured at 100° C. after removing the solvent was 4,000 Pa·sec.

In the same manner as used for forming the mask layer, the front panel with the mask layer, the transparent film, and the first transparent electrode pattern was subjected to a silane coupling treatment, and then the photosensitive film W1 for forming an insulating layer from which the cover film was removed was laminated thereon (base material temperature: 100° C., rubber roller temperature: 120° C., line pressure: 100 N/cm, transport rate: 2.3 m/min). After the temporary support was peeled, the distance between the surface of the exposure mask (quartz exposure mask having a pattern for an insulating layer) and the insulating layer was set to be 100 μm, and pattern-wise exposure was performed in an exposure amount of 30 $mJ/cm^2$ (i-line).

Then, by using a triethanolamine-based developer (containing 30% by mass triethanolamine, a solution obtained by diluting T-PD2 (trade name, manufactured by FUJIFILM Corporation) with pure water by 10-fold), a developing treatment was performed for 60 seconds at 33° C. Thereafter, by using a sodium carbonate/sodium hydrogen carbonate-based developer (a solution obtained by diluting T-CD1 (trade name, manufactured by FUJIFILM Corporation) with pure water by 5-fold), a developing treatment was performed for 50 seconds at 25° C. Subsequently, by using a surfactant-containing washer (a solution obtained by diluting T-SD3 (trade name, manufactured by FUJIFILM Corporation) with pure water by 10-fold), a washing treatment was performed for 20 seconds at 33° C. The front panel having undergone the washing treatment was scrubbed with a rotary brush, and ultrapure water was sprayed from an ultrahigh-pressure washing nozzle to the front panel, thereby removing residues. Then, a post-baking treatment was performed for 60 minutes at 230° C., thereby obtaining a front panel in which the mask layer, the transparent film, the first transparent electrode pattern, and the insulating layer pattern were formed.

<Formation of Second Transparent Electrode Pattern>

[Formation of Transparent Electrode Layer]

In the same manner as used for forming the first transparent electrode pattern, the front panel, in which the mask layer, the transparent film, the firs transparent electrode pattern, and the insulating layer pattern were formed, was subjected to a DC magnetron sputtering treatment (conditions: base material temperature of 50° C., argon pressure of 0.13 Pa, an oxygen pressure of 0.01 Pa), thereby forming an ITO thin film having a thickness of 80 nm. In this way, a front panel in which a transparent electrode layer was formed was obtained. The surface electrical resistance of the ITO thin film was 110 Ω/square.

In the same manner as used for forming the first transparent electrode layer, by using the photosensitive film E1 for etching, a front panel was obtained in which the mask layer, the transparent film, the first transparent electrode pattern, the insulating layer pattern, and transparent electrode layer, and the photocurable resin layer pattern for etching were formed (post-baking treatment; 130° C. for 30 minutes).

Furthermore, in the same manner as used for forming the first transparent electrode pattern, etching (30° C. for 50 seconds) was performed, and then the photocurable resin layer for etching was removed (45° C. for 200 seconds), thereby obtaining a front panel in which the mask layer, the transparent film, the first transparent electrode pattern, the insulating layer pattern, and the second transparent electrode pattern were formed.

<Formation of Conductive Elements Different from First and Second Transparent Electrode Patterns>

In the same manner as used for forming the first and second transparent electrode patterns, the front panel in which the mask layer, the transparent film, the first transparent electrode pattern, the insulating layer pattern, and the second transparent electrode pattern were formed was subjected to a DC magnetron sputtering treatment, thereby obtaining a front panel in which an aluminum (Al) thin film having a thickness of 200 nm was formed.

In the same manner as used in the formation of the first and second transparent electrode patterns, by using the photosensitive film E1 for etching, a front panel was obtained in which the mask layer, the transparent film, the first transparent electrode pattern, the insulating layer pattern, the second transparent electrode pattern, and the photocurable resin layer pattern for etching were formed (post-baking treatment; 130° C., 30 minutes).

Furthermore, in the same manner as used for forming the first transparent electrode pattern, etching was performed (for 50 seconds at 30° C.), and then the photocurable resin layer for etching was removed (for 200 seconds at 45° C.), thereby obtaining a front panel in which the mask layer, the transparent film, the first transparent electrode pattern, the insulating layer pattern, the second transparent electrode pattern, and the conductive element different from the first and second transparent electrode patterns were formed.

<First Transparent Resin Layer and Second Transparent Resin Layer>

In the same manner as in the manufacturing of the transparent laminate of each example described above, a film was formed by transferring the first transparent resin layer and the second transparent resin layer from the transfer film of each example, except that, in the manufacturing of the transparent laminate, a front panel was used on which the mask layer, the transparent film, the first transparent electrode pattern, the insulating layer pattern, the second transparent electrode layer, and the conductive element different from the first and second transparent electrode patterns were formed was used instead of the substrate obtained by forming the transparent film and the transparent electrode pattern on the transparent substrate made of glass. In this way, a capacitance-type input device (front panel) of each example was obtained in which the mask layer, the transparent film, the first transparent electrode pattern, the insulating layer pattern, the second transparent electrode pattern, the conductive element different from the first and second transparent electrode patterns the second transparent resin layer, and the first transparent resin layer were formed in this order on the transparent substrate made of glass. Herein, the second transparent resin layer and the first transparent resin layer were subjected to pattern-wise exposure, development, and patterning such that the transparent resin layers were not formed in the portion in which the mask layer was formed and on top of the end portion of the routing wiring.

(Preparation of Image Display Device (Touch Panel))

The capacitance-type input device (front panel) of each example manufactured as above was bonded to a liquid crystal display device manufactured by the method described in JP2009-47936A, and by a known method, an image display device of each example that included the capacitance-type input device as a constituent was prepared.

<Evaluation of Front Panel and Image Display Device>

The capacitance-type input device and the image display device of each example had no problem because the transparent electrode pattern was not visually recognized in these devices.

During each step described above, in the front panel, on which the mask layer, the transparent film, the first transparent electrode pattern, the insulating layer pattern, the second transparent electrode pattern, the conductive element different from the first and second transparent electrode patterns, the second transparent resin layer, and the first transparent resin layer were formed, the opening portion and the back surface (non-contact surface) were not contaminated. Furthermore, the front panel was easily washed, and other members did not have a problem of contamination.

Furthermore, the mask layer did not have a pin hole and was excellent in light shielding properties.

In addition, each of the first transparent electrode pattern, the second transparent electrode pattern, and the conductive element different from these had no problem of conductivity, and the first transparent electrode pattern and the second transparent electrode pattern were insulated from each other.

The first transparent resin layer did not have defects such as air bubbles, and an image display device excellent in display characteristics was obtained.

Examples 2 to 4

The evaluation was performed in the same manner as in Example 1, except that, in Example 1, the cover film having surface roughnesses SRz and SRa of 69 nm and 5.5 nm respectively after peeling was replaced with a cover film having Srz and SRa of 51 nm and 4.9 nm (Example 2) respectively after peeling as described in Table 2, a cover film having SRz and SRa of 110 nm and 4.7 nm (Example 3) respectively after peeling, and a cover film having SRz and SRa of 120 nm and 6.7 nm (Example 4) respectively after peeling. The evaluation results are described in Table 2. In Tables 2 to 5, an example or a comparative example for which the column of “Surface roughnesses before pressure bonding” remains blank shows that the surface roughnesses before pressure bonding were not measured.

As SRz increased, the evaluation results of the lamination bubbles and the moist heat test slightly became worse, but the results were at an unproblematic level. Other performances did not show a change and were at an unproblematic level as well.

Examples 5 and 6

The evaluation was performed in the same manner as in Example 1, except that, in Example 1, the cover film having a thickness of 16 μm after peeling and having surface roughnesses SRz and SRa of 69 nm and 5.5 nm respectively after peeling was replaced with a cover film having a thickness of 25 μm after peeling as described in Table 2 and having SRz and SRa of 66 nm and 5.0 nm (Example 5) respectively after peeling and a cover film having a thickness of 38 μm after peeling and having SRz and SRa of 62 nm and 5.5 nm (Example 6) respectively after peeling. The evaluation results are described in Table 2. In a case where the cover film having a thickness of 38 μm after peeling and SRz and SRa of 62 nm and 5.5 nm (Example 6) respectively after peeling was used, the evaluation results of the moist heat test slightly became poor but were at an unproblematic level. Other performances did not show a change and were at an unproblematic level as well.

Examples 7 and 8

The evaluation was performed in the same manner as in Example 1, except that, in Example 1, the cover film having a thickness of 16 μm after peeling and surface roughnesses SRz and SRa of 69 nm and 5.5 nm after peeling respectively was replaced with a cover film having a thickness of 16 μm after peeling as described in Table 2 and having SRz and SRa of 4 nm and 0.36 nm (Example 7) respectively after peeling and a cover film having a thickness of 50 μm after peeling and SRz and SRa of 5 nm and 2.0 nm (Example 8) respectively after peeling. The evaluation results are described in Table 2. In a case where SRz after peeling decreased to 4 nm, when the cover film was laminated on the second transparent resin layer, the evaluation results of winding wrinkles tended to slightly become poor, and the evaluation results of the moist heat test slightly became poor. However, the results were at an unproblematic level. Other performances did not show a change and were at an unproblematic level.

Comparative Examples 1 to 8

The evaluation was performed in the same manner as in Example 1, except that, in Example 1, the cover film having surface roughnesses SRz and SRa of 69 nm and 5.5 nm respectively after peeling was replaced with a cover film having SRz and SRa of 150 nm and 6.9 nm (Comparative Example 1) respectively after peeling as described in Table 2, a cover film having SRz and SRa of 200 nm and 16.0 nm (Comparative Example 2) respectively after peeling, a cover film having SRz and SRa of 300 nm and 50 nm (Comparative Example 3) respectively after peeling, a cover film having SRz and SRa of 461 nm and 21.3 nm (Comparative Example 4) respectively after peeling, a cover film having SRz and SRa of 460 nm and 7.3 nm (Comparative Example 5) respectively after peeling, a cover film having SRz and SRa of 570 nm and 8.4 nm (Comparative Example 6) respectively after peeling, a cover film having SRz and SRa of 550 nm and 82 nm (Comparative Example 7) respectively after peeling, and a cover film having SRz and SRa of 1,000 nm and 30 nm (Comparative Example 8) respectively after peeling. The evaluation results are described in Table 2. As SRz increased from 150 nm, the evaluation results of lamination bubbles became poor. When SRz was equal to or greater than 200 nm, all of the comparative examples were at a problematic level for practical use. The evaluation results of the moist heat test were also poor, and when SRz was equal to or greater than 150 nm, all of the comparative examples were at a problematic level for practical use.

Example 9

In the preparation of the photosensitive film E1 for etching of Example 1, the coating solution E1 for a photocurable resin layer for etching was replaced with a coating solution IM1 for a second transparent resin layer, drying was performed for 1 minute at 80° C. and then for 1 minute for 110° C. Furthermore, by using a smooth surface of LUMIRROR #16 QS62 manufactured by TORAY INDUSTRIES, INC as a cover film, a transfer film G1 including the second transparent resin layer was obtained (dry film thickness of the second transparent resin layer: 85 nm, refractive index: 1.65).

A transfer film J1 including a transparent resin layer was obtained in the same manner as in Example 1, except that in the preparation of the transfer film I1 including a transparent resin layer, the "formation of second transparent resin layer" were not performed.

On the front panel of Example 1, on which the mask layer, the transparent film, the first transparent electrode pattern, the insulating layer pattern, the second transparent electrode pattern, and the conductive element different from the first and second transparent electrode patterns were formed, the transfer film G1 from which the cover film was removed and which included the second transparent resin layer was laminated. Under the same conditions as applied to the photosensitive film E1 for etching, the laminate was developed, washed with water, and baked for 25 minutes at 145° C. The dry film thickness of the second transparent resin layer having undergone baking was 85 nm, and the refractive index thereof was 1.65.

After the laminate was cooled to room temperature, an image display device (touch panel) was prepared in the same manner as described above, except that, in the preparation of the transfer film I1 including the transparent resin layer (the first transparent resin layer and the second transparent resin layer), instead of the transfer film I1, the transfer film J1 including the transparent resin layer (corresponding to the first transparent resin layer of Example 1) was used. As a result of evaluating the lamination bubbles, moist heat test, winding wrinkles, and cracking in the same manner as in Example 1, the same results as in Example 1 were obtained. The evaluation results are described in Table 3.

Examples 10 to 16

Examples 10 to 16 were performed and evaluated in the same manner as in Example 9, except that the transfer film J1 used in Example 9 was changed to the cover film shown in Table 3. The evaluation results are described in Table 3. Although the evaluation result of the lamination bubbles of Example 12 was C which was poorer than B (Example 4), it was at a practical level, and other results are at the same level. Regarding Examples 15 and 16 in which the surface roughness SRz after peeling was equal to or less than 10 nm, the evaluation result of the winding wrinkles was poor, but it was at a practical level. Other examples yielded the same result as Example 1.

Example 17

Example 17 was performed and evaluated in the same manner as in Example 3, except that, in Example 3, the dry film thickness of the first transparent resin layer was changed to 8 μm from 5 μm. Regarding the evaluation results, the evaluation results of the lamination bubbles and the moist heat test described in Table 3 were B and A respectively which were excellent results. Although the evaluation result of cracking was C which was poorer than B, it was at a practical level, and there was no change in the winding wrinkles.

Comparative Examples 9 to 16

The evaluation was performed in the same manner as in Example 1, except that, in Example 9, the cover film having surface roughnesses SRz and SRa of 69 nm and 5.5 nm respectively after peeling was replaced with a cover film having SRz and SRa of 158 nm and 7.2 nm (Comparative Example 9) respectively after peeling as described in Table 3, a cover film having SRz and SRa of 210 nm and 16.9 nm (Comparative Example 10) respectively after peeling, a cover film having SRz and SRa of 314 nm and 53 nm (Comparative Example 11) respectively after peeling, a cover film having SRz and SRa of 465 nm and 22.5 nm (Comparative Example 12) respectively after peeling, a cover film having SRz and SRa of 460 nm and 8.1 nm (Comparative Example 13) respectively after peeling, a cover film having SRz and SRa of 600 nm and 8.8 nm (Comparative Example 14) respectively after peeling, a cover film having SRz and SRa of 580 nm and 87 nm (Comparative Example 15) respectively after peeling, and a cover film having SRz and SRa of 1,060 nm and 33 nm (Comparative Example 16) respectively after peeling. The evaluation results are described in Table 3. As SRz increased from 150 nm, the evaluation results of the lamination bubbles became poor, and when SRz was equal to or greater than 200 nm, all of the comparative examples were at a problematic level for practical use. The evaluation results of the moist heat test also became poor, and when SRz was equal to or greater than 150 nm, all of the comparative examples were at a problematic level for practical use.

Examples 18 to 20

The evaluation was performed in the same manner as in Example 1, except that, in Example 1, the cover film having a thickness of 16 μm after peeling and having surface roughnesses SRz and SRa of 69 nm and 5.5 nm respectively after peeling was replaced with a cover film having a thickness of 38 μm after peeling as described in Table 4 and SRz and SRa of 5.1 nm and 2.2 nm (Example 18) respectively after peeling, a cover film having a thickness of 50 μm after peeling and SRz and SRa of 5.3 nm and 2.3 nm (Example 19) respectively after peeling, and a cover film having a thickness of 75 μm after peeling and SRz and SRa of 5.2 nm and 2.2 nm (Example 20) respectively after peeling. The evaluation results are described in Table 4. As the thickness of the cover film increased, the evaluation results of the lamination bubbles and the moist heat test tended to slightly become poor, but the results are at an unproblematic level. Other performances did not show a change and were at an unproblematic level as well.

Examples 21 to 23

The evaluation was performed in the same manner as in Example 19, except that, in Example 19, the cover film made of polyester having a thickness of 50 μm after peeling and surface roughnesses SRz and SRa of 5.3 nm and 2.3 nm respectively after peeling was replaced with a cover film made of polyether sulfone (Example 21) having a thickness of 50 after peeling and surface roughnesses SRz and SRa of 9.9 nm and 0.4 nm respectively after peeling, a cover film made of polycarbonate (Example 22) having a thickness of 50 after peeling and surface roughnesses SRz and SRa of 9.8 nm and 0.4 nm respectively after peeling, and a cover film made of polyethylene naphthalate (Example 23) having a thickness of 50 μm after peeling and surface roughnesses SRz and SRa of 10.9 nm and 0.64 nm respectively after peeling. The evaluation results are described in Table 4. In the cover film made of polyether sulfone, the cover film made of polycarbonate, and the cover film made of polyethylene naphthalate, the evaluation results of the lamination bubbles tended to be slightly poor, but the results were at an unproblematic level. Other performances did not show a change and were at an unproblematic level as well.

Examples 24 to 30

Examples 24 to 30 were performed and evaluated in the same manner as in Example 1, except that in Example 1, the film thickness of the first transparent resin layer was changed from 5 μm to 4.8 μm (Example 24), 2.0 μm (Example 25), 1.0 μm (Example 26), 8.0 (Example 27), 10 μm (Example 28), 15 μm (Example 29), and 18 μm (Example 30) respectively. The evaluation results are described in Table 4. As the film thickness decreased, the evaluation results of the lamination bubbles and the moist heat test became poor, but the evaluation results of the cracking and the winding wrinkles became excellent. In contrast, as the film thickness increased, the evaluation results of the cracking and the winding wrinkles became poor, but the evaluation results of the lamination bubbles and the moist heat test became excellent. Within the range of the film thickness described above, the performance was at an unproblematic level.

Examples 31 to 36

Examples 31 to 36 were performed and evaluated in the same manner as in Example 9, except that the cover film of the transfer film J1 used in Example 9 was changed to the cover films shown in Examples 18 to 23 described in Table 5. The evaluation results are described in Table 5. As described in Table 5, the surface roughnesses of the peeled cover film slightly deteriorated, but the evaluation result of the performance was at the same level as in Examples 18 to 23.

Examples 37 to 43

Examples 37 to 43 were performed and evaluated in the same manner as in Example 1, except that the film thickness of the first transparent resin layer of the transfer film J1 used in Example 9 was changed from 5 μm to 4.8 μm (Example 37), 2.0 μm (Example 38), 1.0 μm (Example 39), 8.0 μm (Example 40), 10 μm (Example 41), 15 μm (Example 42), and 18 μm (Example 43) respectively. As the film thickness decreases, the evaluation results of the lamination bubbles and the moist heat test deteriorated, but the evaluation results of the cracking and the winding wrinkles were improved. In contrast, as the film thickness increased, the evaluation results of the cracking and the winding wrinkles deteriorated, but the evaluation results of the lamination bubbles and the moist heat test were improved. Within the range of the film thickness described above, the performance was at an unproblematic level.

TABLE 2

| | Cover film | | | | | | | | First transparent resin layer | |
|---|---|---|---|---|---|---|---|---|---|---|
| | | | Surface roughnesses after peeling | | Surface roughnesses before pressure bonding | | Dimensional stability | | | |
| | Type and name | Thickness (μm) | SRz (nm) | SRa (nm) | SRz (nm) | SRa (nm) | MD (%) | TD (%) | Thickness (μm) | Refractive index |
| Example 1 | Manufactured by TORAY INDUSTRIES, INC., LUMIRROR #16 QS62, smooth surface | 16 | 69 | 5.5 | 70 | 5.4 | 0.7 | 0.1 | 5 | 1.51 |
| Example 2 | Manufactured by TORAY INDUSTRIES, INC., Biaxially-stretched polyester film obtained by adding particles to coating layer, smooth surface | 16 | 51 | 4.9 | | | 0.6 | 0.1 | 5 | 1.51 |
| Example 3 | Biaxially-stretched polyester film to which particles are added | 16 | 110 | 4.7 | | | 0.6 | 0.1 | 5 | 1.51 |
| Example 4 | Manufactured by TORAY INDUSTRIES, INC., LUMIRROR #16 FB40, smooth surface | 16 | 120 | 6.7 | 120 | 6.6 | 0.6 | 0.1 | 5 | 1.51 |
| Example 5 | Manufactured by TORAY INDUSTRIES, INC., LUMIRROR #25A QS62, smooth surface | 25 | 66 | 5.0 | 65 | 4.9 | 0.6 | 0.4 | 5 | 1.51 |
| Example 6 | Manufactured by TORAY INDUSTRIES, INC., LUMIRROR #38 QS63, smooth surface | 38 | 62 | 5.5 | 61 | 5.4 | 0.6 | 0.4 | 5 | 1.51 |
| Example 7 | 16 μm biaxially-stretched polyester film, uncoated surface | 16 | 4 | 0.36 | | | | | 5 | 1.51 |
| Example 8 | Manufactured by TOYOBO Co., Ltd, COSMOSHINE A4100, uncoated surface | 50 | 5 | 2.0 | | | | | 5 | 1.51 |
| Example 17 | Biaxially-stretched polyester film to which particles are added | 16 | 110 | 4.7 | | | | | 8 | 1.51 |

TABLE 2-continued

| | | | | | | | | | | |
|---|---|---|---|---|---|---|---|---|---|---|
| Comparative Example 1 | Biaxially-stretched polyester film A to which particles are added | 16 | 150 | 6.9 | | | 0.6 | 0.1 | 5 | 1.51 |
| Comparative Example 2 | Manufactured by TORAY INDUSTRIES, INC., polypropylene film TORAYFAN BO#12D-R404, B surface | 12 | 200 | 16.0 | 197 | 15.9 | | | 5 | 1.51 |
| Comparative Example 3 | Manufactured by Oji F-TEX Co., Ltd., ALFAN E201F | 30 | 300 | 50 | | | | | 5 | 1.51 |
| Comparative Example 4 | Manufactured by Teijin Dupont Films Japan Limited, TEIJIN ® TETORON ® film HPE38 | 38 | 461 | 21.3 | | | | | 5 | 1.51 |
| Comparative Example 5 | Manufactured by TORAY INDUSTRIES, INC., LUMIRROR #16 QS62, rough surface | 16 | 460 | 7.3 | 457 | 7.1 | 0.6 | 0.1 | 5 | 1.51 |
| Comparative Example 6 | Manufactured by TORAY INDUSTRIES, INC., LUMIRROR #16 FB50 | 16 | 570 | 8.4 | 550 | 8.3 | 0.5 | 0 | 5 | 1.51 |
| Comparative Example 7 | Described in Example 2 of JP5257648B, film (GF-8) equivalent to low-density polyethylene film NF-15 manufactured by Tamapoly Co., Ltd. | 30 | 550 | 82 | | | | | 5 | 1.51 |
| Comparative Example 8 | Described in Example 4 of JP3406544B, manufactured by Teijin Dupont Films Japan Limited, polyethylene terephthalate film PS-25 | 25 | 1000 | 30 | | | | | 5 | 1.51 |

| | Second transparent resin layer | | Evaluation | | | | | |
|---|---|---|---|---|---|---|---|---|
| | | | | Moist | | | Transparency of transparent resin layer | |
| | Thickness (nm) | Refractive index | Lamination bubbles | heat test | Winding wrinkles | Cracking | Before curing | After curing |
| Example 1 | 85 | 1.65 | A | A | B | B | B | B |
| Example 2 | 85 | 1.65 | A | A | B | B | B | B |
| Example 3 | 85 | 1.65 | B | B | A | B | B | B |
| Example 4 | 85 | 1.65 | B | C | A | B | B | B |
| Example 5 | 85 | 1.65 | A | A | B | B | B | B |
| Example 6 | 85 | 1.65 | A | B | B | B | B | B |
| Example 7 | 85 | 1.65 | B | A | C | B | B | B |
| Example 8 | 85 | 1.65 | B | B | B | B | B | B |
| Example 17 | 85 | 1.65 | A | A | A | C | B | B |
| Comparative Example 1 | 85 | 1.65 | C | D | A | B | B | B |
| Comparative Example 2 | 85 | 1.65 | D | E | A | B | B | B |
| Comparative Example 3 | 85 | 1.65 | E | E | A | B | B | B |
| Comparative Example 4 | 85 | 1.65 | E | E | A | B | C | B |
| Comparative Example 5 | 85 | 1.65 | E | E | A | B | B | B |
| Comparative Example 6 | 85 | 1.65 | E | E | A | B | C | B |
| Comparative Example 7 | 85 | 1.65 | E | E | A | B | B | B |
| Comparative Example 8 | 85 | 1.65 | E | E | A | B | D | C |

TABLE 3

| | Cover film | | | | | | | | First transparent resin layer | |
|---|---|---|---|---|---|---|---|---|---|---|
| | | | Surface roughnesses after peeling | | Surface roughnesses before pressure bonding | | Dimensional stability | | | |
| | Type and name | Thickness (µm) | SRz (nm) | SRa (nm) | SRz (nm) | SRa (nm) | MD (%) | TD (%) | Thickness (µm) | Refractive index |
| Example 9 | Manufactured by TORAY INDUSTRIES, INC., LUMIRROR #16 QS62, smooth surface | 16 | 73 | 5.8 | 70 | 5.4 | 0.7 | 0.1 | 5 | 1.51 |
| Example 10 | Manufactured by TORAY INDUSTRIES, INC., Biaxially-stretched polyester film obtained by adding particles to coating layer, smooth surface | 16 | 54 | 5.1 | | | 0.6 | 0.1 | 5 | 1.51 |
| Example 11 | Biaxially-stretched polyester film to which particles are added | 16 | 116 | 4.9 | | | 0.6 | 0.1 | 5 | 1.51 |
| Example 12 | Manufactured by TORAY INDUSTRIES, INC., LUMIRROR #16 FB40, smooth surface | 16 | 126 | 6.7 | 120 | 6.6 | 0.6 | 0.1 | 5 | 1.51 |
| Example 13 | Manufactured by TORAY INDUSTRIES, INC., LUMIRROR #25A QS62, smooth surface | 25 | 69.3 | 5.2 | 65 | 4.9 | 0.6 | 0.4 | 5 | 1.51 |
| Example 14 | Manufactured by TORAY INDUSTRIES, INC., LUMIRROR #38 QS63, smooth surface | 38 | 65 | 5.8 | 61 | 5.4 | 0.6 | 0.4 | 5 | 1.51 |
| Example 15 | 16 µm biaxially-stretched polyester film, uncoated surface | 16 | 4.2 | 0.4 | | | | | 5 | 1.51 |
| Example 16 | Manufactured by TOYOBO Co., Ltd, COSMOSHINE A4100, uncoated surface | 50 | 5.1 | 2.2 | | | | | 5 | 1.51 |
| Comparative Example 9 | Biaxially-stretched polyester film to which particles are added | 16 | 158 | 7.2 | | | 0.6 | 0.1 | 5 | 1.51 |
| Comparative Example 10 | Manufactured by TORAY INDUSTRIES, INC., polypropylene film TORAYFAN BO#12D-R404, B surface | 12 | 210 | 16.9 | | | | | 5 | 1.51 |
| Comparative Example 11 | Manufactured by Oji F-TEX Co., Ltd., ALFAN E201F | 30 | 314 | 53 | | | | | 5 | 1.51 |
| Comparative Example 12 | Manufactured by Teijin Dupont Films Japan Limited, TEIJIN ® TETORON ® film HPE38 | 38 | 465 | 22.5 | | | | | 5 | 1.51 |
| Comparative Example 13 | Manufactured by TORAY INDUSTRIES, INC., LUMIRROR #16 QS62, rough surface | 16 | 460 | 8.1 | 457 | 7.1 | 0.6 | 0.1 | 5 | 1.51 |
| Comparative Example 14 | Manufactured by TORAY INDUSTRIES, INC., LUMIRROR #16 FB50 | 16 | 600 | 8.8 | 550 | 8.3 | 0.5 | 0 | 5 | 1.51 |
| Comparative Example 15 | Described in Example 2 of JP5257648B, film (GF-8) equivalent to low-density polyethylene film NF-15 manufactured by Tamapoly Co., Ltd. | 30 | 580 | 87 | | | | | 5 | 1.51 |

TABLE 3-continued

| | | | | | | | | |
|---|---|---|---|---|---|---|---|---|
| Comparative Example 16 | Described in Example 4 of JP3406544B, manufactured by Teijin Dupont Films Japan Limited, polyethylene terephthalate film PS-25 | 25 | 1,060 | 33 | | | 5 | 1.51 |

| | Second transparent resin layer | | Evaluation | | | | | |
|---|---|---|---|---|---|---|---|---|
| | | | | Moist | | | Transparency of transparent resin layer | |
| | Thickness (nm) | Refractive index | Lamination bubbles | heat test | Winding wrinkles | Cracking | Before curing | After curing |
| Example 9 | 85 | 1.65 | A | A | B | B | B | B |
| Example 10 | 85 | 1.65 | A | A | B | B | B | B |
| Example 11 | 85 | 1.65 | B | B | A | B | B | B |
| Example 12 | 85 | 1.65 | C | C | A | B | B | B |
| Example 13 | 85 | 1.65 | A | A | B | B | B | B |
| Example 14 | 85 | 1.65 | A | B | B | B | B | B |
| Example 15 | 85 | 1.65 | B | A | C | B | B | B |
| Example 16 | 85 | 1.65 | B | B | C | B | B | B |
| Comparative Example 9 | 85 | 1.65 | D | D | A | B | B | B |
| Comparative Example 10 | 85 | 1.65 | D | E | A | B | B | B |
| Comparative Example 11 | 85 | 1.65 | E | E | A | B | B | B |
| Comparative Example 12 | 85 | 1.65 | E | E | A | B | C | B |
| Comparative Example 13 | 85 | 1.65 | E | E | A | B | B | B |
| Comparative Example 14 | 85 | 1.65 | E | E | A | B | C | B |
| Comparative Example 15 | 85 | 1.65 | E | E | A | B | B | B |
| Comparative Example 16 | 85 | 1.65 | E | E | A | B | D | C |

TABLE 4

| | Cover film | | | | | | | | First transparent resin layer | |
|---|---|---|---|---|---|---|---|---|---|---|
| | | | Surface roughnesses after peeling | | Surface roughnesses before pressure bonding | | Dimensional stability | | | |
| | Type and name | Thickness (μm) | SRz (nm) | SRa (nm) | SRz (nm) | SRa (nm) | MD (%) | TD (%) | Thickness (μm) | Refractive index |
| Example 18 | Uncoated surface of 38 μm biaxially-stretched polyester film | 38 | 5.1 | 2.2 | | | | | 5 | 1.51 |
| Example 19 | Uncoated surface of 50 μm biaxially-stretched polyester film | 50 | 5.3 | 2.3 | | | | | 5 | 1.51 |
| Example 20 | Uncoated surface of 75 μm biaxially-stretched polyester film | 75 | 5.2 | 2.2 | | | | | 5 | 1.51 |
| Example 21 | Uncoated surface of 50 μm biaxially-stretched polyether sulfone film | 50 | 9.9 | 0.4 | 8.7 | 0.3 | | | 5 | 1.51 |
| Example 22 | Uncoated surface of 50 μm biaxially-stretched polycarbonate film | 50 | 9.8 | 0.4 | 8.6 | 0.3 | | | 5 | 1.51 |
| Example 23 | Manufactured by Teijin Dupont Films Japan Limited, uncoated surface of 50 μm biaxially-stretched polyethylene naphthalate film | 50 | 10.9 | 0.64 | 10.8 | 0.63 | | | 5 | 1.51 |

TABLE 4-continued

| | | | | | | | | | | |
|---|---|---|---|---|---|---|---|---|---|---|
| Example 24 | Manufactured by TORAY INDUSTRIES, INC., LUMIRROR #16 QS62, smooth surface | 16 | 69 | 5.5 | 70 | 5.4 | | | 4.8 | 1.51 |
| Example 25 | Manufactured by TORAY INDUSTRIES, INC., LUMIRROR #16 QS62, smooth surface | 16 | 70 | 5.6 | 70 | 5.4 | 0.7 | 0.1 | 2.0 | 1.51 |
| Example 26 | Manufactured by TORAY INDUSTRIES, INC., LUMIRROR #16 QS62, smooth surface | 16 | 71 | 5.7 | 70 | 5.4 | 0.7 | 0.1 | 1.0 | 1.51 |
| Example 27 | Manufactured by TORAY INDUSTRIES, INC., LUMIRROR #16 QS62, smooth surface | 16 | 68 | 5.4 | 70 | 5.4 | 0.7 | 0.1 | 8.0 | 1.51 |
| Example 28 | Manufactured by TORAY INDUSTRIES, INC., LUMIRROR #16 QS62, smooth surface | 16 | 67 | 5.4 | 70 | 5.4 | 0.7 | 0.1 | 10 | 1.51 |
| Example 29 | Manufactured by TORAY INDUSTRIES, INC., LUMIRROR #16 QS62, smooth surface | 16 | 67 | 5.3 | 70 | 5.4 | 0.7 | 0.1 | 15 | 1.51 |
| Example 30 | Manufactured by TORAY INDUSTRIES, INC., LUMIRROR #16 QS62, smooth surface | 16 | 66 | 5.3 | 70 | 5.4 | 0.7 | 0.1 | 18 | 1.51 |

| | Second transparent resin layer | | Evaluation | | | | | |
|---|---|---|---|---|---|---|---|---|
| | | | | Moist | | | Transparency of transparent resin layer | |
| | Thickness (nm) | Refractive index | Lamination bubbles | heat test | Winding wrinkles | Cracking | Before curing | After curing |
| Example 18 | 85 | 1.65 | B | A | C | B | B | B |
| Example 19 | 85 | 1.65 | B | B | C | B | B | B |
| Example 20 | 85 | 1.65 | C | C | C | B | B | B |
| Example 21 | 85 | 1.65 | C | B | C | B | B | B |
| Example 22 | 85 | 1.65 | C | B | C | B | B | B |
| Example 23 | 85 | 1.65 | C | B | C | B | B | B |
| Example 24 | 85 | 1.65 | A | B | B | B | A | A |
| Example 25 | 85 | 1.65 | B | B | B | A | A | A |
| Example 26 | 85 | 1.65 | C | C | A | A | A | A |
| Example 27 | 85 | 1.65 | A | A | B | B | B | B |
| Example 28 | 85 | 1.65 | A | A | B | B | C | C |
| Example 29 | 85 | 1.65 | A | A | B | C | C | C |
| Example 30 | 85 | 1.65 | A | A | C | C | C | C |

TABLE 5

| | Cover film | | | | | | | | First transparent resin layer | |
|---|---|---|---|---|---|---|---|---|---|---|
| | | | Surface roughnesses after peeling | | Surface roughnesses before pressure bonding | | Dimensional stability | | | |
| | Type and name | Thickness (μm) | SRz (nm) | SRa (nm) | SRz (nm) | SRa (nm) | MD (%) | TD (%) | Thickness (μm) | Refractive index |
| Example 31 | Uncoated surface of 38 μm biaxially-stretched polyester film | 38 | 5.3 | 2.3 | | | | | 5 | 1.51 |
| Example 32 | Uncoated surface of 50 μm biaxially-stretched polyester film | 50 | 5.1 | 2.2 | | | | | 5 | 1.51 |
| Example 33 | Uncoated surface of 75 μm biaxially-stretched polyester film | 75 | 5.2 | 2.2 | | | | | 5 | 1.51 |
| Example 34 | Uncoated surface of 50 μm biaxially-stretched polyether sulfone film | 50 | 9.9 | 0.4 | 8.7 | 0.3 | | | 5 | 1.51 |

TABLE 5-continued

| | | | | | | | | | | |
|---|---|---|---|---|---|---|---|---|---|---|
| Example 35 | Uncoated surface of 50 μm biaxially-stretched polycarbonate film | 50 | 9.8 | 0.4 | 8.6 | 0.3 | | | 5 | 1.51 |
| Example 36 | Manufactured by Teijin Dupont Films Japan Limited, uncoated surface of 50 μm biaxially-stretched polyethylene naphthalate film | 50 | 11.1 | 0.66 | 10.8 | 0.63 | | | 5 | 1.51 |
| Example 37 | Manufactured by TORAY INDUSTRIES, INC., LUMIRROR #16 QS62, smooth surface | 16 | 75 | 5.9 | 70 | 5.4 | | | 4.8 | 1.51 |
| Example 38 | Manufactured by TORAY INDUSTRIES, INC., LUMIRROR #16 QS62, smooth surface | 16 | 76 | 6 | 70 | 5.4 | 0.7 | 0.1 | 2.0 | 1.51 |
| Example 39 | Manufactured by TORAY INDUSTRIES, INC., LUMIRROR #16 QS62, smooth surface | 16 | 76 | 6.1 | 70 | 5.4 | 0.7 | 0.1 | 1.0 | 1.51 |
| Example 40 | Manufactured by TORAY INDUSTRIES, INC., LUMIRROR #16 QS62, smooth surface | 16 | 73 | 5.8 | 70 | 5.4 | 0.7 | 0.1 | 8.0 | 1.51 |
| Example 41 | Manufactured by TORAY INDUSTRIES, INC., LUMIRROR #16 QS62, smooth surface | 16 | 71 | 5.7 | 70 | 5.4 | 0.7 | 0.1 | 10 | 1.51 |
| Example 42 | Manufactured by TORAY INDUSTRIES, INC., LUMIRROR #16 QS62, smooth surface | 16 | 70 | 5.6 | 70 | 5.4 | 0.7 | 0.1 | 15 | 1.51 |
| Example 43 | Manufactured by TORAY INDUSTRIES, INC., LUMIRROR #16 QS62, smooth surface | 16 | 69 | 5.6 | 70 | 5.4 | 0.7 | 0.1 | 18 | 1.51 |

| | Second transparent resin layer | | Evaluation | | | | | |
|---|---|---|---|---|---|---|---|---|
| | | | | Moist | | | Transparency of transparent resin layer | |
| | Thickness (nm) | Refractive index | Lamination bubbles | heat test | Winding wrinkles | Cracking | Before curing | After curing |
| Example 31 | 85 | 1.65 | B | A | C | B | B | B |
| Example 32 | 85 | 1.65 | B | B | C | B | B | B |
| Example 33 | 85 | 1.65 | C | C | C | B | B | B |
| Example 34 | 85 | 1.65 | C | B | C | B | B | B |
| Example 35 | 85 | 1.65 | C | B | C | B | B | B |
| Example 36 | 85 | 1.65 | C | B | C | B | B | B |
| Example 37 | 85 | 1.65 | A | B | B | B | A | A |
| Example 38 | 85 | 1.65 | B | B | B | A | A | A |
| Example 39 | 85 | 1.65 | C | C | A | A | A | A |
| Example 40 | 85 | 1.65 | A | A | B | B | B | B |
| Example 41 | 85 | 1.65 | A | A | B | B | C | C |
| Example 42 | 85 | 1.65 | A | A | B | C | C | C |
| Example 43 | 85 | 1.65 | A | A | C | C | C | C |

Among the cover films used in Examples 1 to 43, the details of the films whose manufacturer was not described are as below.

Biaxially-Stretched Polyester Film to which Particles are Added (Examples 3, 11, and 17)

Polyethylene terephthalate (intrinsic viscosity: 0.63 dl/g, amount of carboxyl-terminated group: 38 equivalents/ton) which contained, as polyester A used in an A layer, 0.7% by weight of 6-alumina particles having an average particle size of 0.05 μm and 0.04% by weight of calcium carbonate particles having an average particle size of 1.1 μm and polyethylene terephthalate (intrinsic viscosity: 0.64 dl/g, amount of carboxyl-terminated group: 38 equivalents/ton) which contained, as polyester B used in a B layer, 0.1% by weight of 6-alumina particles having an average particle size of 0.05 μm were dried in a vacuum at a moisture rate of 20 ppm. Each of the polyethylene terephthalates was supplied into different extruders and melted at 280° C. The polymers were caused to join such that two layers of A layer/B layer are formed, and then extruded in the form of a sheet from a T-shaped nozzle. The extruded resultant was cooled and solidified by an electrostatic adhesion method in a cooling drum with a surface temperature of 25° C. The non-stretched laminated film obtained in this way was heated to 90° C., stretched in the longitudinal direction by 3.6-fold at 105° C. and then in the width direction by 4.0-fold while being heated at 108° C. The film was subjected to a tensioned thermal treatment for 3 seconds by being exposed to hot air with a temperature of 220° C., and cooled and relaxed in the transverse direction at the same temperature in the same atmosphere such that the original film width was restored by 5%. In this way, a biaxially-stretched laminated polyester film was obtained. The film had a total thickness of 16 μm, which consisted of the A layer (2.0 μm) and the B layer (14 μm). As a cover film, the B surface was used.

Biaxially-Stretched Polyester Film A to which Particles are Added (Comparative Examples 1 and 9)

A biaxially-stretched laminated polyester film was manufactured in the same manner as used for manufacturing the biaxially-stretched polyester film to which particles added that was used in Example 3, except that polyethylene terephthalate (intrinsic viscosity: 0.64 dl/g, amount of carboxyl-terminated group: 38 equivalents/ton) was used which contained, as polyester B, 0.1% by weight of 6-alumina particles having an average particle size of 0.05 μm and 0.0016% by weight of calcium carbonate particles having an average particle size of 1.1 μm. Finally, a film was obtained which had a total thickness of 16 μm consisting of the A layer (1.0 μm) and the B layer (15 μm). As a cover film, the B surface was used.

Biaxially-Stretched 16 μM Polyester Film (Examples 7 and 15)

As a temporary support, a polyethylene terephthalate film was used which was biaxially stretched, subjected to thermal fixation for 10 minutes at 240° C., and adjusted to have a width of 1,610 mm and a thickness of 16 μm. One surface of the temporary support was coated with the following back surface coating solution and dried for 2 minutes at 130° C., thereby forming a back surface coating layer having a thickness of 0.08 μm. A surface on the side opposite to the back surface coating layer was used as an uncoated surface.

The details of the film are the same as those of the film used in Example 1 described in JP2008-009030A.

[Back Surface Coating Solution 1]

Aqueous dispersion of acryl resin (JURYMER ET-410, number-average molecular weight: 9,700, weight-average molecular weight: 17,000, concentration of solid content: 30%, manufactured by Nippon Pure Chemicals Co., Ltd.): 30.9 parts by mass Aqueous solution of carbodiimide cross-linking agent (CARBODILITE V-02-L2, concentration of solid content: 40%; manufactured by Nisshinbo Chemical Inc.): 6.4 parts by mass Additive 1 (SN38F: $SnO_2$ fine particles (solid content: 17%) manufactured by ISHIHARA SANGYO KAISHA, LTD.): 54.5 parts Surfactant (NAROACTY HN-100, manufactured by Sanyo Chemical Industries, Ltd.): 0.73 parts by mass Surfactant (SANDET BL, concentration of solid content: 43%, manufactured by Sanyo Chemical Industries, Ltd.): 1.44 parts by mass Distilled water: added such that the total amount became 1,000 parts by mass Biaxially-Stretched 38 μM Polyester Film (Examples 18 and 31)

This film was prepared in the same manner as used for preparing the aforementioned biaxially-stretched 16 μm polyester film, except that the thickness was set to be 38 μm by adjusting the degree of stretching.

Biaxially-Stretched 50 μM Polyester Film (Examples 19 and 32)

This film was prepared in the same manner as used for preparing the aforementioned biaxially-stretched 16 μm polyester film, except that the thickness was set to be 50 μm by adjusting the degree of stretching.

Biaxially-Stretched 75 μM Polyester Film (Examples 20 and 33)

This film was prepared in the same manner as used for preparing the aforementioned biaxially-stretched 16 μm polyester film, except that the thickness was set to be 75 μm by adjusting the degree of stretching.

Biaxially-Stretched 50 μM Polyether Sulfone Film (Examples 21 and 34)

To 40 parts by mass of 1,3-dioxolane, 10 parts by mass of aromatic polyether sulfone ("Udel P-1700" manufactured by Amoco, ηsp/c=0.41 dl/g) was added while being stirred at room temperature by being divided into three portions. As a result, a transparent and viscous dope was obtained. The solution viscosity of the dope at 30° C. was $4.6 \times 10^2$ cps. The dope was filtered through a filter having a pore size of 1.0 μm so as to remove floating matters, and left as it was for 24 hours at room temperature in a sealed state. As a result, no change occurred in the dope, and the dope was not found to become turbid or to be gelated. The obtained solution was cast onto a glass substrate by using a doctor blade, then dried for 20 minutes at 30° C., for 20 minutes at 50° C., for 20 minutes at 80° C., and then for 20 minutes at 100° C., and peeled from the substrate, thereby obtaining a film having a thickness of 50 μm. The obtained film was uniform and did not show foaming, ruggedness, and a lenticulation phenomenon.

Biaxially-Stretched 50 μM Polycarbonate Film (Examples 22 and 35)

A copolymerized polycarbonate resin composed of BisA/BCF=50/50 (molar ratio) and having an average molecular weight of 37,000 was dissolved in methylene chloride such that a 20% by mass solution was obtained.

The solution obtained in this way was cast onto a glass substrate. Then, the solution was dried in a drying furnace until the concentration of the residual solvent became 13% by mass, and peeled from the glass substrate. Thereafter, in a state where a minimum tension was applied to the obtained polycarbonate film so as to prevent as much as possible the tension from varying between the longitudinal direction and the transverse direction and to keep the tension balanced well, the film was dried in a drying furnace with a temperature of 180° C. until the concentration of the residual solvent in the film became 0.1% by mass. In this way, a film having a thickness of 50 μm was obtained.

EXPLANATION OF REFERENCES

- 1: transparent substrate (front panel)
- 2: mask layer
- 3: transparent electrode pattern (first transparent electrode pattern)
- **3*a***: pad portion
- **3*b***: connection portion
- 4: transparent electrode pattern (second transparent electrode pattern)
- 5: insulating layer
- 6: different conductive element
- 7: first transparent resin layer (preferably having function of overcoat layer or transparent protective layer)
- 8: opening portion
- 10: capacitance-type input device
- 11: transparent film
- 12: second transparent resin layer (refractive index adjusting layer, may have function of transparent insulating layer)
- 13: transparent laminate

21: area constituted with transparent electrode patterns, second transparent resin layer, and first transparent resin layer that are laminated in this order

22: non-pattern area

α: taper angle

26: temporary support

29: cover film

30: transfer film

31: terminal portion of routing wiring

30: transfer film

33: cured portion of first transparent resin layer and second transparent resin layer

34: opening portion corresponding to terminal portion of routing wiring (uncured portion of first transparent resin layer and second transparent resin layer)

35: paper tube

36: transparent resin layer or second transparent resin layer

What is claimed is:

1. A transfer film comprising:

a temporary support;

a resin layer; and a cover film in this order, wherein when the cover film is peeled from the resin layer, a surface of the cover film that contacted the resin layer has surface roughnesses SRz and SRa of equal to or less than 130 nm and equal to or less than 8 nm respectively that are measured based on JIS-B0601-2001.

2. The transfer film according to claim 1, wherein the resin layer is a transparent resin layer, and the resin layer has a transmittance of equal to or higher than 80% at a wavelength of 400 to 780 nm.

3. The transfer film according to claim 2, wherein the transparent resin layer includes a first transparent resin layer and a second transparent resin layer, and a surface of the transparent resin layer contacting the cover film is the second transparent resin layer.

4. The transfer film according to claim 1, wherein a material of the cover film is polyester.

5. The transfer film according to claim 1, wherein the cover film has a thickness of 10 to 50 μm.

6. The transfer film according to claim 1, wherein the resin layer contains at least a binder.

7. The transfer film according to claim 1, wherein the resin layer has a dry film thickness of 1 to 15 μm.

8. The transfer film according to claim 1, wherein the resin layer contains particles having a refractive index of equal to or higher than 1.55.

9. A method for manufacturing a laminate, comprising:

laminating the resin layer of the transfer film according to claim 1 on a transparent electrode pattern positioned on a base material.

10. A method for manufacturing a capacitance-type input device, comprising:

laminating the resin layer of the transfer film according to claim 1 on a transparent electrode pattern.

11. A method for manufacturing an image display device, comprising:

laminating the resin layer of the transfer film according to claim 1 on a transparent electrode pattern.

12. The transfer film according to claim 1, wherein the surface roughness SRz is equal to or less than 116 nm, the cover film has a thickness of 10 to 50 μm, and the resin layer has a dry film thickness of 2 to 15 μm.

13. The transfer film according to claim 1, wherein the surface roughness SRz is equal to or less than 80 nm, the cover film has a thickness of 11 to 25 μm, and the resin layer has a dry film thickness of 5 to 15 μm.

14. The transfer film according to claim 1, wherein the resin layer includes a first transparent resin layer and a second transparent resin layer, and a material of the cover film is polyester.

15. A method for manufacturing a transfer film, comprising:

laminating a resin layer on a temporary support; and laminating a cover film on the resin layer in this order, wherein when the cover film is peeled from the resin layer, a surface of the cover film that contacted the resin layer has surface roughnesses SRz and SRa of equal to or less than 130 nm and equal to or less than 8 nm respectively that are measured based on JIS-B0601-2001.

16. The method for manufacturing a transfer film according to claim 15, wherein the surface roughness SRz is equal to or less than 116 nm, the cover film has a thickness of 10 to 50 μm, and the resin layer has a dry film thickness of 2 to 15 μm.

17. The method for manufacturing a transfer film according to claim 15, wherein the surface roughness SRz is equal to or less than 80 nm, the cover film has a thickness of 11 to 25 μm, and the resin layer has a dry film thickness of 5 to 15 μm.

18. The method for manufacturing a transfer film according to claim 15, wherein the resin layer includes a first transparent resin layer and a second transparent resin layer, and a material of the cover film is polyester.

19. A method for manufacturing a transfer film, comprising:

laminating a first transparent resin layer on a temporary support;

laminating a second transparent resin layer on the first transparent resin layer; and laminating a cover film on the second transparent resin layer in this order, wherein when the cover film is peeled from a transparent resin layer including the first transparent resin layer and the second transparent resin layer, a surface of the cover film that contacted the transparent resin layer has surface roughnesses SRz and SRa of equal to or less than 130 nm and equal to or less than 8 nm respectively that are measured based on JIS-B0601-2001.

20. The method for manufacturing a transfer film according to claim 19, wherein the surface roughness SRz is equal to or less than 116 nm, the cover film has a thickness of 10 to 50 μm, and the resin layer has a dry film thickness of 2 to 15 μm.

* * * * *